US010972626B2

(12) United States Patent
Mizude et al.

(10) Patent No.: US 10,972,626 B2
(45) Date of Patent: Apr. 6, 2021

(54) IMAGE READING APPARATUS

(71) Applicant: Sharp Kabushiki Kaisha, Sakai (JP)

(72) Inventors: Kazuhiro Mizude, Sakai (JP); Kazuma Ogawa, Sakai (JP); Tatsuya Fujisaki, Sakai (JP); Sho Tsujimoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/855,192

(22) Filed: Apr. 22, 2020

(65) Prior Publication Data

US 2020/0252517 A1 Aug. 6, 2020

Related U.S. Application Data

(63) Continuation of application No. 15/356,738, filed on Nov. 21, 2016, now abandoned.

(30) Foreign Application Priority Data

Dec. 1, 2015 (JP) ................. 2015-234884
Dec. 1, 2015 (JP) ................. 2015-234888
Apr. 1, 2016 (JP) ................. 2016-074241

(51) Int. Cl.
*H04N 1/32* (2006.01)
*G06K 9/00* (2006.01)
(Continued)

(52) U.S. Cl.
CPC ....... *H04N 1/3208* (2013.01); *G06K 9/00456* (2013.01); *G06K 9/00463* (2013.01); *G06K 9/4604* (2013.01); *H04N 1/0044* (2013.01); *H04N 1/00748* (2013.01); *H04N 1/32128* (2013.01); *H04N 1/38* (2013.01); *H04N 1/3873* (2013.01); *H04N 1/3878* (2013.01); *G06K 2209/01* (2013.01); *H04N 2201/0081* (2013.01); *H04N 2201/0094* (2013.01)

(58) Field of Classification Search
None
See application file for complete search history.

(56) References Cited

U.S. PATENT DOCUMENTS

| 2007/0013974 A1* | 1/2007 | Hattori ............... H04N 1/3872 358/486 |
| 2014/0081976 A1* | 3/2014 | Mikawa ................ G06F 16/51 707/737 |

OTHER PUBLICATIONS

Mizude et al., "Image Reading Apparatus", U.S. Appl. No. 15/356,738, filed Nov. 21, 2016.

* cited by examiner

*Primary Examiner* — Dov Popovici
(74) *Attorney, Agent, or Firm* — Keating & Bennett, LLP

(57) ABSTRACT

The present invention provides an image reading apparatus including: a scanner that scans originals by a batch-scan that are placed on an original table; an original reading circuitry that reads an image of each of the scanned originals, and control circuitry, wherein the control circuitry executes a continuous multi-crop process according to a selection by a user, and when the continuous multi-crop process is executed, the control circuitry displays on the display one operation key that receives an instruction to start the next scan and another operation key that receives an instruction to end the reading respectively every time each batch-scan is executed to enable the batch-scan to be repeatedly executed until receiving the instruction to end the reading, and handles the images of the originals read by the repeated batch-scans as a series of image data.

7 Claims, 56 Drawing Sheets

(51) Int. Cl.
*H04N 1/00* (2006.01)
*H04N 1/387* (2006.01)
*H04N 1/38* (2006.01)
*G06K 9/46* (2006.01)

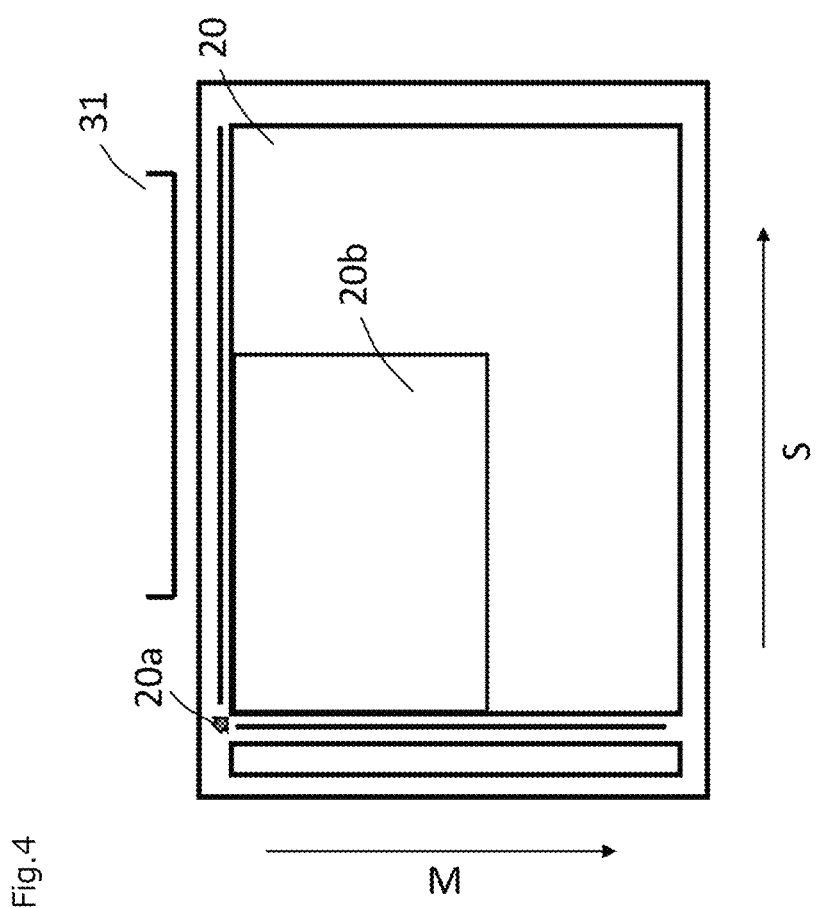

Fig.7

|  | D01 | D02 | D03 | D04 | D05 | D06 | D07 |
|---|---|---|---|---|---|---|---|
| None | ○ | ○ | ○ | ○ | ○ | ○ | ○ |
| A5 | × | ○ | ○ | ○ | ○ | ○ | ○ |
| B5 | × | × | ○ | ○ | ○ | ○ | ○ |
| A4 | × | × | × | ○ | ○ | ○ | ○ |
| B5R | × | × | × | × | ○ | ○ | ○ |
| A4R | × | × | × | × | × | ○ | ○ |
| B4 | × | × | × | × | × | × | ○ |
| A3 | × | × | × | × | × | × | × |

Fig.8

|  | D01 | D02 | D03 | D04 | D05 | D06 | D07 |
|---|---|---|---|---|---|---|---|
| None | ○ | ○ | ○ | ○ | ○ | ○ | ○ |
| 5.5"x8.5" | × | ○ | ○ | ○ | ○ | ○ | ○ |
| B5 | × | × | ○ | ○ | ○ | ○ | ○ |
| 8.5"x11" | × | × | × | ○ | ○ | ○ | ○ |
| B5R | × | × | × | × | ○ | ○ | ○ |
| 8.5"x11"R | × | × | × | × | × | ○ | ○ |
| 8.5"x14" | × | × | × | × | × | × | ○ |
| 11"x17" | × | × | × | × | × | × | × |

Fig.9

|  | D01 | D02 | D03 | D04 | D05 | D06 | D07 |
|---|---|---|---|---|---|---|---|
|  | × | × | × | ○ | × | × | × |

Fig.11A
Fig.11B
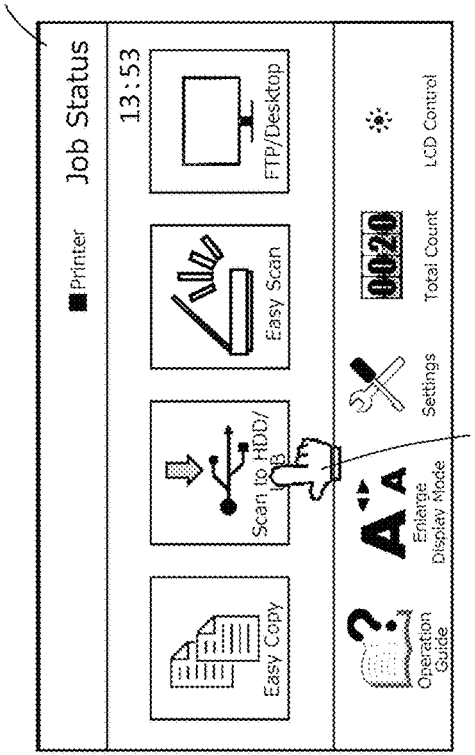
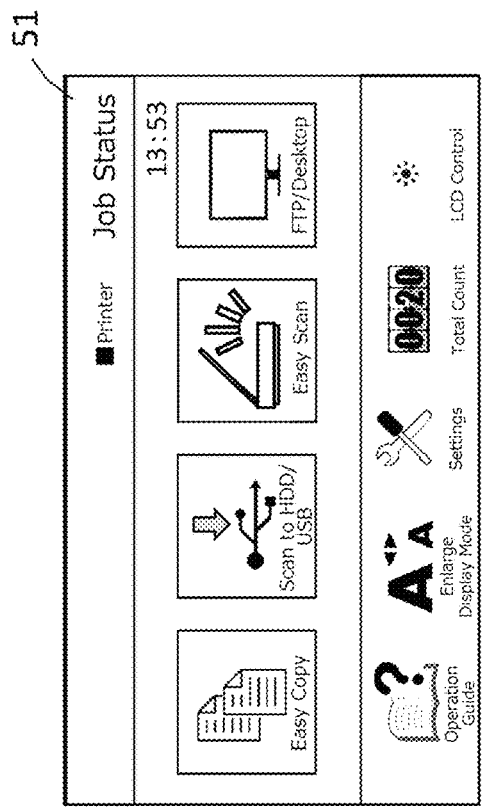

Standard size original

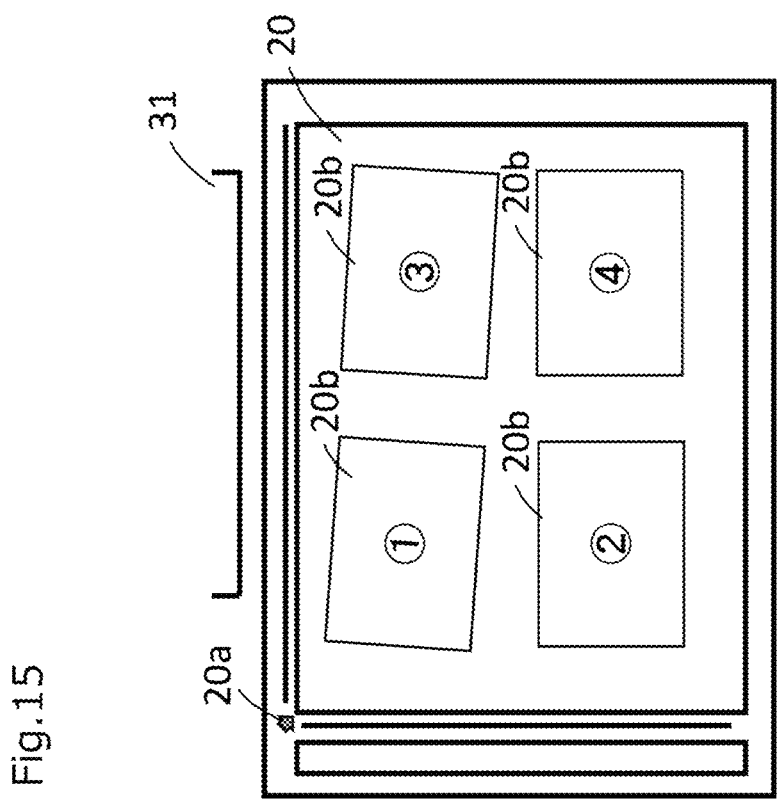

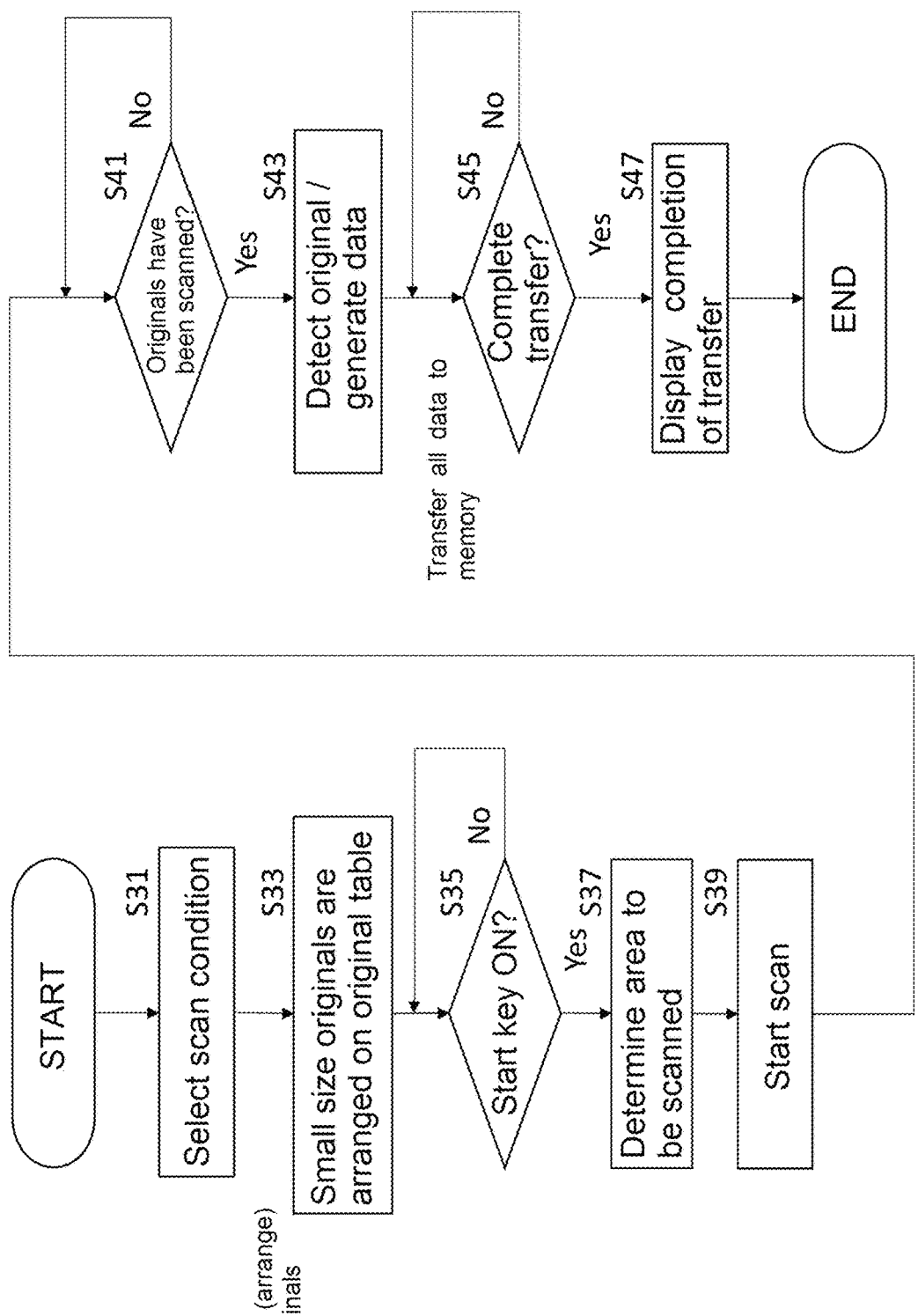
Fig. 18 Multi-crop scan

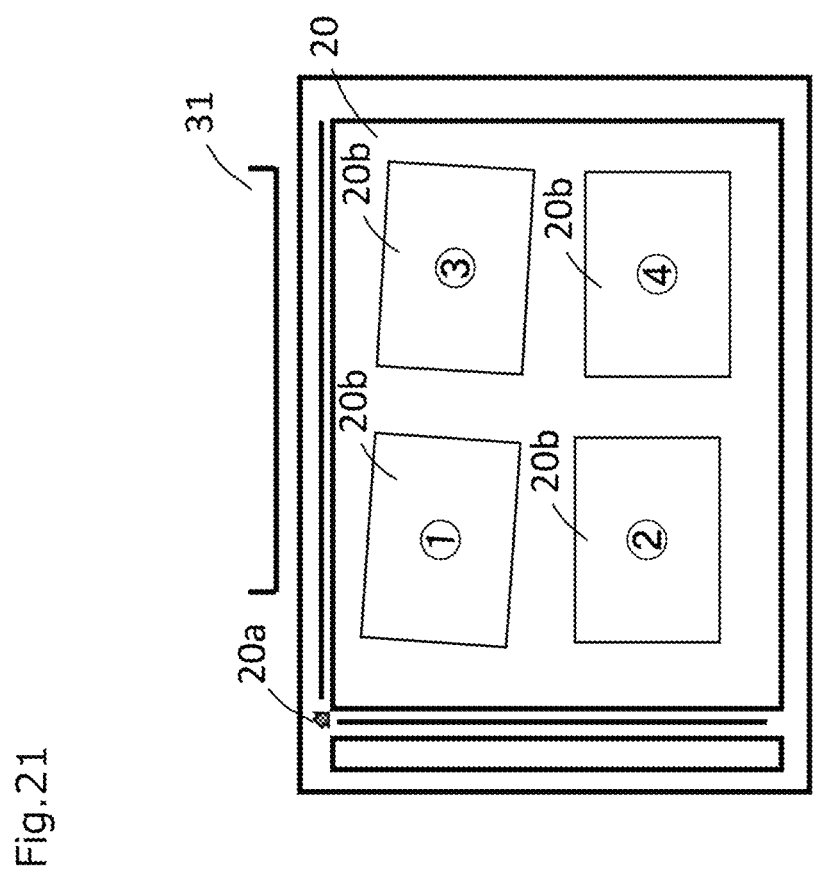

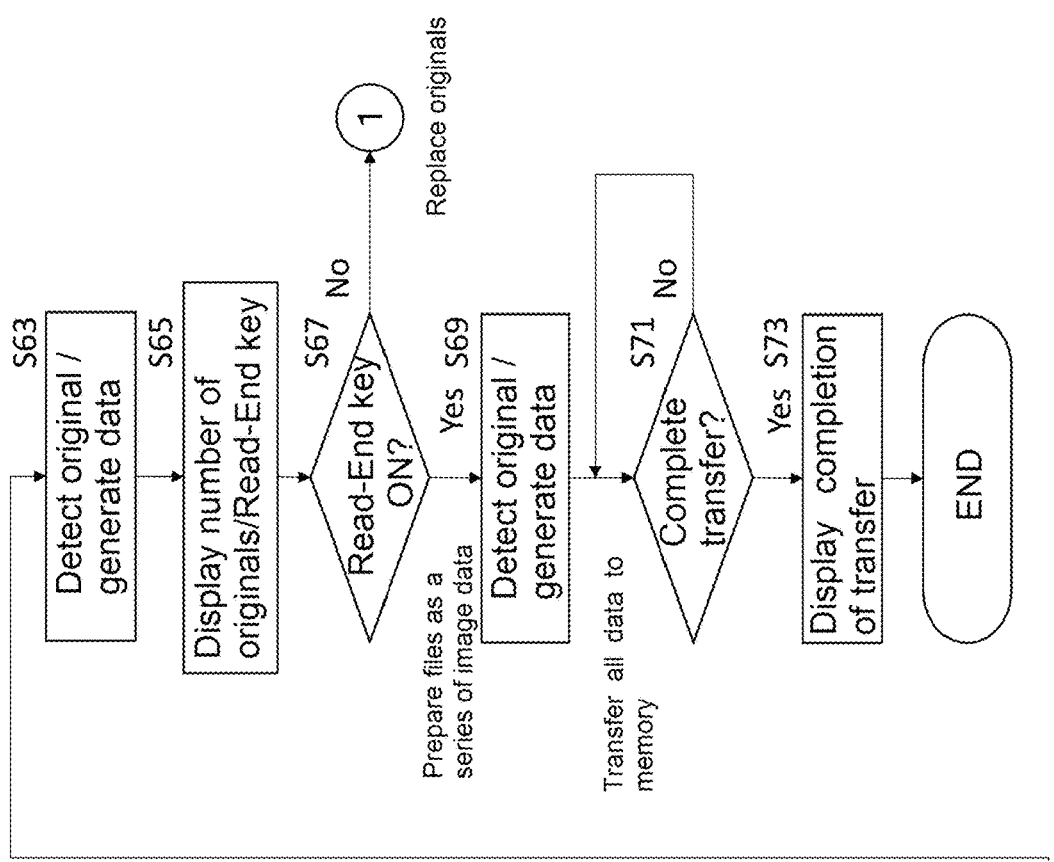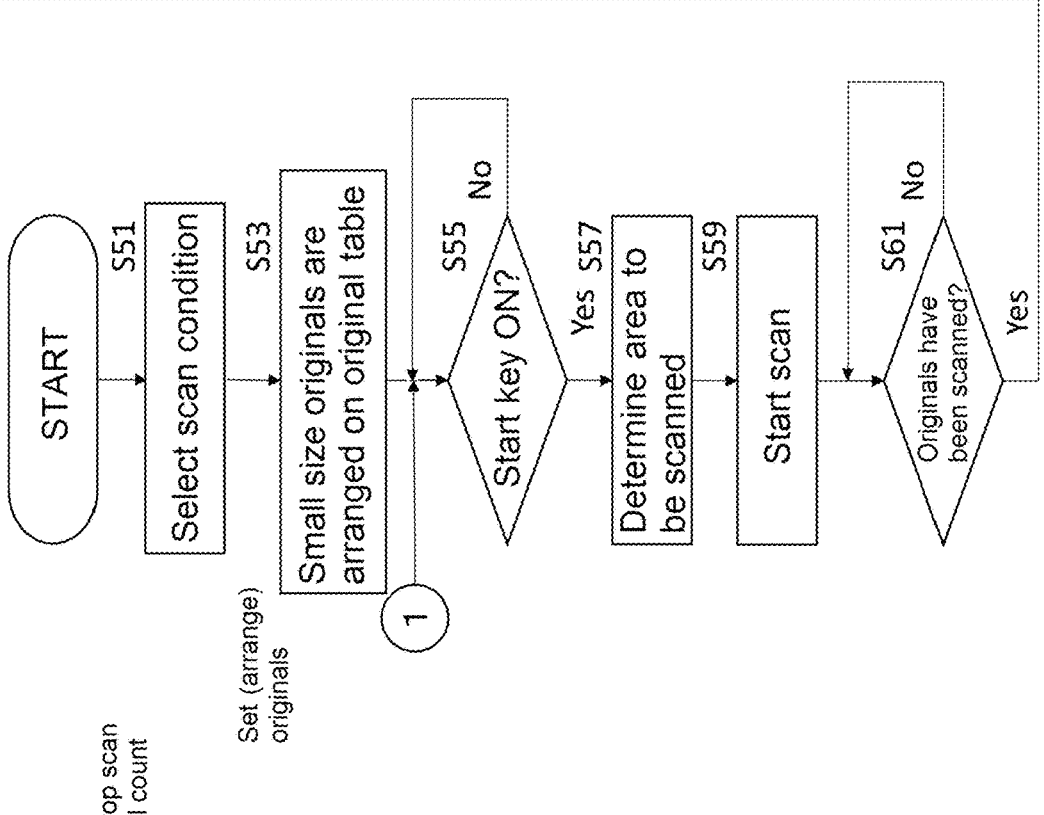
Fig.26
Multi-crop scan
Original count

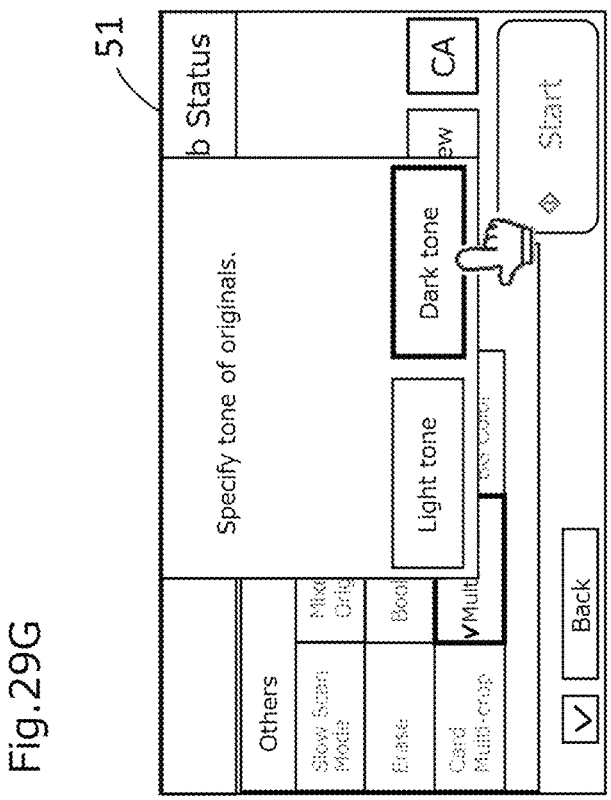

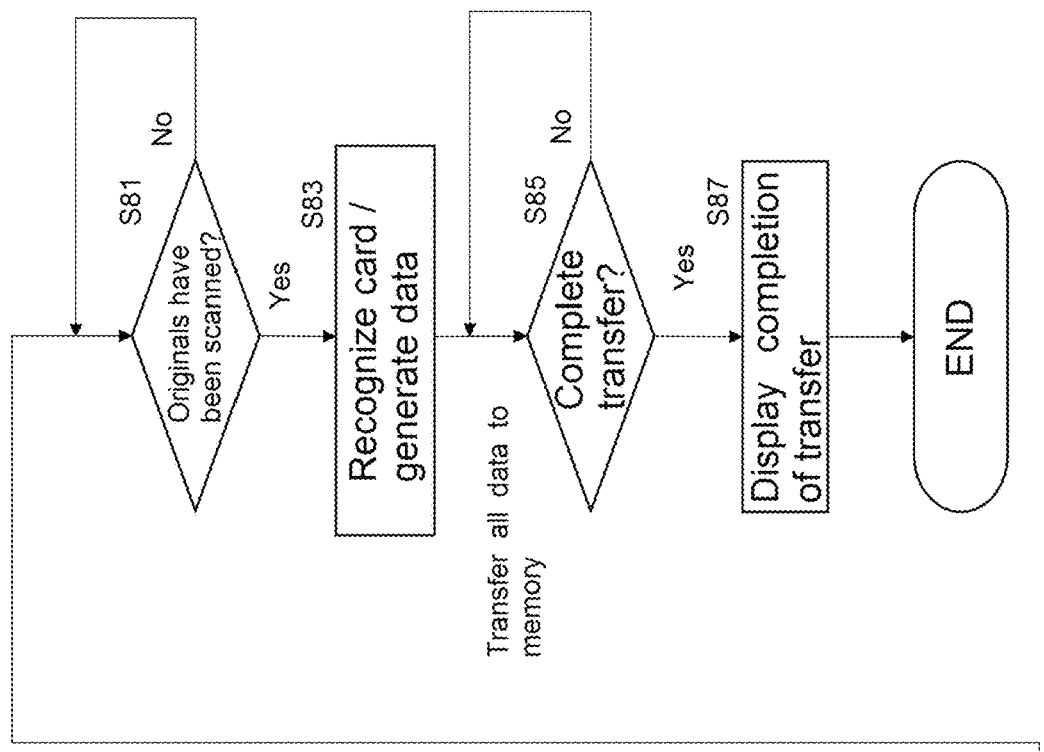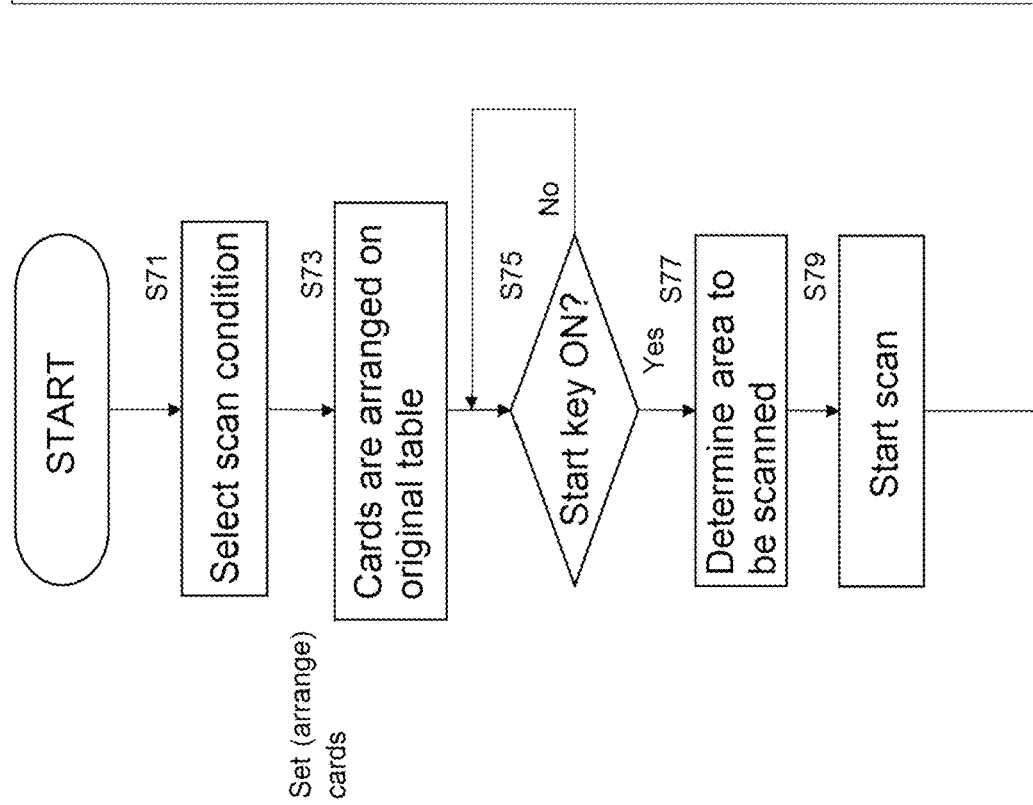
Fig. 33

IMAGE READING APPARATUS

CROSS-REFERENCE TO RELATED APPLICATION

This application is a Continuation of copending application Ser. No. 15/356,738, filed on Nov. 21, 2016 and claims priority under 35 U.S.C. § 119(a) to Japanese Patent Application Nos. 2015-234884 2015-234888 which are filed on Dec. 1, 2015 and No. 2016-74241 filed on Apr. 1, 2016, all of which are hereby expressly incorporated by reference into the present application.

BACKGROUND OF THE INVENTION

1. Field of the Invention

The present invention relates to an image reading apparatus having a multi-crop function.

2. Description of the Related Art

There has been known a multi-crop function in which, in the case where small size originals, such as business cards, postcards, or photos, are to be read, multiple originals are placed on an original table and scanned and read in batch to crop an image corresponding to each original. There has also been known an image reading apparatus having such multi-crop function.

For example, there has been proposed an apparatus which detects the number of originals and their respective positions by pre-scan, scans the originals one by one, and displays how many originals have been scanned before the currently-scanned original, so as to enable a user to recognize an image reading state (see Japanese Unexamined Patent Publication No. 2003-219085, for example). There has also been proposed an apparatus that controls the order of cropping an image according to the original size of a cropped image, the position of the original, a size of a printing sheet used to print the original, and the type of the printing sheet, even if originals of different sizes and different types are simultaneously placed (see Japanese Unexamined Patent Publication No. 2007-013378, for example). There has also been proposed an apparatus that compares the input number of originals and the detected number of originals, and displays the comparison result, in order to correctly detect the number of images that the user desires to crop and to read these images (see Japanese Unexamined Patent Publication No. 2007-020122, for example).

It is convenient that images of multiple originals which have been read by a batch scan using a multi-crop function are managed in association with one another. This is because these originals are related to one another in most cases. When a user is going to organize multiple business cards he/she got at a certain event, it is convenient that these cards are read in batch by the multi-crop function and stored in association with the name or date of the event. The expected use for postcards is such that New Year's cards of a certain year or postcards concerning participation of a certain event are read in batch using the multi-crop function. Another expected use is such that photos are read in batch using the multi-crop function for each trip or each event.

When there are a lot of originals to be read, it is considered that these originals cannot be read by one batch scan. In this case, it is convenient if the originals read by more than one batch scan can be stored in association with one another. In addition, it is also convenient if the relation of the originals which have been read is recorded without a need of complicated operation or process by a user.

In the case where more than one batch scan is to be executed, it is not easy for an apparatus to appropriately determine whether the image data read by a certain batch scan is related to the image data read by the previous or next batch scan. For example, it is supposed that a user causes an apparatus to read multiple business cards that he/she got at a certain event by a batch scan in order to organize these cards. It is also supposed that the user intends to manage all of the business cards he/she got as one group. In this case, the user's intention is to store the image data read by each batch scan in association with the image data read by the previous and next batch scans.

On the other hand, it may be the case where the user intends to manage the business cards he/she got by type of business or level of importance, for example. In this case, the user may categorize the business cards by oneself and perform a batch scan for each categorization. However, in general, the apparatus hardly determines each categorization intended by the user, unless each categorization has an image characteristic that can be defined beforehand.

SUMMARY OF THE INVENTION

The present invention is accomplished in view of the foregoing circumstances, and provides an image reading apparatus that, even when reading a lot of originals which have to be read by more than one batch scan using a multi-crop function, can output images of the originals in a manner by which the relation among the images of the originals which have been read is easily recognized without requiring a complicated operation or process.

The present invention provides an image reading apparatus including: a scanner that scans originals by a batch-scan that are placed on an original table; an original reading circuitry that reads an image of each of the scanned originals; an image processing circuit that crops the image of each original from the scanned images; an image output that outputs the cropped image of each original; control circuitry that controls the scanner, the original reading circuitry, the image processing circuit, and the image output; and a display, wherein the control circuitry executes a continuous multi-crop process—according to a selection by a user, and when the continuous multi-crop process is executed, the control circuitry displays on the display one operation key that receives an instruction to start the next scan and another operation key that receives an instruction to end the reading respectively every time each batch-scan is executed to enable the batch-scan to be repeatedly executed until receiving the instruction to end the reading, and handles the images of the originals read by the repeated batch-scans as a series of image data.

In the image reading apparatus according to the present invention, the control unit enables to process images of multiple originals cropped by more than one batch scan as a series of image data, and controls the image output unit in at least such a way that a series of filenames is attached to the series of image data according to a predetermined rule, the series of image data is output into the same folder, or the series of image data is stored in association with one another. Therefore, even if a lot of originals which have to be read by more than one batch scan are to be read, the apparatus can output images of the originals in a manner by which the relation among the images of the originals which have been read is easily recognized without requiring a complicated operation or process.

BRIEF DESCRIPTION OF THE DRAWINGS

FIG. 4 is an explanatory view showing the state in which an original is placed at a predetermined position on the original table shown in FIG. 3;

FIG. 7 is an explanatory diagram showing presence or absence (presence/absence) of each detection beam from the original size detection unit according to the present invention (corresponding to FIG. 5C);

FIG. 8 is an explanatory diagram showing presence/absence of each detection beam from the original size detection unit according to the present invention (corresponding to FIG. 6C);

FIG. 9 is an explanatory view showing presence/absence of each detection beam from the original size detection unit according to the present invention when multiple originals are placed on the original table (corresponding to later-described FIG. 19B);

FIG. 11A is a first explanatory view showing an operation procedure of the digital multifunction peripheral shown in FIG. 1 when a standard size original is to be read;

FIG. 11B is a second explanatory view showing the operation procedure of the digital multifunction peripheral shown in FIG. 1 when a standard size original is to be read;

FIG. 11D is a fourth explanatory view showing the operation procedure of the digital multifunction peripheral shown in FIG. 1 when a standard size original is to be read;

FIG. 11E is a fifth explanatory view showing the operation procedure of the digital multifunction peripheral shown in FIG. 1 when a standard size original is to be read;

FIG. 14A is a first explanatory view showing an operation procedure of the digital multifunction peripheral shown in FIG. 1 when a single multi-crop scan is executed;

FIG. 14B is a second explanatory view showing the operation procedure of the digital multifunction peripheral shown in FIG. 1 when a single multi-crop scan is executed;

FIG. 15 is an explanatory view showing the state in which multiple originals for a multi-crop scan are placed on the original table shown in FIG. 3;

FIG. 18 is a flowchart showing a process executed by the control unit while in the single multi-crop scan;

FIG. 21 is an explanatory view showing the state in which multiple originals for the first batch scan are placed on the original table shown in FIG. 3;

FIG. 22B is a fourth explanatory view showing the operation procedure of the digital multifunction peripheral shown in FIG. 1 when a continuous multi-crop scan is executed;

FIG. 22C is a fifth explanatory view showing the operation procedure of the digital multifunction peripheral shown in FIG. 1 when a continuous multi-crop scan is executed;

Figures 24C, 24D:
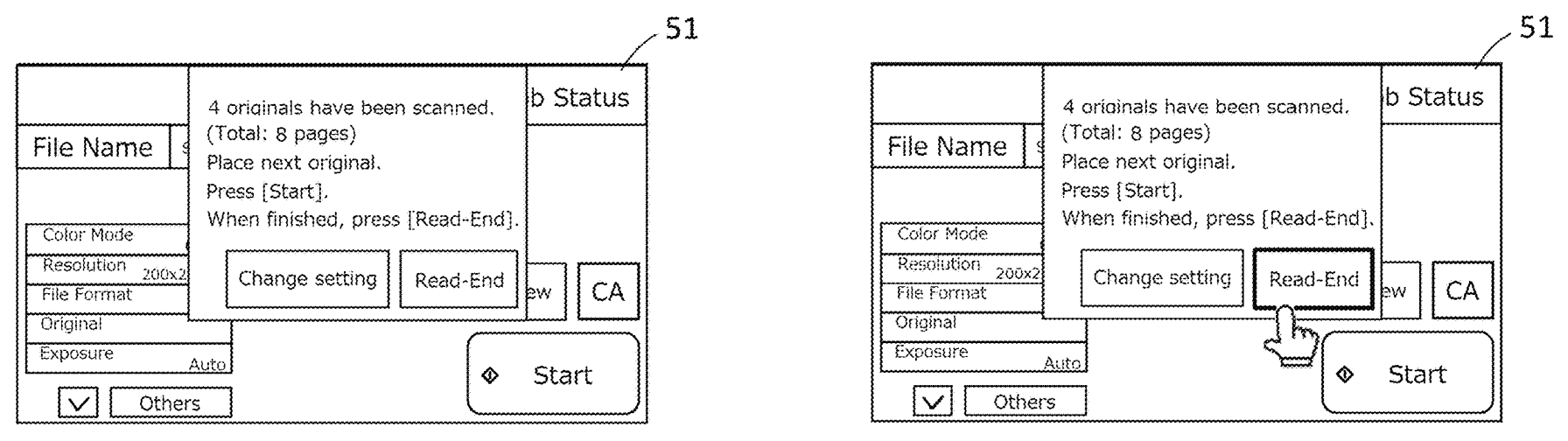

FIG. 24A is a sixth explanatory view showing the operation procedure of the digital multifunction peripheral shown in FIG. 1 when a continuous multi-crop scan is executed;

FIG. 24B is a seventh explanatory view showing the operation procedure of the digital multifunction peripheral shown in FIG. 1 when a continuous multi-crop scan is executed;

FIG. 24C is an eighth explanatory view showing the operation procedure of the digital multifunction peripheral shown in FIG. 1 when a continuous multi-crop scan is executed;

FIG. 24D is a ninth explanatory view showing the operation procedure of the digital multifunction peripheral shown in FIG. 1 when a continuous multi-crop scan is executed;

FIG. 26 is a flowchart showing a process executed by the control unit while in the continuous multi-crop scan;

FIG. 29G is a seventh explanatory view showing another embodiment of the operation procedure of the digital multifunction peripheral shown in FIG. 1 when a photo multi-crop is executed;

FIG. 30E is a fifth explanatory view showing the operation procedure of the digital multifunction peripheral shown in FIG. 1 when a card multi-crop scan is executed;

FIG. 30F is a sixth explanatory view showing the operation procedure of the digital multifunction peripheral shown in FIG. 1 when a card multi-crop scan is executed;

FIG. 30K is an eleventh explanatory view showing the operation procedure of the digital multifunction peripheral shown in FIG. 1 when a card multi-crop scan is executed;

FIG. 30L is a twelfth explanatory view showing the operation procedure of the digital multifunction peripheral shown in FIG. 1 when a card multi-crop scan is executed;

FIG. 30M is a thirteenth explanatory view showing the operation procedure of the digital multifunction peripheral shown in FIG. 1 when a card multi-crop scan is executed;

FIG. 30N is a fourteenth explanatory view showing the operation procedure of the digital multifunction peripheral shown in FIG. 1 when a card multi-crop scan is executed;

FIG. 30Q is a seventeenth explanatory view showing the operation procedure of the digital multifunction peripheral shown in FIG. 1 when a card multi-crop scan is executed;

FIG. 30R is an eighteenth explanatory view showing the operation procedure of the digital multifunction peripheral shown in FIG. 1 when a card multi-crop scan is executed;

FIG. 33 is a flowchart showing a process executed by the control unit in the card multi-crop scan (first scan)

DESCRIPTION OF THE PREFERRED EMBODIMENTS

The present invention will be described below in more detail with reference to the drawings. Note that the description below should be considered in all aspects as illustrative and not restrictive of the present invention.

«Outline of Image Reading Apparatus»

A specific example of an image reading apparatus according to the present embodiment will be described.

Figure 1:
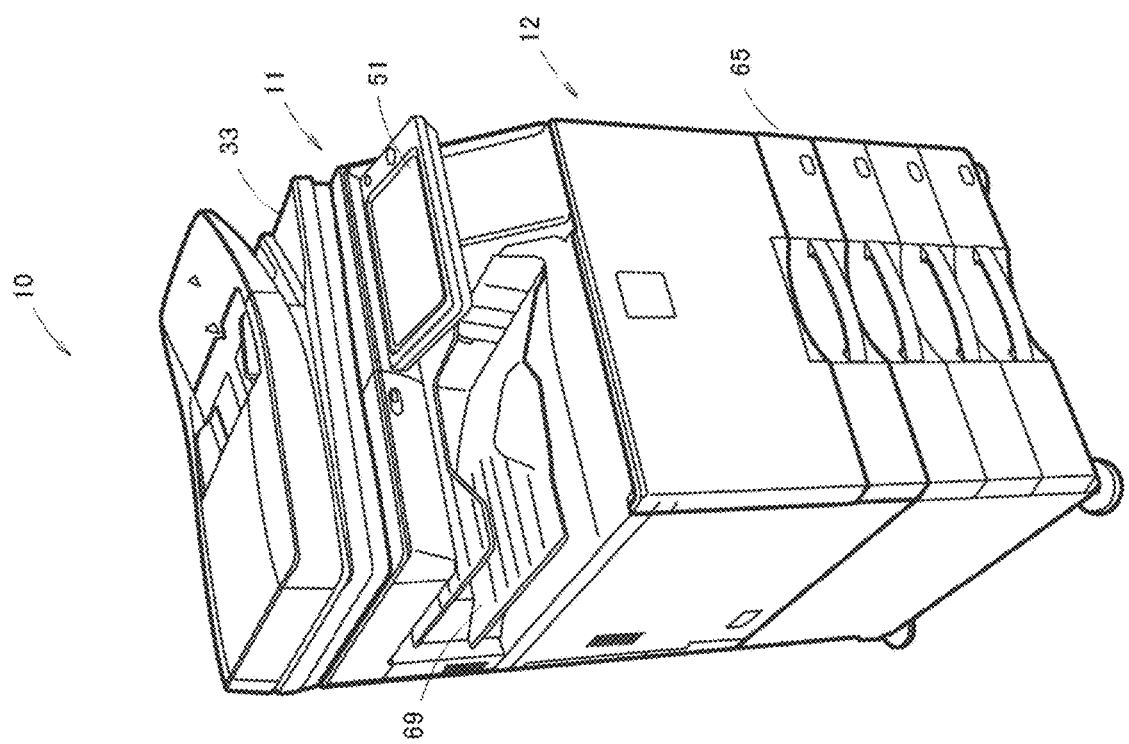
FIG. 1 is a perspective view of an appearance of a digital multifunction peripheral shown as one example of an image reading apparatus according to the present invention.
Figure 2:
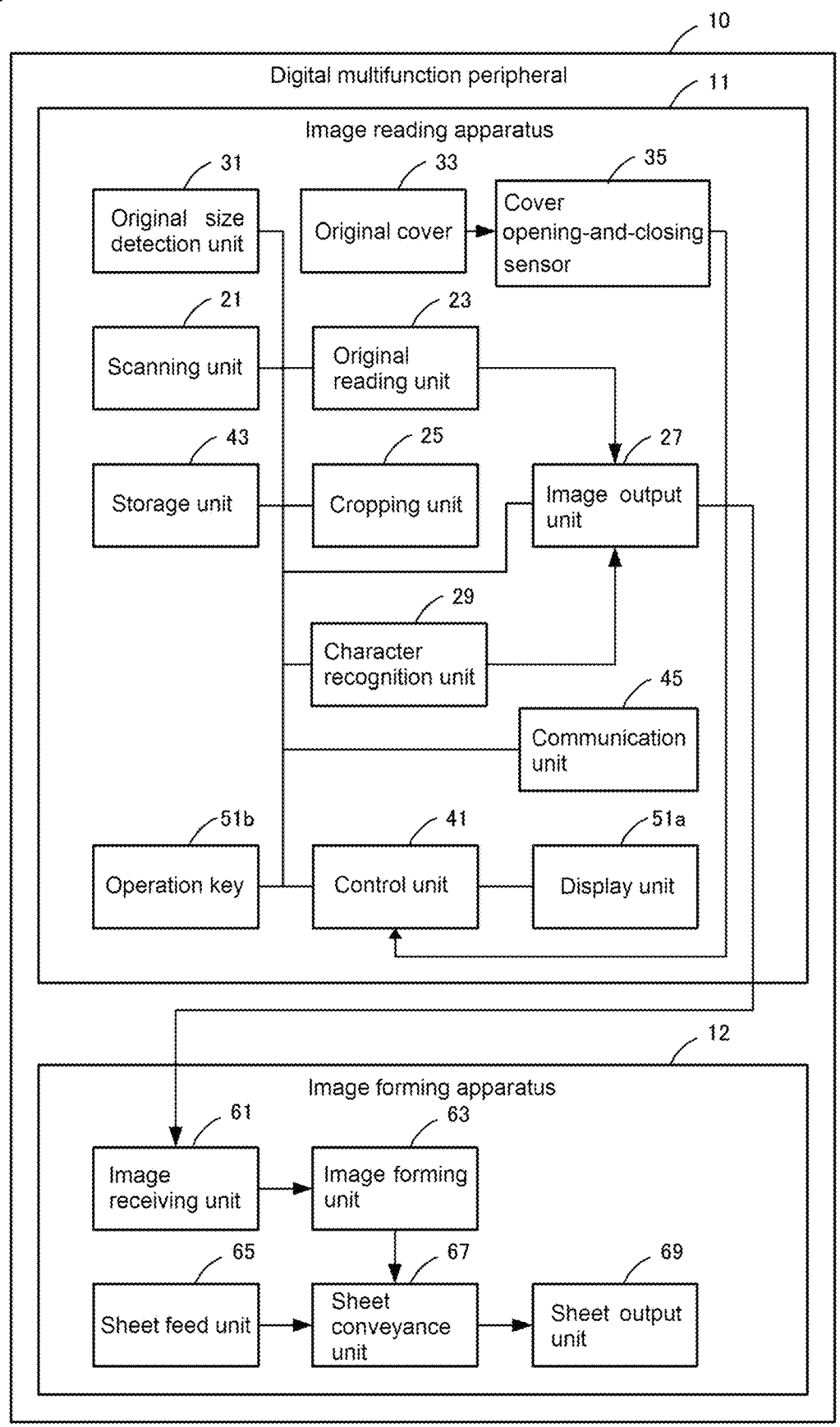
FIG. 2 is a block diagram showing the configuration of the digital multifunction peripheral shown in FIG. 1.

FIG. 1 is a perspective view showing an appearance of a digital multifunction peripheral shown as one example of the image reading apparatus of the present invention. FIG. 2 is a block diagram showing the configuration of the digital multifunction peripheral shown in FIG. 1.

The digital multifunction peripheral 10 shown in FIGS. 1 and 2 includes an image reading apparatus 11 according to the present embodiment and an image forming apparatus 12 performing printing. The digital multifunction peripheral 10 is connectable to an unillustrated network through a communication unit 45. The digital multifunction peripheral 10 can transmit image data of an original read by the image reading apparatus 11 to an external device through the network. The digital multifunction peripheral 10 can receive print data from an external device through the network and print the received print data by the image forming apparatus 12. The digital multifunction peripheral 10 has a copying function, a printer function, a scanner function, an image filing function, and a facsimile function.

An original cover 33 shown in FIG. 1 also serves as an automatic document feeder. A user can manually open the original cover 33 upward. When used as the automatic document feeder, the original cover 33 is closed. When the original cover 33 is opened upward, an original table (not shown in FIG. 1) provided below the original cover 33 appears. The user can place an original on the original table and cause the image reading apparatus 11 to read the original. A cover opening-and-closing sensor 35 (see FIG. 2) detects whether the original cover is opened or closed.

The original table is formed from transparent glass, and below the original table, a scanning unit 21 that is a mechanism for scanning an original while moving and an original reading unit 23 that is an electronic circuit for reading an image of an original scanned by the scanning unit 21 are provided. In the present embodiment, the original reading unit is original reading circuitry including a linear image sensor.

The image reading apparatus 11 also includes an image processing circuit. The image processing circuit includes a cropping unit 25 that crops an image of an original from a reading-area which is scanned by the scanning unit 21 and read by the original reading unit 23.

The image reading apparatus 11 also includes an image output unit 27. The image output unit 27 gives a filename to image data, which has been read, and stores the resultant image data in a storage unit 43 serving as a memory or an USB memory connected to a later-described USB connector 71 (shown in FIG. 3 described later). Alternatively, the image output unit 27 sends the resultant image data to the image forming apparatus 12 or to an external device through the network by the communication unit 45. Note that the communication unit 45 is communication circuitry which can perform communication through a public telephone line, besides LAN or WAN. The transmission/reception of image data through the public telephone line corresponds to the facsimile function.

Notably, the image reading apparatus 11 includes a character recognition unit 29. The character recognition unit 29 recognizes a character in a cropped image of each card and outputs character data while a card multi-crop scan described later is executed. The image output unit 27 attaches a filename to the character data of each card output from the character recognition unit 29 and stores the resultant character data into the storage unit 43 or an USB memory through the USB connector 71 in place of or along with the image data of the card.

An original size detection unit 31 detects the size of an original set on the original table or on the automatic document feeder. Note that a detectable original size is limited to sizes of predetermined types (the above-mentioned standard size).

As shown in FIG. 1, an operation display unit 51 including a liquid crystal display panel and a touch panel is provided in front of the original table. In FIG. 2, the liquid crystal display panel corresponds to a display unit 51a. The touch panel covering the display surface of the liquid crystal display panel corresponds to an operation key 51b.

The control unit 41 performs controls of each component, such as the detection of the size of an original by the original size detection unit 31, scanning of an original by the scanning unit 21, reading of an image by the original reading unit 23, a display on the display unit 51a, and reception of an operation by the operation key 51b. The control unit 41 is control circuitry including a CPU for controlling the components mentioned above.

The image forming apparatus 12 includes an image receiving unit 61 that receives an image read by the image reading apparatus 11 or image data sent from an apparatus other than the image reading apparatus 11. The image forming apparatus 12 also includes an image forming unit 63 that forms a visible image on the basis of the acquired image data. The image forming unit 63 forms an image with a known method such as an electrophotographic method or an ink jet method. A sheet feed unit 65 feeds a printing sheet to the image forming unit 63, and a sheet conveyance unit 67 conveys the printing sheet fed from the sheet feed unit 65 to the image forming unit 63. The image forming unit 63 transfers the formed image onto a conveyed printing sheet, fuses the image onto the printing sheet, and outputs the resultant sheet onto a sheet output unit 69.

The operation of the image forming apparatus may be controlled by an exclusive control unit not shown in FIG. 2. However, in the present embodiment, the control unit 41 also performs the controls described above.

«Original Table and Detection of Original Size»

The original table and the detection of the size of an original placed on the original table in the present embodiment will be described below.

Figure 3:
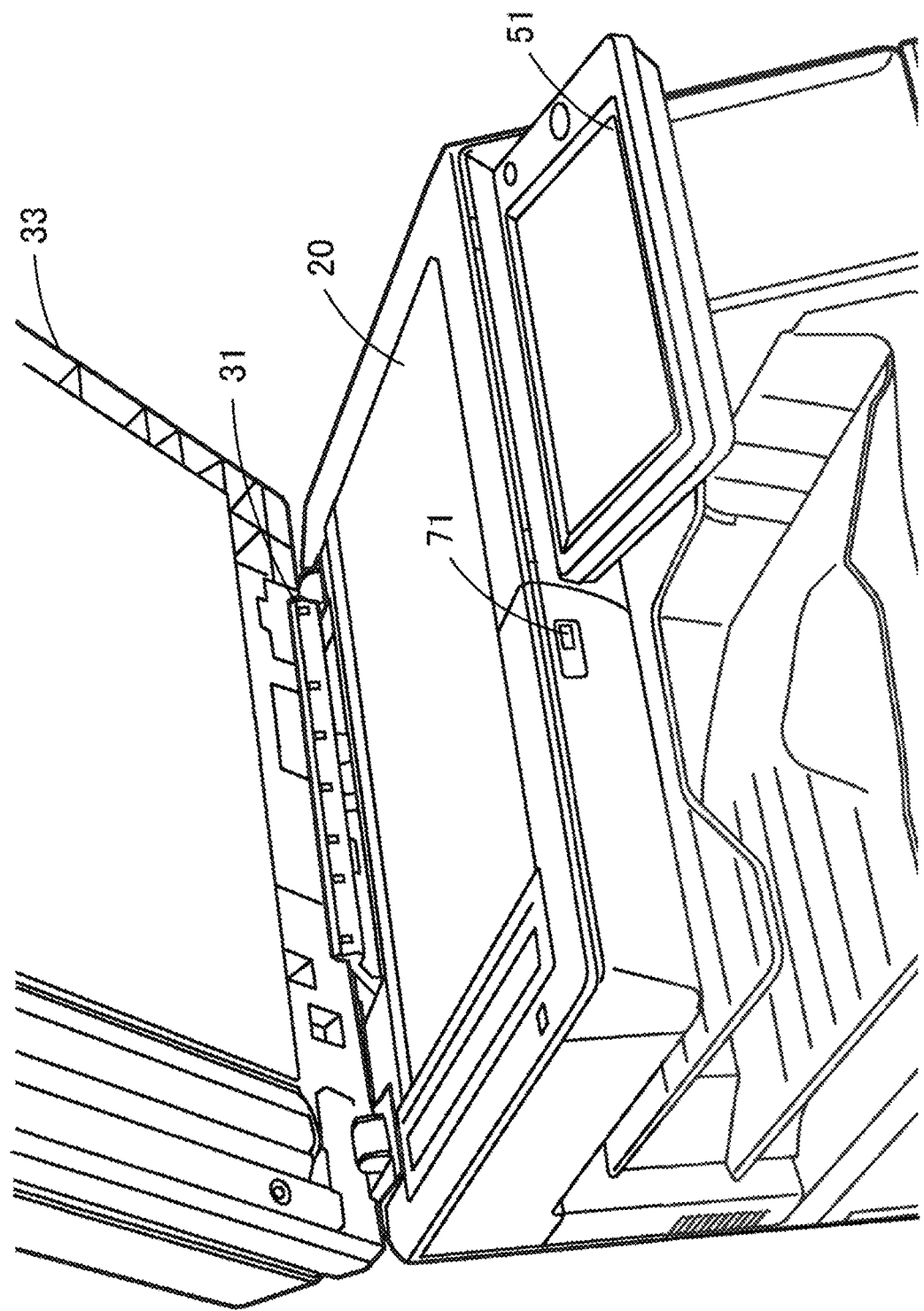
FIG. 3 is a perspective view showing an appearance of an original table and surrounding thereof in the digital multifunction peripheral shown in FIG. 1.

FIG. 3 is a perspective view showing an appearance of the original table and surrounding thereof in the digital multifunction peripheral shown in FIG. 1. In FIG. 3, the original cover 33 is opened upward, and the original table 20 is provided below the original cover 33. The original size detection unit 31 is mounted at the far side of the original table 20. When the original cover 33 is opened, i.e., when the cover opening-and-closing sensor 35 detects the open state, the original size detection unit 31 is located above the original table 20. On the other hand, when the original cover 33 is closed, the original size detection unit 31 is pressed by the original cover 33 to be moved downward. Note that FIG. 3 shows only a part of the original size detection unit 31. The other part of the original size detection unit 31 is disposed at an unillustrated portion below the original table 20. The function of the original size detection unit 31 including the unillustrated part will be described later.

The operation display unit 51 and the USB connector 71 are provided on the near side of the original table 20. The USB connector 71 is a connector for connecting an USB device such as an USB memory to the digital multifunction peripheral 10. The digital multifunction peripheral 10 has a function of reading an original placed on the original table 20 and storing the image data of the original, which has been read, into an USB memory connected to the USB connector 71.

FIG. 4 is an explanatory view showing the state in which an originals 20b is placed on a predetermined position of the original table 20 shown in FIG. 3. A user places the original onto the original table 20 with a portion to be read facing downward. The back left corner of the original table 20 serves as a reference position when the original 20b is placed, and is provided with a corner mark 20a for allowing a user to recognize the reference position.

The original reading unit 23 is circuitry including a linear image sensor in the present embodiment, and the reading direction along a line of the linear image sensor is along a direction (hereinafter referred to as a main scanning direction) indicated by an arrow M in FIG. 4. The scanning unit 21 moves in a direction orthogonal to the main scanning direction, that is, a direction (hereinafter referred to as a sub-scanning direction) indicated by an arrow S in FIG. 4.

Figure 5A:
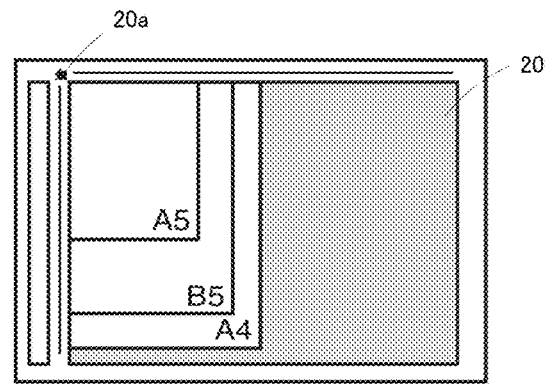
FIG. 5A is an explanatory view showing locations in the case where A5, B5, and A4 originals are longitudinally placed on the original table shown in FIG. 3.
Figure 5B:
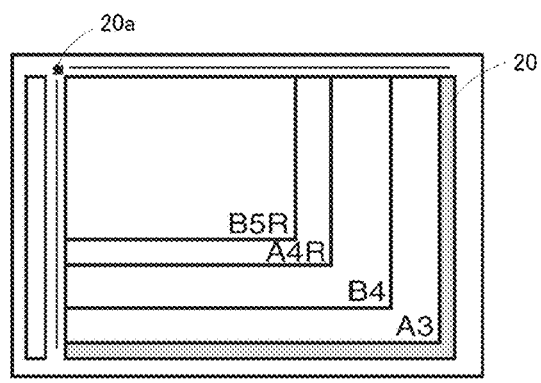
FIG. 5B is an explanatory view showing locations in the case where A5 to A3 originals are horizontally placed on the original table shown in FIG. 3.

FIG. 5A is an explanatory view showing locations when A5, B5, and A4 originals are placed on the original table 20. In this case, a longitudinal direction means a direction in which a short side of a rectangular original extends along the sub-scanning direction. The user places an original in such a way to align the top corner of the original with the corner mark 20a, whatever size it has. Further, FIG. 5B is an explanatory view showing locations when A5 to A3 originals are placed on the original table 20. In this case, a lateral direction means a direction in which a long side of an original extends along the sub-scanning direction. The user places an original in such a way to align the top corner of the original with the corner mark 20a, whatever size it has.

Figure 5C:
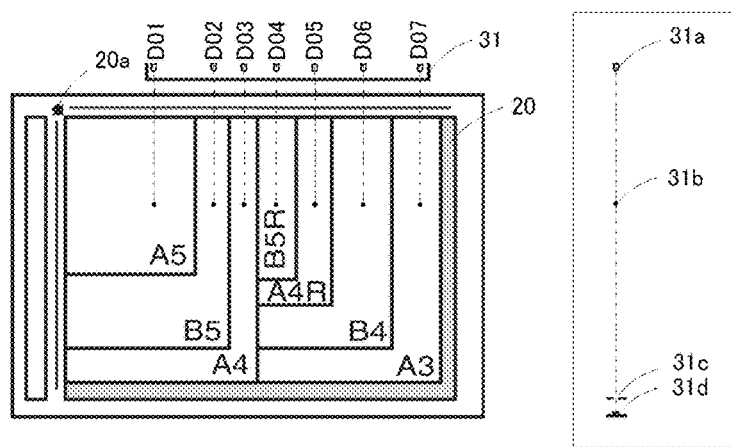
FIG. 5C is an explanatory view showing that, when originals with sizes in AB series are placed on the original table shown in FIG. 3, an original size detection unit detects the sizes thereof.

FIG. 5C is an explanatory view showing the state in which, when originals in AB series are placed on the original table 20, the original size detection unit 31 detects the size of the originals.

The original size detection unit 31 includes seven light-emitting elements D01 to D07 arranged along the sub-scanning direction. Each of the light-emitting elements D01 to D07 emits light obliquely downward to the near side from top at the far side of the original table 20. The emitted light passes through the original table 20 made of transparent glass from top to bottom. The emitted light then passes through a slit formed below the original table 20 at the near side, and reaches a corresponding light-receiving element.

Seven slits and seven light-receiving elements are arranged along the sub-scanning direction so as to correspond to the light-emitting elements D01 to D07. The arrangement relation of a set of a light-emitting element, a slit, and a light-receiving element as viewed from top is illustrated at the right part in FIG. 5C. This arrangement relation is illustrated as enclosed by a rectangle.

Infrared light is radiated toward the near side with a certain spread from the light-emitting element 31a composed of an infrared light-emitting diode. Out of the infrared light, a beam of infrared light radiated toward the top surface 31b of the original table passes through the original table 20 from the top surface to the bottom surface while refracting, and enters the light-receiving element 31d through the slit 31c formed below the original table 20 at the near side. The slit 31c is formed to block infrared light emitted from the adjacent light-emitting element.

Seven infrared beams emitted from seven light-emitting elements toward the corresponding seven light-receiving elements are illustrated by two-dot-chain lines in FIG. 5C. When an original is placed on the original table 20, infrared beam is blocked by the original at the portion where the original is placed, and thus, the infrared beam does not reach the light-receiving element. In the case where the image reading apparatus 11 is in a stand-by state and the cover opening-and-closing sensor 35 detects the closed state of the original cover 33, the control unit 41 sequentially reads whether or not an infrared beam reaches the seven light-receiving elements in the original size detection unit 31. Each infrared beam detects the presence/absence of an original on a plurality of different locations. The size of an original placed on the original table 20 can be determined by a pattern indicating whether or not each infrared beam reaches the corresponding light-receiving element. Each infrared beam is referred to as a detection beam below in some cases. When the cover opening-and-closing sensor 35 detects the closed state, the control unit 41 stops reading of each infrared beam, and keeps the size of the original based on the last read detection beam. When the cover opening-and-closing sensor 35 detects the open state, the control unit 41 sequentially reads each infrared beam again.

Figure 6A:
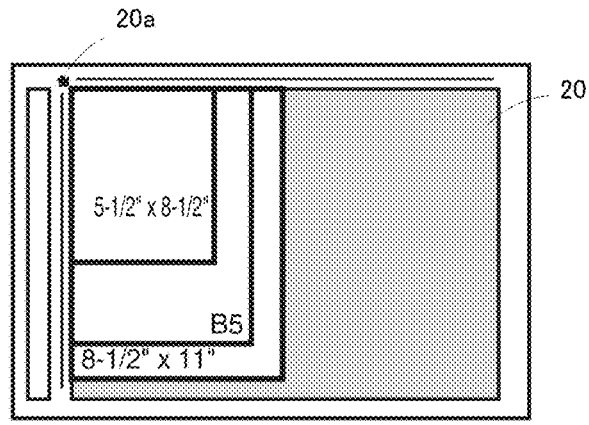
FIG. 6A is an explanatory view showing locations in the case where 5.5"×8.5", B5, and 8.5"×11" originals are longitudinally placed on the original table shown in FIG. 3.
Figure 6B:
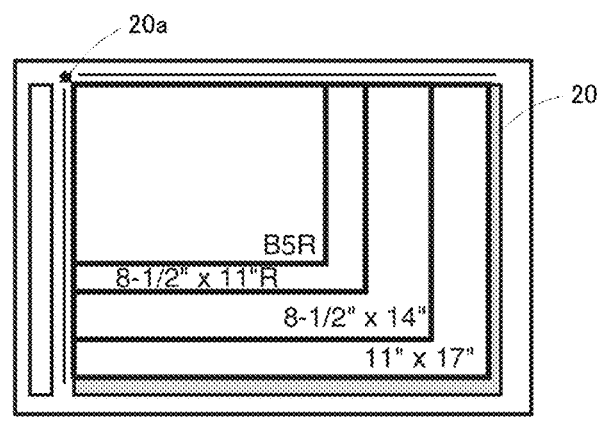
FIG. 6B is an explanatory view showing locations in the case where originals with sizes in inch series and B5 original are horizontally placed on the original table shown in FIG. 3.
Figure 6C:
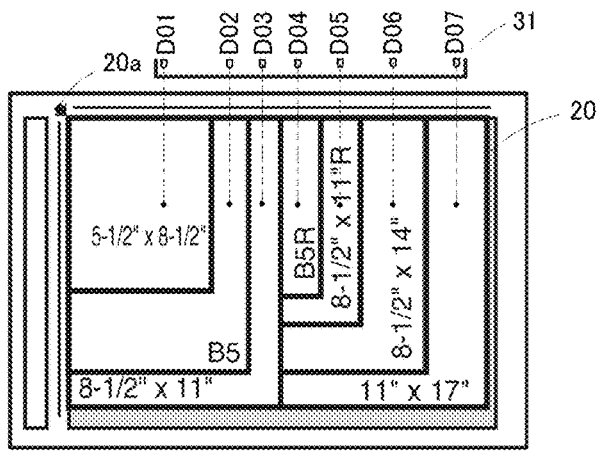
FIG. 6C is an explanatory view showing that, when originals in inch series and B5 original are placed on the original table shown in FIG. 3, an original size detection unit detects the sizes thereof.

FIGS. 5A to 5C show the determination of each size in AB series, and FIGS. 6A to 6C show the determination of B5 size and sizes in inch series corresponding to the sizes in FIGS. 5A to 5C. Notably, which one of a size in AB series and a size in inch series is detected is selectively set according to the situation of a customer using the digital multifunction peripheral 10.

FIG. 7 is an explanatory diagram showing patterns of presence/absence of detection beams corresponding to each size (see FIG. 5C) of an original in AB series. In FIG. 7, items D01 to D07 in the horizontal direction indicate whether or not an infrared beam is detected by the light-receiving element corresponding to the light-emitting element in FIG. 5C. The items in the vertical direction in FIG. 7 indicate sizes. A circle (○) in FIG. 7 indicates that a detection beam reaches a light-receiving element, that is, a detection beam is present. A cross mark (X) in FIG. 7 indicates that a detection beam does not reach a light-receiving element, that is, a detection beam is not present.

FIG. 8 is an explanatory diagram showing patterns of presence/absence of detection beams corresponding to each size in inch series and B5 size (see FIG. 6C).

FIG. 9 shows a pattern of presence/absence of detection beams different from any patterns in FIGS. 7 and 8. As described later, when the detection pattern in FIG. 9 which does not correspond to any one of standard size originals is obtained, it may be determined that multiple originals 20 are placed on the original table 20, and a multi-crop scan may be performed.

«Reading-Area of Original»

A reading-area from which an image of an original is read by the original reading unit 23 will be described.

The control unit 41 determines a reading area, i.e. an area which should be read by the original reading unit 23 on the basis of an original size detected by the original size detection unit 31. As shown in FIGS. 5A, 5B, 6A, and 6B, the reading-area corresponds to an area where an original is placed on the original table 20.

Figure 10:
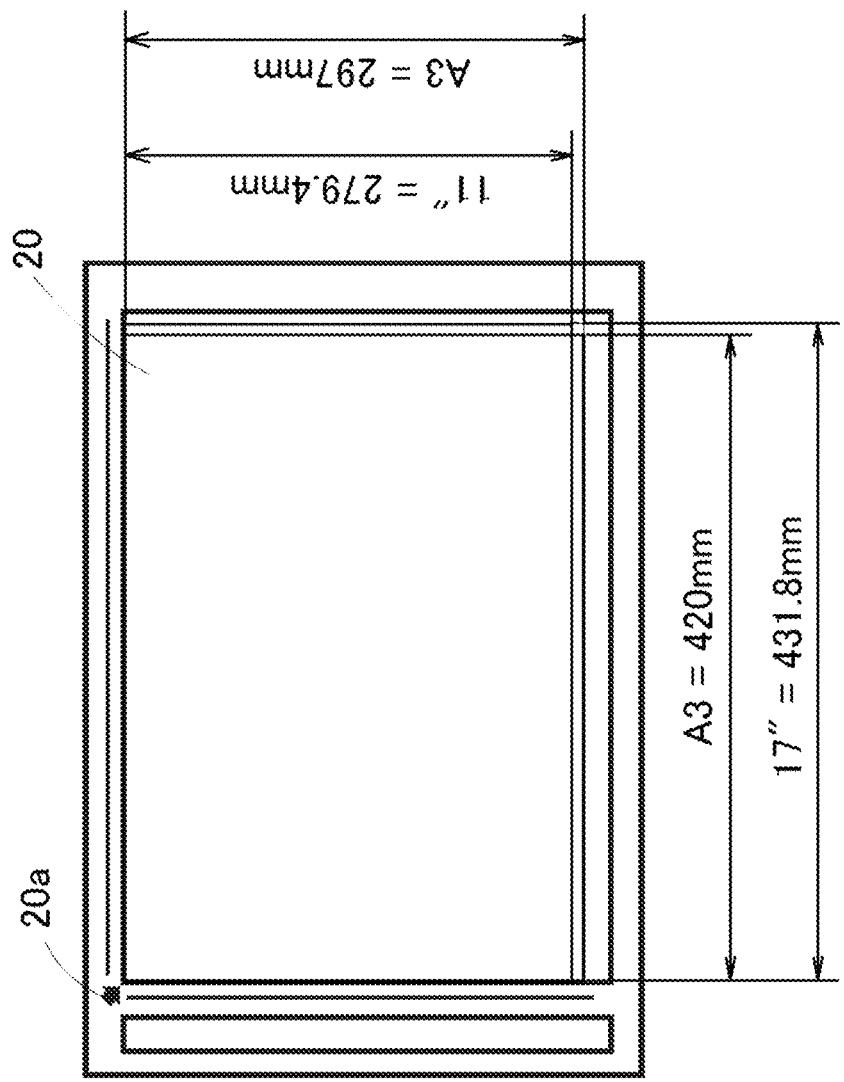
FIG. 10 is an explanatory view showing a reading-area corresponding to maximum size originals respectively shown in FIGS. 5B and 6B.

FIG. 10 is an explanatory view showing a reading-area corresponding to the maximum original size, that is, A3 size and 11"×17" size, shown in FIGS. 5B and 6B respectively. As shown in FIG. 10, an A3 size has an area with a length of 297 mm in the main scanning direction and 420 mm in the sub-scanning direction. A 11"×17" size has an area with a length of 279.4 mm in the main scanning direction and 431.8 mm in the sub-scanning direction. As described above, the 11"×17" size is slightly smaller in the main scanning direction and slightly larger in the sub-scanning direction than the A3 size.

Strictly speaking, a reading-area is determined to be somewhat smaller than an original size so as to form a margin of about 1 to 10 mm around each original. This is to prevent an edge of an original from appearing on the read image as a shadow.

«Operation Procedure for Reading Standard Size Original»

Subsequently, one example of an operation for reading an image of an original which has an ordinary standard size and is placed on the original table 20 will be described. While the present invention relates to a multi-crop scan, the example of the operation for reading an ordinary original will be described first, which facilitates understanding of the features of the present invention relating to a multi-crop scan.

FIGS. 11A to 11I are explanatory views showing a display on the operation display unit 51 and an operation procedure required to be performed by a user when the digital multi-function peripheral 10 reads a standard size original.

FIG. 11A shows one example of an operation screen displayed on the operation display unit 51 while the image reading apparatus 11 is in a stand-by mode. Operation keys (operation buttons) concerning various functions of the digital multifunction peripheral 10 including the image reading apparatus 11 are displayed on the operation screen. When the user touches these operation keys, he/she can execute various functions. Out of these functions, the case where an original is read and the read image is stored in an USB memory connected to the USB connector 71 will be described as one example of an operation procedure for reading an original.

To read an original and store the image data thereof in the USB memory, the user touches the operation key of "Scan to HDD/USB" on the operation screen shown in FIG. 11A (see FIG. 11B). The fingers illustrated in FIG. 11B indicate the operation of the user touching the operation key of "Scan to HDD/USB" with his/her finger F. In the description below, the user's touch operation on operation keys is similarly indicated by using the illustration of fingers.

Figure 11C:
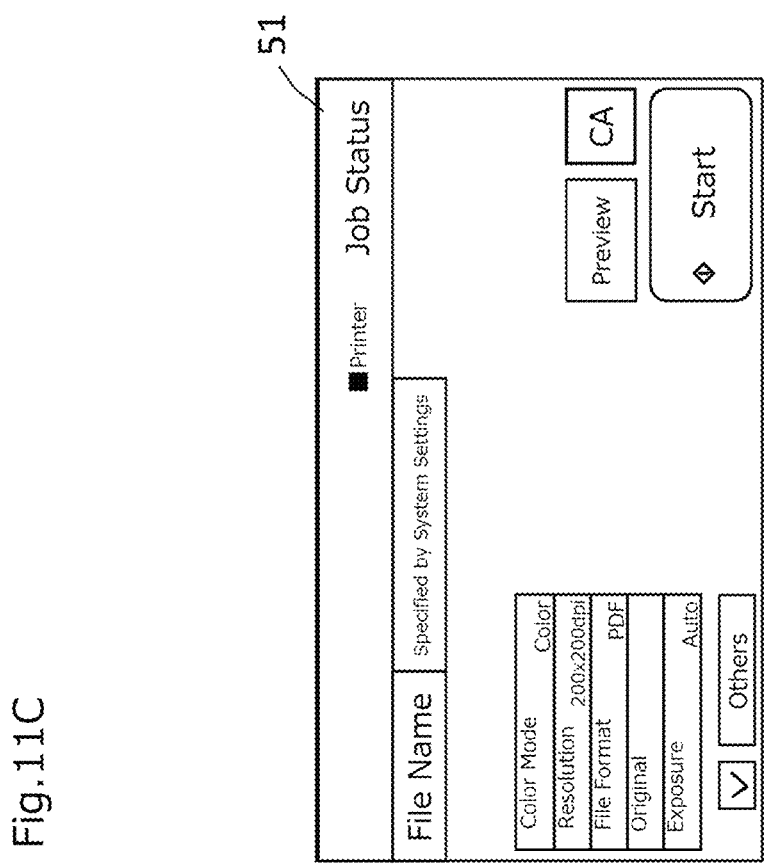
FIG. 11C is a third explanatory view showing the operation procedure of the digital multifunction peripheral shown in FIG. 1 when a standard size original is to be read.

In response to the operation shown in FIG. 11B, the control unit 41 displays the operation screen shown in FIG. 11C on the operation display unit 51. Operation keys concerning the setting of reading, such as "File Name", "Color Mode", "Resolution", "File Format", "Original", and "Exposure", are disposed on the operation screen shown in FIG. 11C. A "CA" key for resetting the setting and a "Start" key for starting the reading operation are also disposed.

The "File Name" is the operation key used by the user to designate a file name of image data to be stored in the USB memory. The "Color Mode" is the operation key for selecting in which one of the modes of color, gray scale, and monochrome the original should be read. The "Resolution" is the operation key for selecting resolution in reading. The "Format" is the operation key for selecting a format of the image data to be output, such as PDF, TIFF, or JPEG. The "Original" is the operation key for designating an original size or a double-side original by a user. The "Exposure" is the operation key for selecting exposure in reading an original. The user can perform settings using these operation keys, as needed.

When the user places a standard size original at a predetermined position on the original table 20, the original size detection unit 31 outputs a detection pattern according to the size of the original by seven detection beams. The control unit 41 determines the size of the original placed on the original table 20 on the basis of the detection pattern.

When the user touches the "Start" key on the operation screen shown in FIG. 11C (see FIG. 11D), the control unit 41 starts the reading operation of the original in response to this operation. The control unit 41 determines a reading-area according to the original size and reads the original by controlling the scanning unit 21 and the original reading unit 23. The control unit 41 also displays a message of "Scanning original. (Pg. No. 1)" and an operation key of "Cancel Scan" on the operation display unit 51 during the reading. The "(Pg. No. 1)" in the message indicates that the first page is currently read.

Figures 11D, 11E:
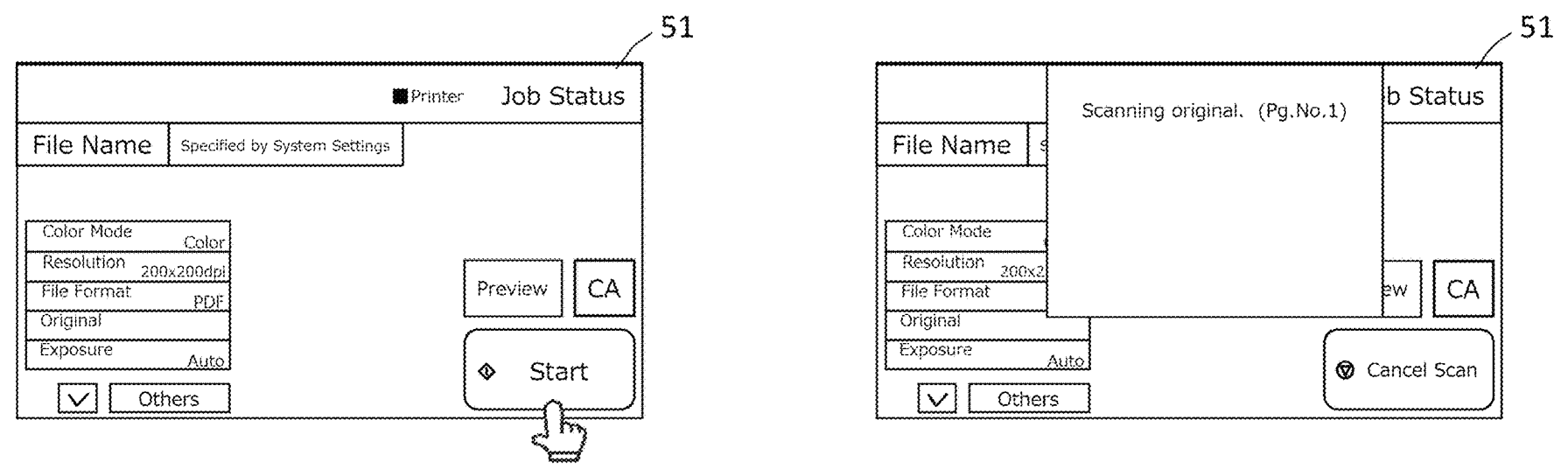
Figure 11F:
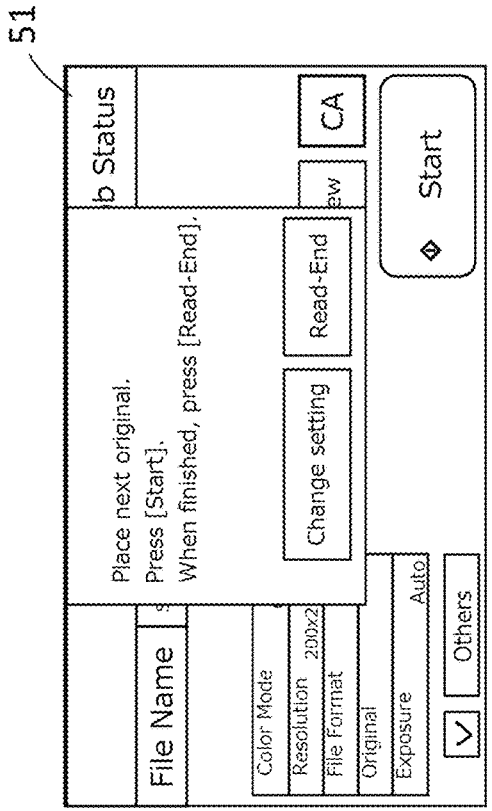
FIG. 11F is a sixth explanatory view showing the operation procedure of the digital multifunction peripheral shown in FIG. 1 when a standard size original is to be read.
Figure 11G:
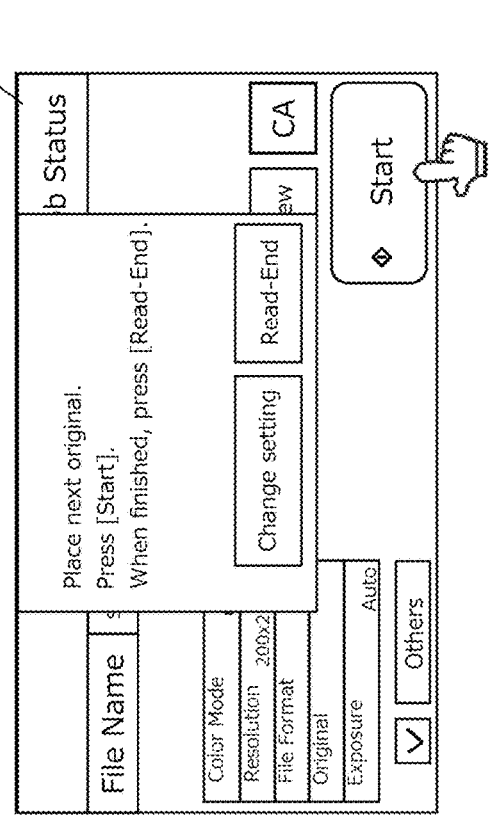
FIG. 11G is a seventh explanatory view showing the operation procedure of the digital multifunction peripheral shown in FIG. 1 when a standard size original is to be read.
Figure 11I:
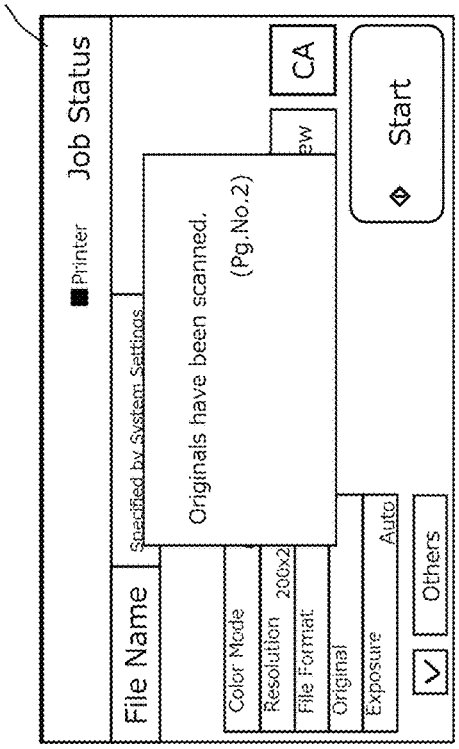
FIG. 11I is a ninth explanatory view showing the operation procedure of the digital multifunction peripheral shown in FIG. 1 when a standard size original is to be read.

When the reading of the first original is finished, the control unit 41 then displays, on the operation display unit 51, a screen for asking the user to select whether to end the reading, to change the setting for the next reading, or to start the next reading, as shown in FIG. 11F.

When the user then opens the original cover 33 and places the next original on the original table 20, the original size detection unit 31 outputs a pattern of detection beams according to the size of the original which is newly set. When the user presses the "Start" key with this state (see FIG. 11G), the control unit 41 starts the reading of the next original in response to this operation. The control unit 41 causes the image reading unit 23 to read the original in the reading-area determined based on the original size. While reading, the control unit 41 displays the message of "Scanning original." on the operation display unit 51 as in FIG. 11E. However, during the second reading, "Pg. No. 2" is displayed in place of "Pg. No. 1" in FIG. 11E to notify the user that this is the second reading.

When the reading of the second original is finished, the control unit 41 then displays the screen same as that in FIG. 11F on the operation display unit 51 to ask the user to select whether to end the reading, to change the setting for the next reading, or to start the next reading.

When the user touches the operation key of "Read-End" (see FIG. 11H), the control unit 41 stores the image data of the two originals, which have been read, into the USB memory connected to the USB connector 71. After the writing on the USB memory is finished, the control unit 41 displays a message of "Originals have been scanned. (Pg. No. 2)" on the operation display unit 51 (see FIG. 11I).

Figure 12:
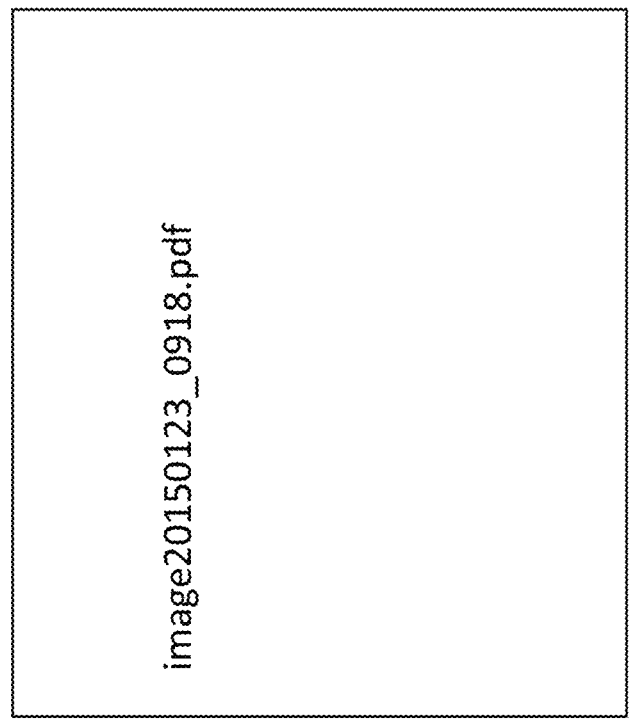
FIG. 12 is an explanatory view showing the state in which image data of the standard size original, which has been read, is stored in an USB memory connected to the digital multifunction peripheral shown in FIG. 1.

As shown in FIG. 12, the image output unit 27 stores a PDF file formed by combining two pages of the read original into one file into the USB memory. The file name includes information of date and time at which the originals are scanned and read. That is, the part "20150123" in the file name of "image20150123_0918.pdf" shown in FIG. 12 indicates the date of Jan. 23, 2015. The part "0918" subsequent to the date indicates the time of 9:18.

«Operation Procedure for Reading Standard Size Original»

The above-mentioned process in which the control unit 41 executes reading of an original will comprehensively be described.

Figure 13:
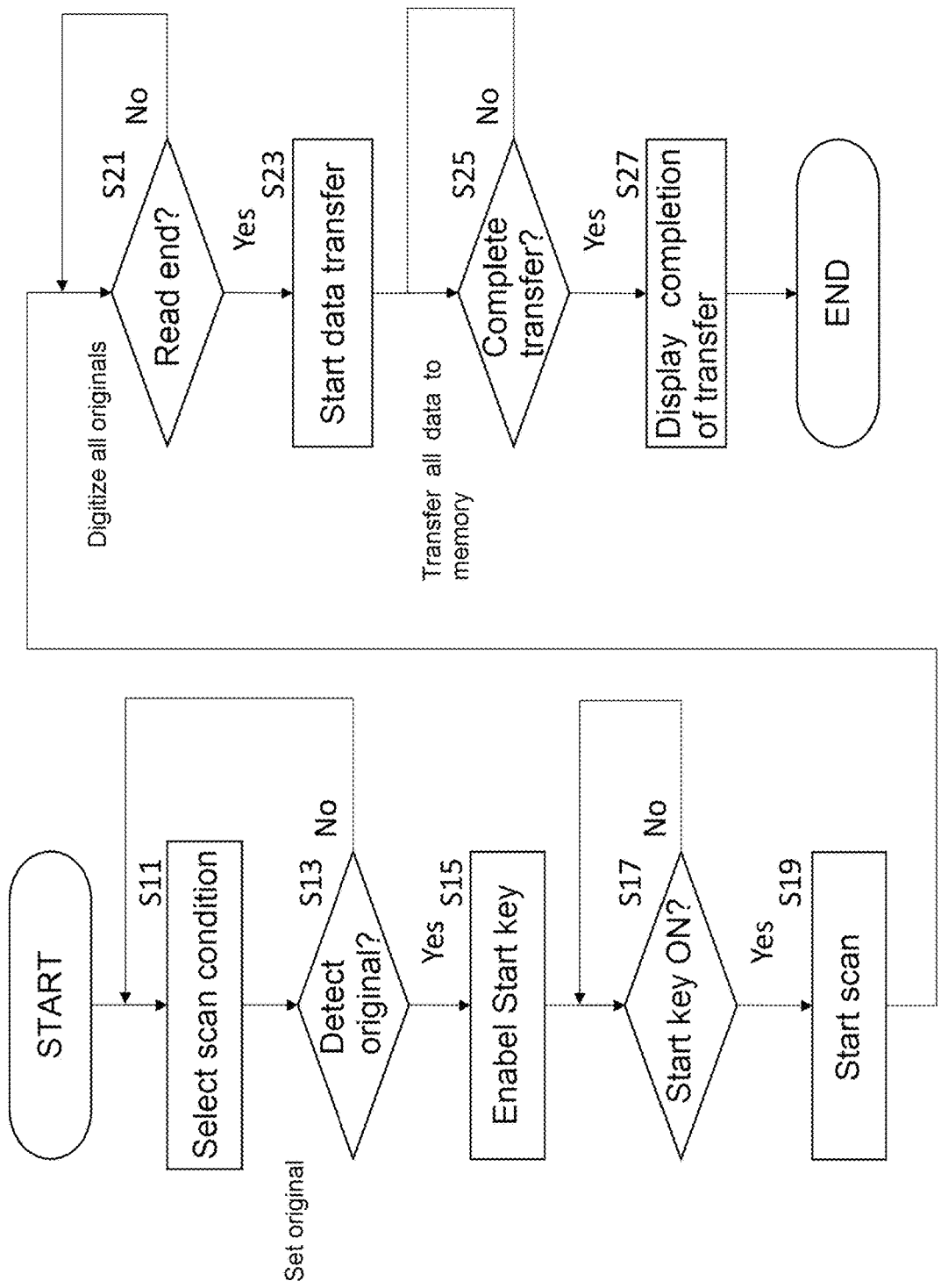
FIG. 13 is a flowchart showing a process executed by a control unit when the digital multifunction peripheral according to the present invention reads a standard size original.

FIG. 13 is a flowchart showing the process executed by the control unit when the digital multifunction peripheral 10 reads a standard size original. Although the digital multifunction peripheral 10 simultaneously performs other processes (for example, an image forming process) in some cases, the description of such processes will be omitted. As shown in FIG. 13, the control unit 41 displays a screen for allowing a user to select the original reading condition on the operation display unit 51 (step S11, corresponding to FIGS. 11A to 11C), and waits until the original size detection unit 31 detects an original placed on the original table 20 (step S13).

After the original size detection unit 31 detects that an original is placed on the original table 20 and the size of this original (Yes in step S13), the control unit 41 validates the reception of an operation on the "Start" key displayed on the operation display unit 51 (step S15). Then, the control unit 41 waits until the "Start" key is pressed (step S17).

After the "Start" key is pressed (Yes in step S17, corresponding to FIG. 11D), the control unit 41 determines a reading-area of the original, and starts scanning and reading of the original (step S19, corresponding to FIG. 11E). Every time a single original is scanned, the control unit 41 asks the user to select whether to perform the next reading or end the reading (step S21, corresponding to FIG. 11F). When the "Start" key is pressed, the control unit 41 performs next reading (loop of No in step S21, corresponding to FIG. 11G).

Figure 11H:
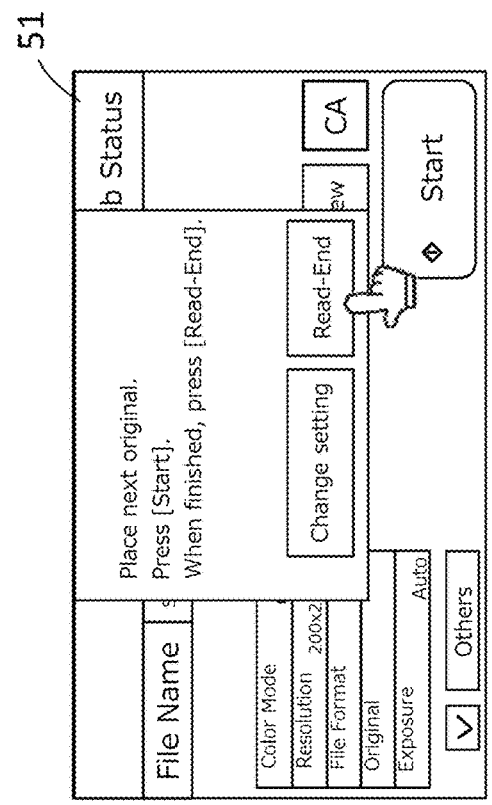
FIG. 11H is an eighth explanatory view showing the operation procedure of the digital multifunction peripheral shown in FIG. 1 when a standard size original is to be read.

On the other hand, when the "Read-End" key is pressed, the control unit 41 ends the reading (Yes in step S21, corresponding to FIG. 11H).

Then, the control unit 41 starts the transfer of the image data of the original, which has been read, into the memory (step S23). In the present embodiment, the image data is transferred to the USB memory connected to the USB connector 71 through the image output unit 27. However, this is only one example. In the case where the copying function is selected, the image data is transferred to the image forming apparatus 12 through the image output unit 27. Note that the image data may temporarily be stored in the storage unit 43 as a buffer. In the case where the scanner function is selected, the image data may be transmitted to an external device connected to a network through the communication unit 45. In the case where the image filing function is selected, the image data is transferred to the storage unit 43 and stored therein. In the case where the facsimile function is selected, the image data is transmitted through the communication unit 45 and a public line.

After the transfer of the image data is completed (Yes in step S25), the control unit 41 notifies the user of the completion of the transfer (step S27, corresponding to FIG. 11I), and then, ends the process.

«Operation Procedure of Multi-Crop Scan»

Next, an operation procedure of a multi-crop scan according to the present embodiment will be described.

FIGS. 14A to 14F, 15, and 16A to 16C are explanatory views showing the operation procedure when the digital multifunction peripheral 10 performs a single multi-crop scan.

Figures 14A, 14B:
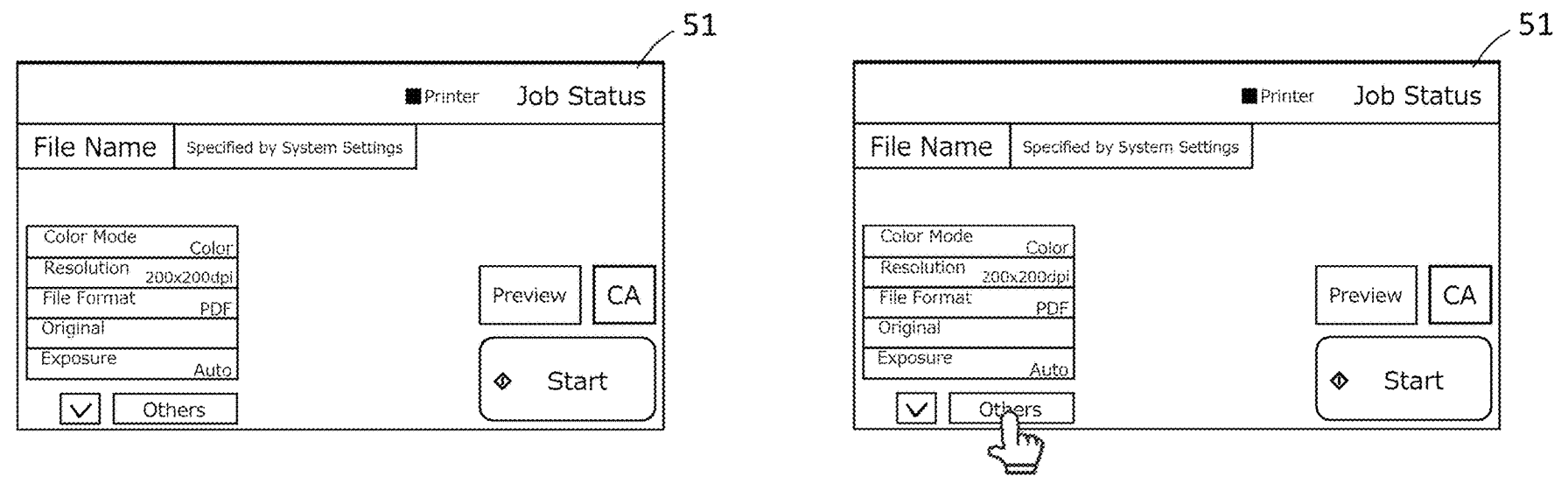
Figure 14C:
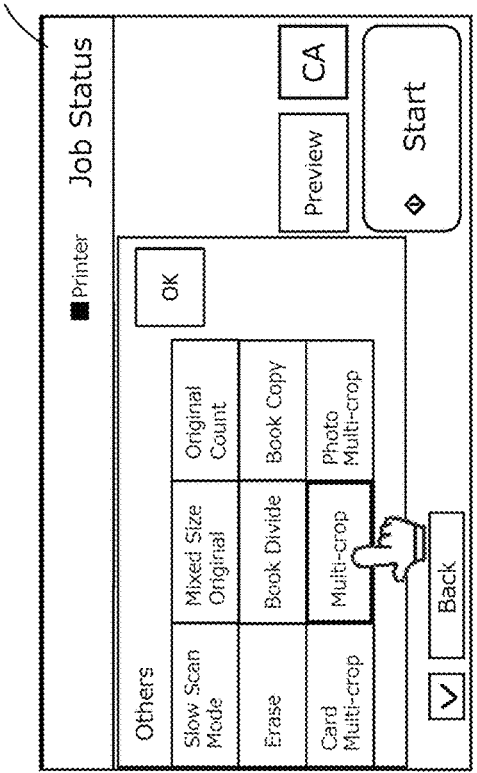
FIG. 14C is a third explanatory view showing the operation procedure of the digital multifunction peripheral shown in FIG. 1 when a single multi-crop scan is executed.

When performing the multi-crop scan, the digital multifunction peripheral 10 which has been in the stand-by mode reaches the screen in FIG. 14A which is similar to the screen in FIG. 11C through the operation screen in FIG. 11A and the operation screen in FIG. 11B. When the user touches an "Others" key on the screen in FIG. 14A (see FIG. 14B), the control unit 41 displays the screen in FIG. 14C on the operation display unit 51 in response to this operation. A "Multi-crop" key is displayed as one of other functions on the screen in FIG. 14C. Notably, while a "Photo Multi-crop" key and a "Card Multi-crop" key also relate to the present invention, the functions thereof will be described later, and the "Multi-crop" will firstly be described. Note that a "Photo Multi-crop" key which also relates to the present embodiment will be described later, and the "Multi-crop" will firstly be described. Note that, in the present specification, the "Photo Multi-crop" is also referred to as "inversion multi-crop". On the other hand, ordinary multi-crop is also referred to as "non-inversion multi-crop".

Figure 14D:
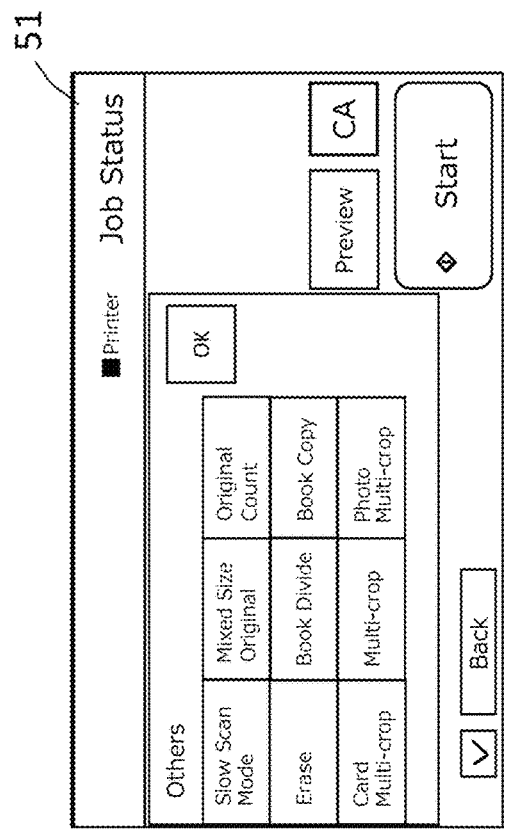
FIG. 14D is a fourth explanatory view showing the operation procedure of the digital multifunction peripheral shown in FIG. 1 when a single multi-crop scan is executed.
Figure 14F:
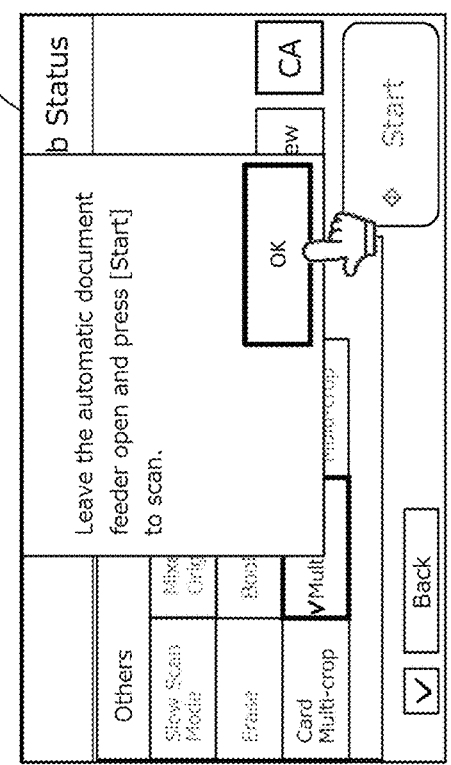
FIG. 14F is a sixth explanatory view showing the operation procedure of the digital multifunction peripheral shown in FIG. 1 when a single multi-crop scan is executed.
Figure 14E:
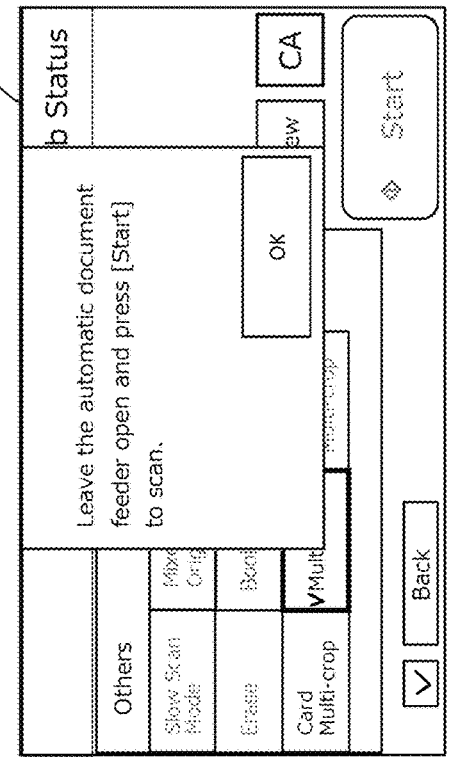
FIG. 14E is a fifth explanatory view showing the operation procedure of the digital multifunction peripheral shown in FIG. 1 when a single multi-crop scan is executed.

When the user presses the "Multi-crop" key (see FIG. 14D), the control unit 41 displays a check mark indicating that the "Multi-crop" is selected on the "Multi-crop" key in response to the operation in FIG. 14D. Then, the control unit 41 displays the message of "Leave the automatic document feeder open and press [Start] to scan." along with an "OK" key on the operation display unit 51 (see FIG. 14E). When a standard size original is to be read, the original cover 33, that is, the automatic document feeder in the above message, is closed in principle. However, in the multi-crop scan, the original is scanned with the original cover being left open in order that the area outside of the original is read as black with respect to the white or light tone base of the original. The cropping unit 25 recognizes the border of each original on the basis of the contrast between the light tone base of the original and the black color of the area outside of the original, and performs cropping.

When the user reads the message of "Leave the automatic document feeder open and press [Start] to scan." and presses the "OK" key (see FIG. 14F), the control unit 41 erases the message in response to this operation.

The user arranges multiple originals, which are the objects for the multi-crop scan, on the original table 20.

FIG. 15 is an explanatory view showing the state in which four originals 20b for the multi-crop scan are placed on the original table 20. The reference numerals 1 to 4 attached to the respective originals indicate one example of the cropping order, and these reference numerals correspond to serial numbers in filenames described later.

Figure 16A:
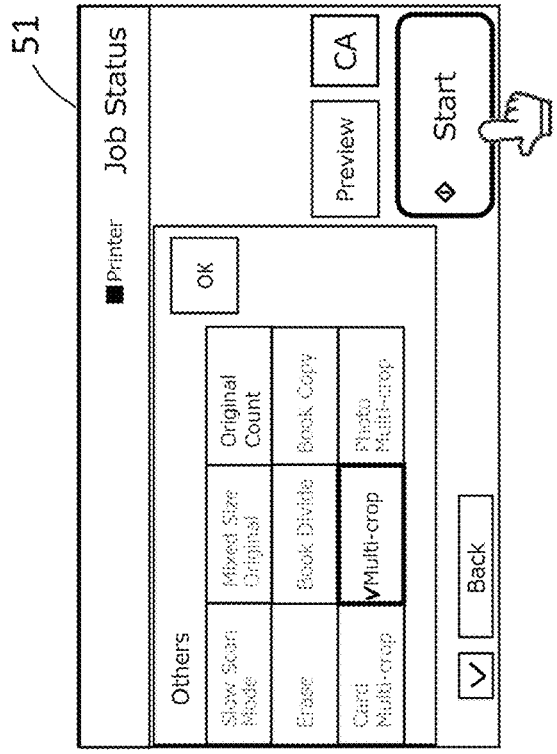
FIG. 16A is a seventh explanatory view showing the operation procedure of the digital multifunction peripheral shown in FIG. 1 when a single multi-crop scan is executed.
Figure 16B:
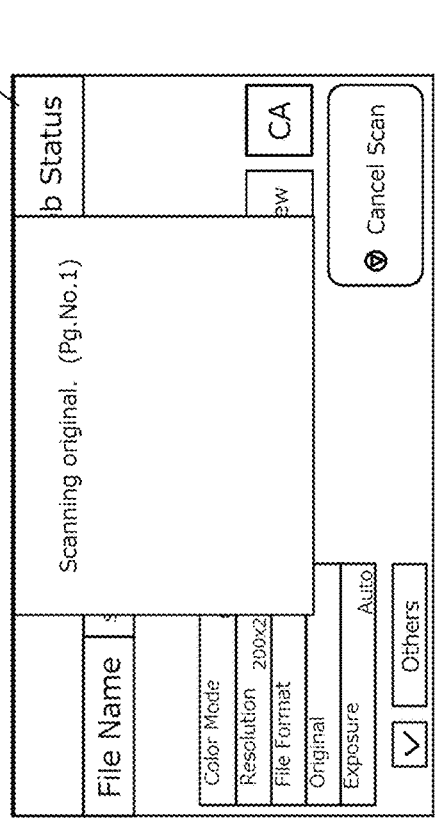
FIG. 16B is an eighth explanatory view showing the operation procedure of the digital multifunction peripheral shown in FIG. 1 when a single multi-crop scan is executed.
Figure 16C:
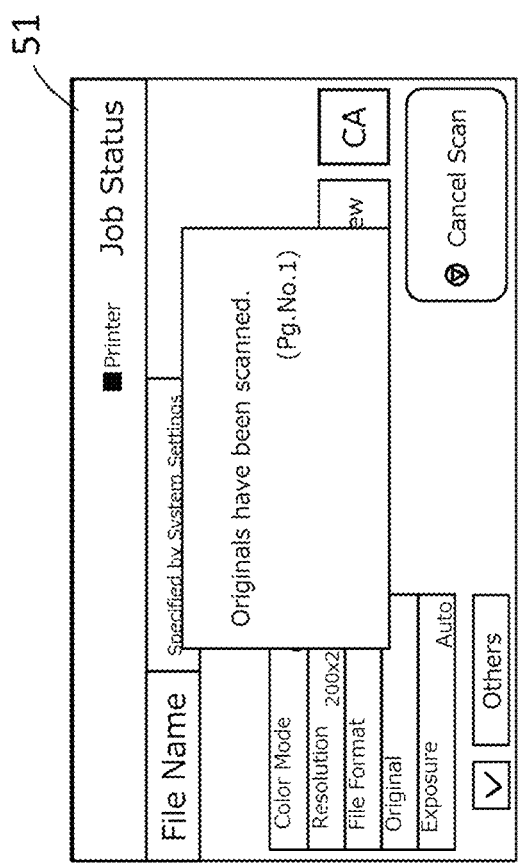
FIG. 16C is a ninth explanatory view showing the operation procedure of the digital multifunction peripheral shown in FIG. 1 when a single multi-crop scan is executed.

When the user presses the "Start" key with the original cover 33 being left open (see FIG. 16A), the control unit 41 determines the maximum area for the multi-crop scan as a reading-area and causes the scanning unit 21 and the original reading unit 23 to scan and read the four originals 20b in batch, in response to the operation in FIG. 16A. While reading, the control unit 41 displays a message of "Scanning original. (Pg. No. 1)" and an operation key of "Cancel Scan" on the operation display unit 51 as shown in FIG. 16B. The "Pg. No. 1" in the message indicates that the first batch scan is currently executed.

Notably, the control unit 41 can acquire the open state and closed state of the original cover 33 by the cover opening-and-closing sensor 35. Therefore, when the original cover 33 is closed, the control unit 41 may invalidate the "Start" key to inhibit the start of the batch scan (first embodiment).

Alternatively, when the original cover 33 is closed, the control unit 41 may display a message encouraging the user to open the original cover 33 on the operation display unit 51 (second embodiment).

Further, when the "Start" key is pressed with the original cover 33 being closed, the control unit 41 may inhibit the start of the batch scan, and at that time, display a message, which encourages the user to open the original cover 33 and again press the "Start" key, on the operation display unit 51 (third embodiment).

«Reading-Area for Multi-Crop Scan»

A reading-area of a standard size original is determined by the control unit 41 on the basis of the original size detected by the original size detection unit 31. However, when multiple originals 20b are placed on the original table 20 with a space therebetween as shown in FIG. 15, the original size detection unit 31 in the present embodiment is unable to precisely detect the size of each original.

In view of this, when the multi-crop scan is selected by the touch on the "Multi-crop" key, the control unit 41 performs the control to disregard the original size detected by the original size detection unit 31 and to read the maximum area readable by the scanning unit 21 and the image reading unit 23. Specifically, the control unit 41 determines the maximum readable area as a reading-area, regardless of the detection by the original size detection unit 31.

For example, in the present embodiment, the maximum original size in AB series is A3 which has 297 mm in the main scanning direction and 420 mm in the sub-scanning direction as shown in FIG. 10. This can be said to be the readable maximum area. More specifically, in the case where a margin of 10 mm is formed around an original, the reading-area has 277 mm, which is smaller than 297 mm by 20 mm in total at both ends, in the main scanning direction and 400 mm, which is smaller than 420 mm by 20 mm in total at both ends, in the sub-scanning direction. An image in the margin is not read.

However, the margin is formed to prevent the edge of the standard size original from being read, and when the multi-crop scan is performed to multiple originals arranged as shown in FIG. 15, there is no point in forming a margin. Therefore, when the multi-crop scan is selected, not the reading-area for A3 size but the area for A3 size with no margin, that is, the area having 297 mm in the main scanning direction and 420 mm in the sub-scanning direction, may be determined as a reading-area. In this way, the control unit 41 determines, as a reading-area for the multi-crop scan, an area larger than a reading-area in reading a standard size original of A3 size which is the maximum original size detectable by the original size detection unit (fourth embodiment).

Alternatively, in the case where the multi-crop is selected, the digital multifunction peripheral 10, which selectively sets a size of a standard size original in AB series and inch series, may set 297 mm which corresponds to A3 size and is larger than 11"=279.4 mm that is the maximum original size in inch series, as a reading-area in the main scanning direction. On the other hand, in the sub-scanning direction, 17"=431.8 mm which is the maximum original size in inch series larger than 420 mm of A3 size which is the maximum original size in AB series may be set as a reading-area. In such way, the control unit 41 may determine an area larger than the reading-area of an A3 size which is the maximum original size as a reading-area for the multi-crop scan (fifth embodiment).

Alternatively, if an area larger than the above-mentioned area can be read in either one or both of the main scanning direction and the sub-scanning direction, the maximum area thereof may be employed as a reading-area when the multi-crop is selected. In such way, the control unit 41 may determine an area larger than the reading-area of an A3 size which is the maximum original size as a reading-area for the multi-crop scan (sixth embodiment).

«Cropping Process of Original»

When the multi-crop is selected, the cropping unit 25 crops an image of each original from the image of multiple originals which have been scanned in batch. In this case, the edge, that is, the border between the original and the area outside of the original, may be determined, supposing that the original has a rectangular shape. The cropping unit 25 recognizes the border of each original on the basis of the contrast between a light tone base of the original and black color of the area outside of the original and crops the image of each original. Therefore, it is premised that there are no characters and images on the edge of the original, and the edge of the original has a light tone base. However, even if this premise is not locally established, an area of each original can precisely be cropped on the basis of the premise that the original has a rectangular shape.

From another point of view, if the premise that the edge of the original has a light tone base at any positions is established, the area of each original can precisely be cropped without presupposing that the original has a rectangular shape.

«Output of Image Data»

After the batch scan is finished, the control unit 41 stores the image data of four originals which have been read by the batch scan and cropped by the cropping unit 25 into the USB memory connected to the USB connector 71. After finishing the writing to the USB memory, the control unit 41 displays a message of "Originals have been scanned. (Pg. No. 1)" on the operation display unit 51 (see FIG. 16C).

Notably, while the "multi-crop" is a function of performing a batch scan only once (this function is referred to as single multi-crop in the present specification) in the present embodiment, a function of performing a batch scan more than once (this function is referred to as continuous multi-crop in the present specification) can be selected by another operation.

Figure 17A:
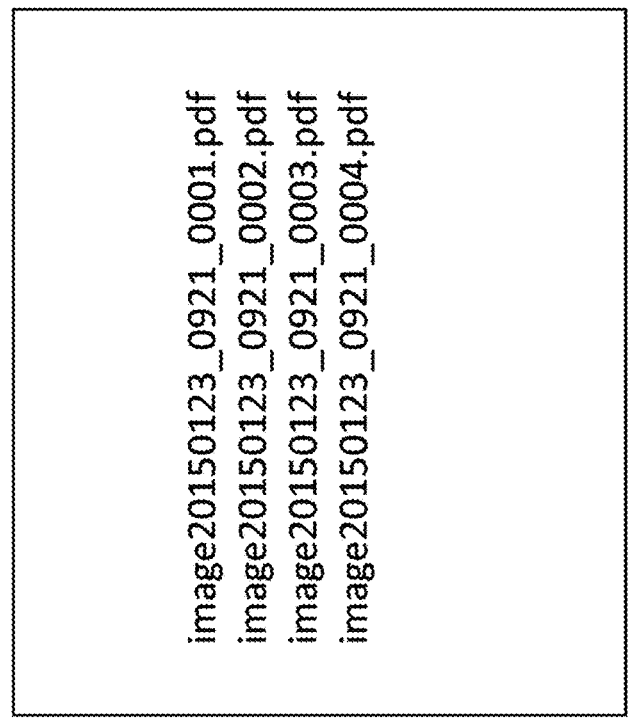
FIG. 17A is an explanatory view showing the state in which image data of the original which has been read by the single multi-crop scan is stored in an USB memory connected to the digital multifunction peripheral shown in FIG. 1.

As shown in FIG. 17A, the image data corresponding to the cropped four originals is stored in the USB memory as four files stored in one folder. This folder is newly created when the files are stored in the USB memory. The filename attached to each of the four files includes information of the date and time at which the originals are scanned in batch. The filename also includes information indicating the relation among four files. The first filename "image20150123_0921_0001.pdf" out of four files shown in FIG. 17A will be described. The part "20150123" indicates the date of Jan. 23, 2015, and the subsequent part "0921" indicates the time of 9:21. Since the four files have been read by the batch scan, they have the information of the same date and time. The files also include serial numbers of 0001 to 0004 indicating the relation thereof at the end of the filename of each file. Due to the serial number attached to each filename, the user can easily recognize that the image data is a series of image data.

In addition, the name of the folder storing these files includes the information of the date and time at which the originals are scanned in batch (seventh embodiment).

Figure 17B:
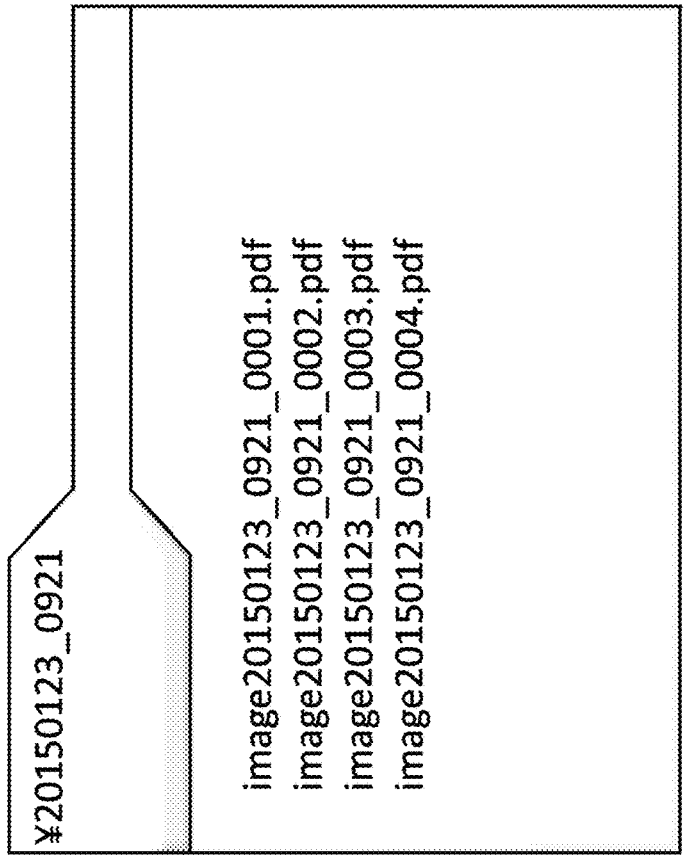
FIG. 17B is an explanatory view showing another embodiment in which image data of the original which has been read by the single multi-crop scan is stored in an USB memory connected to the digital multifunction peripheral shown in FIG. 1.

FIG. 17B is an explanatory view showing an embodiment different from FIG. 17A. In FIG. 17A, the image data of each original cropped through a batch scan is stored in a newly-created folder. On the other hand, in FIG. 17B, each file is stored without creating a folder. Note that the filenames of four image data pieces include information of the date and time at which the originals are scanned in batch, as in FIG. 17A. The filenames also include serial numbers as information indicating the relation of four files. Only from the filenames, the relation of four files is recognized, since the filenames include the same date and same time (eighth embodiment).

The serial number attached at the end of each file in FIGS. 17A and 17B is merely one example of the information indicating relation. The information indicating relation may be other than the serial number, such as an alphabet. The position where this information is attached is not limited to the end of the filename. For example, this information may be attached in the middle of the filename, such as before or after the date information.

As still another embodiment, image data may be stored as being associated with one another in a known linked list to enable a user to recognize the relation of a series of image data (ninth embodiment). The format is not limited to a linked list, and any format is applicable, so long as multiple files can be stored in association with one another.

Further, in FIG. 17A, the folder name and the filename have the information of the same date and same time, which is somewhat redundant. For example, the date information or time information which is also included in the folder name or both of them may be eliminated from the filename.

The present embodiment describes, as one example, the case in which image data is stored in an USB memory. However, there can be other embodiments. For example, in the case where image data is transmitted to an external device connected through a network and stored therein, a filename similar to the above may be attached, a folder may newly be created, and the image data may be stored in the folder, as in FIG. 17A. Alternatively, the image data may be stored without creating a folder as in FIG. 17B.

«Operation Procedure of Reading Original by Multi-Crop Scan»

The process in which the control unit 41 executes the above-mentioned multi-crop scan will comprehensively be described.

FIG. 18 is a flowchart showing the process executed by the control unit when the multi-crop is selected. As shown in FIG. 18, the control unit 41 displays a screen for allowing a user to select the scanning condition and multi-crop on the operation display unit 51 (step S31, corresponding to FIGS. 14A to 14D). Then, the control unit 41 requests the user to leave the original cover open (corresponding to FIGS. 14E to 14F). The control unit 41 then waits until multiple originals are arranged on the original table 20 (step S33, corresponding to FIG. 15) and the "Start" key is pressed (step S35).

Although the original size detection unit 31 cannot precisely detect the sizes of the originals arranged on the original table 20, it can detect whether or not the originals are placed on the original table 20.

When the "Start" key is pressed (Yes in step S35, corresponding to FIG. 16A), the control unit 41 determines the maximum readable area as a reading-area (step S37), and then, starts scanning and reading of the originals (step S39, corresponding to FIG. 16B). After finishing the reading (Yes in step S41), the control unit 41 controls such that the cropping unit 25 crops the image data of each original (step S43).

Then, the control unit 41 starts the transfer of the image data of the originals, which have been read, to a memory (step S45). In the present embodiment, the image data is transferred to a USB memory connected to the USB connector 71. However, this is merely one example. In the multi-crop scan, if the copying function is selected, the image data is transferred to the image forming apparatus 12 through the image output unit 27, as in the case of a standard size original. In the case where the scanner function is selected, the image data may be transmitted to an external device connected to a network through the communication unit 45. In the case where the image filing function is selected, the image data is transferred to the storage unit 43 and stored therein. In the case where the facsimile function is selected, the image data is transmitted through the communication unit 45 and a public line.

After the transfer of the image data is completed (Yes in step S45), the control unit notifies the user of the completion of the transfer (step S47, corresponding to FIG. 16C), and then, ends the process.

«Function of Original Size Detection Unit in Multi-Crop Scan»

The original size detection unit 31 is supposed to detect a standard size original. Therefore, when multiple originals are arranged for the multi-crop scan, the original size detection unit 31 is unable to precisely detect the size of each original.

Figure 19A:
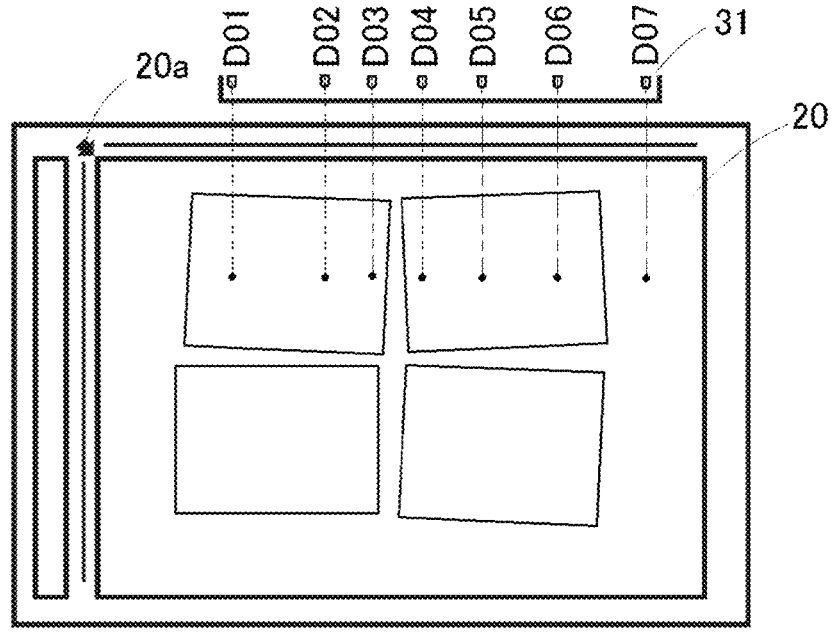
FIG. 19A is an explanatory view showing one embodiment in which the original size detection unit according to the present invention detects multiple originals placed on the original table.

FIG. 19A is an explanatory view showing one embodiment in which the original size detection unit 31 detects multiple originals placed on the original table 20.

Figure 19B:
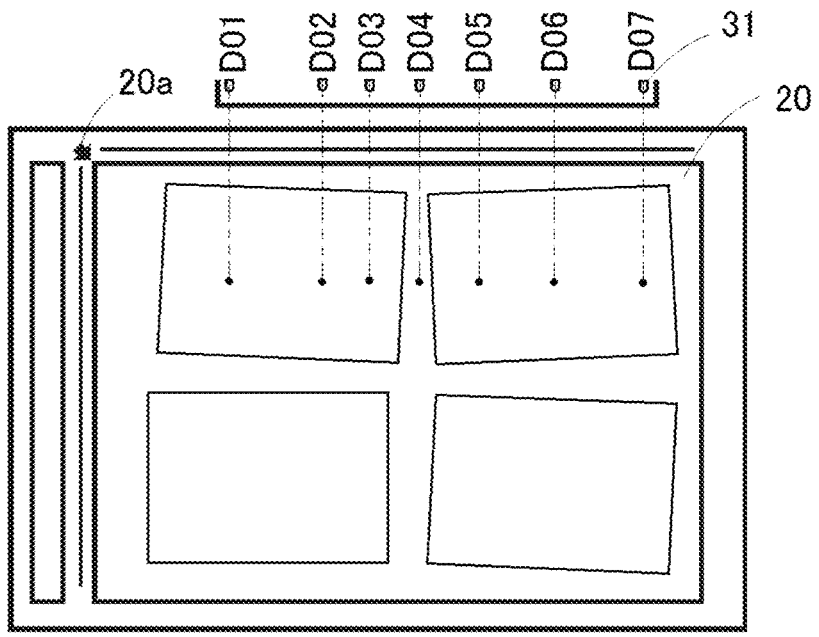
FIG. 19B is an explanatory view showing another embodiment in which the original size detection unit according to the present invention detects multiple originals placed on the original table (corresponding to FIG. 9)
Figure 20A:
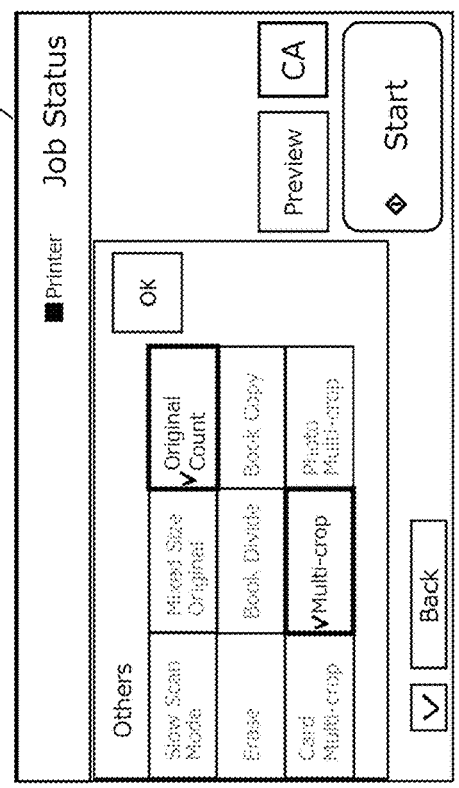
FIG. 20A is a first explanatory view showing an operation procedure of the digital multifunction peripheral shown in FIG. 1 when a continuous multi-crop scan is executed.
Figure 20B:
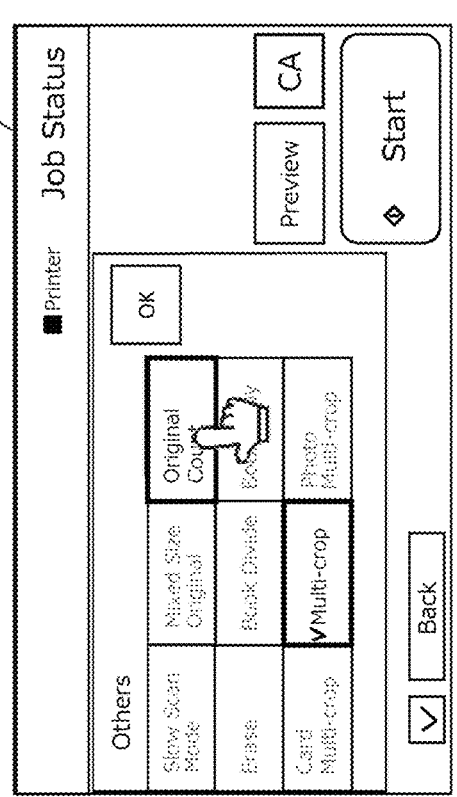
FIG. 20B is a second explanatory view showing the operation procedure of the digital multifunction peripheral shown in FIG. 1 when a continuous multi-crop scan is executed.

FIG. 19B is an explanatory view showing an embodiment different from the embodiment in FIG. 19A.

In FIG. 19A, the original size detection unit 31 outputs detection beams in a pattern same as that for a B4 size in FIG. 7. However, the sizes of the originals placed on the original table 20 are different from B4 size. Further, the pattern of the detection beams corresponding to FIG. 19B (FIG. 9 illustrates the pattern of the detection beams corresponding to FIG. 19B) is different from any of the patterns illustrated in FIG. 7.

In the embodiment described above, since the multi-crop is selected, the control unit 41 determines the maximum readable area as a reading-area, regardless of the detection beams obtained by the original size detection unit 31.

As a modification, when the pattern of detection beams corresponding to a B4 size is obtained as illustrated in FIG. 19A, the control unit 41 may determine an A3 size which is somewhat larger than the B4 size as a reading-area for the multi-crop scan. Specifically, the control unit 41 determines a reading-area corresponding to an original size at least somewhat larger than the original size detected by the original size detection unit 31 as a reading-area by a batch scan. This configuration enables the area where the originals are arranged to be determined as a reading-area and prevents unnecessary scan of an area having no originals (tenth embodiment).

As another modification, when a pattern of detection beams which can never be obtained from a standard size original is obtained as shown in FIG. 19B, the control unit 41 may perform the multi-crop scan. Particularly, this is the case where the beam from the light-emitting element D04 is detected but the beams (from D05 to D07) for the size larger than that are not detected in FIG. 19B, for example. In such case, the control unit 41 may determine that multiple originals are arranged on the original table 20, and perform the multi-crop scan. Specifically, the control unit 41 performs the multi-crop scan in the case where the detection pattern by the original size detection unit 31 corresponds to none of predetermined patterns for a standard size original. Alternatively, the control unit 41 may display a message for asking a user whether to execute the multi-crop scan on the operation display unit 51 (eleventh embodiment).

In the multi-crop scan, the original size detection unit 31 is unable to precisely detect the size of an original, but can detect whether or not an original is placed on the original table 20. Therefore, if the pattern of detection beams shows that there is no original on the original table 20, the control unit 41 may invalidate the "Start" key to prevent the start of the multi-crop scan even if the "Start" key is pressed.

«Embodiment of Performing Batch Scan More than Once»

FIGS. 20A, 20B, 21, 22A to 22C, 23, and 24A to 24E show an operation procedure for reading originals by a batch scan performed more than once by the continuous multi-crop scan of the digital multifunction peripheral 10.

When the continuous multi-crop scan is to be executed in the present embodiment, the "Multi-crop" is selected through the screens shown in FIGS. 11A, 11B, and 14A to 14F from the stand-by state. Note that, in this stage, the single multi-crop is selected. When the user then touches an "Original count" key on the screen shown in FIG. 20A, the control unit 41 recognizes that the continuous multi-crop is selected in response to this operation. Then, the control unit 41 displays a check mark on the "Original count" key to inform the user of the selection of the multi-crop including an original count, that is, the selection of the continuous multi-crop (see FIG. 20B).

In other words, the "Multi-crop" key receives the selection of the single multi-crop process, while the "Original count" key receives the selection of the continuous multi-crop process. In the present embodiment, the continuous multi-crop is selected in combination of the "Multi-crop" key and the "Original count" key. However, in another embodiment, a "single multi-crop" key and a "continuous multi-crop key" may be prepared as different operation keys, and either one of them may be selected.

The user arranges multiple originals which are the objects for the multi-crop scan on the original table 20.

FIG. 21 is an explanatory view illustrating the state in which four (1 to 4) originals 20b are placed on the original table 20 for the multi-crop scan as in FIG. 15.

Figure 22A:
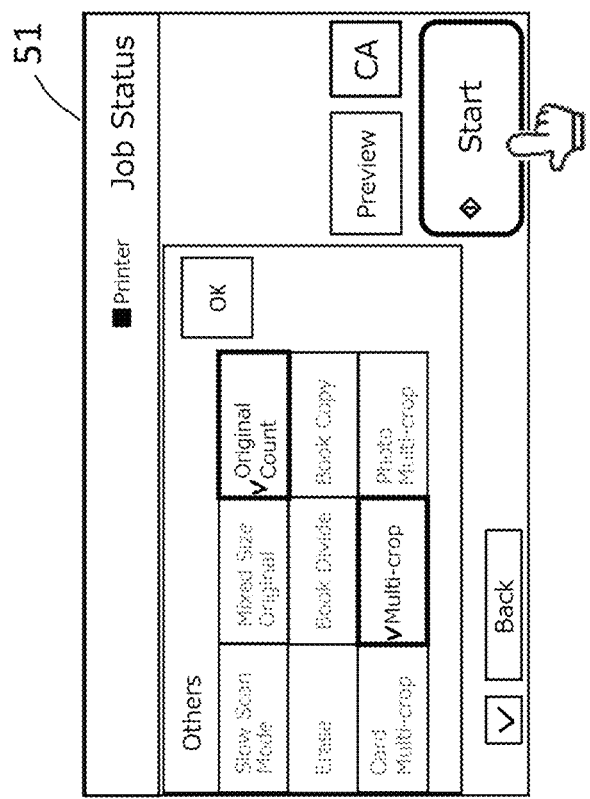
FIG. 22A is a third explanatory view showing the operation procedure of the digital multifunction peripheral shown in FIG. 1 when a continuous multi-crop scan is executed.
Figures 22B, 22C:
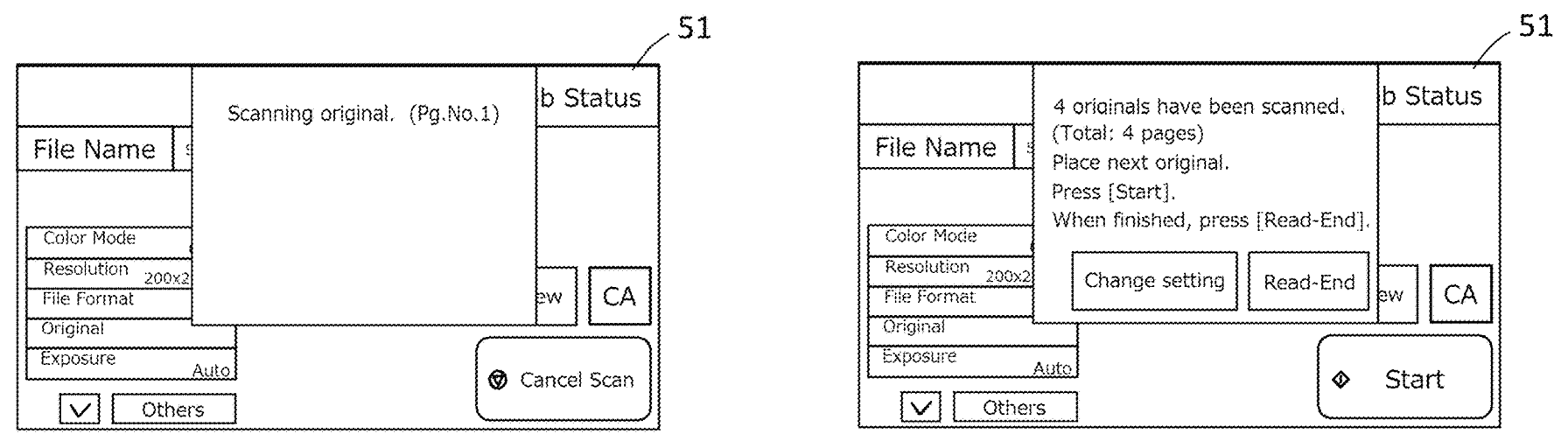
Figure 23:
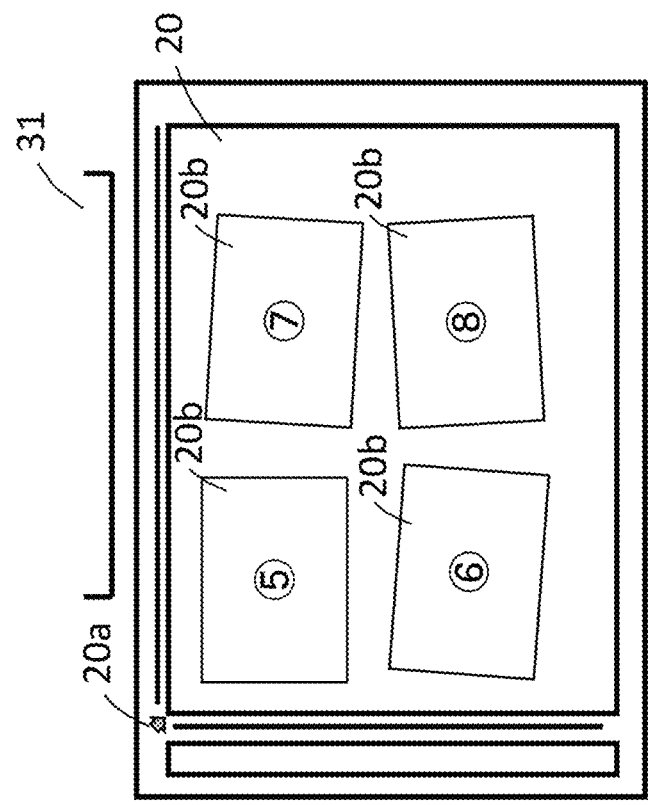
FIG. 23 is an explanatory view showing the state in which multiple originals for the second batch scan are placed on the original table shown in FIG. 3.
Figure 24E:
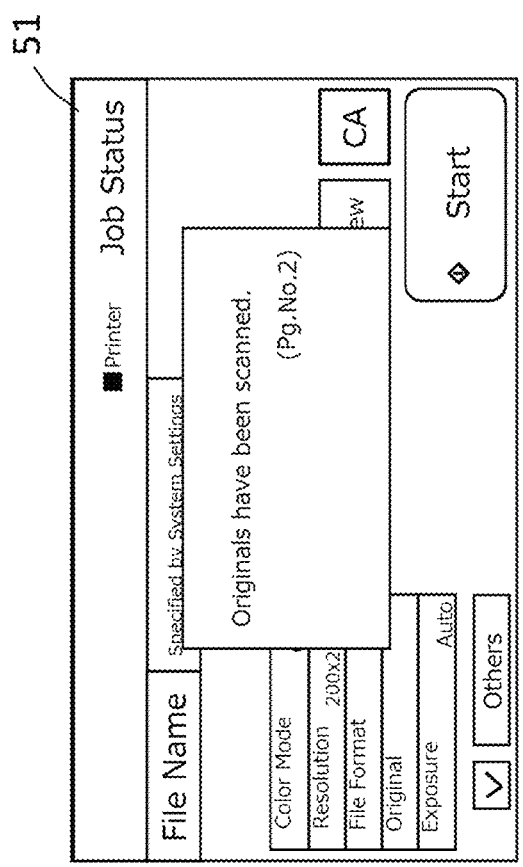
FIG. 24E is a tenth explanatory view showing the operation procedure of the digital multifunction peripheral shown in FIG. 1 when a continuous multi-crop scan is executed.

When the user presses the "Start" key (see FIG. 22A), the control unit 41 determines a reading-area for the multi-crop scan and causes the scanning unit 21 and the original reading unit 23 to read the four (1 to 4) originals 20b by a batch scan, in response to this operation. While reading, the control unit 41 displays the message of "Scanning original. (Pg. No. 1)" and the operation key of "Cancel scan" as shown in FIG. 22B. The "(Pg. No. 1)" in the message indicates that this is the first batch scan.

After the first batch scan is finished, the cropping unit 25 crops images corresponding to 1 to 4 originals. The control unit 41 displays operation keys of "Read-End", "Change setting", and "Start" along with a message of "4 originals have been scanned. (Total: 4 pages)" on the operation display unit 51, on the basis of the cropping of the originals by the cropping unit 25, to encourage the user to do the next operation (see FIG. 22C).

When the user arranges four (5 to 8) originals which are the objects for the next multi-crop scan on the original table 20 (see FIG. 23) and presses the "Start" key (see FIG. 24A), the control unit 41 starts the next batch scan in response to this operation. Specifically, the control unit 41 determines a reading-area for the multi-crop scan and causes the scanning unit 21 and the original reading unit 23 to read the four originals 20b by a batch scan. While reading, the control unit 41 displays the message of "Scanning original. (Pg. No. 2)" and the operation key of "Cancel scan" as shown in FIG. 24B. The "(Pg. No. 2)" in the message indicates that this is the second batch scan.

The control unit 41 handles the image data obtained by the first batch scan and the image data obtained by the second batch scan as a series of image data.

After the second batch scan is finished, the cropping unit 25 crops images corresponding to four (5 to 8) originals. The control unit 41 displays operation keys of "Read-End", "Change setting", and "Start" along with a message of "4 originals have been scanned. (Total: 8 pages)" on the operation display unit 51, on the basis of the cropping of the originals by the cropping unit 25 (see FIG. 24C).

The message of "4 originals have been scanned." indicates that there are four originals read by the second batch scan, and the part "(Total: 8 pages)" indicates that eight originals in total have been read by a sequence of batch scans starting from the first batch scan.

In this way, the control unit 41 displays the number of originals cropped by each batch scan and the total number of originals cropped from the first batch scan on the operation display unit 51. The control unit 41 makes these displays at every batch scan.

When the user touches the operation key of "Read-End" (see FIG. 24D), the control unit 41 stores the image data of the eight originals in total, which have been read and cropped by two batch scans so far, into the USB memory connected to the USB connector 71. After the writing on the USB memory is finished, the control unit 41 displays the message of "Originals have been scanned (Pg. No. 2)" on the operation display unit 51 (see FIG. 24E).

Figure 25B:
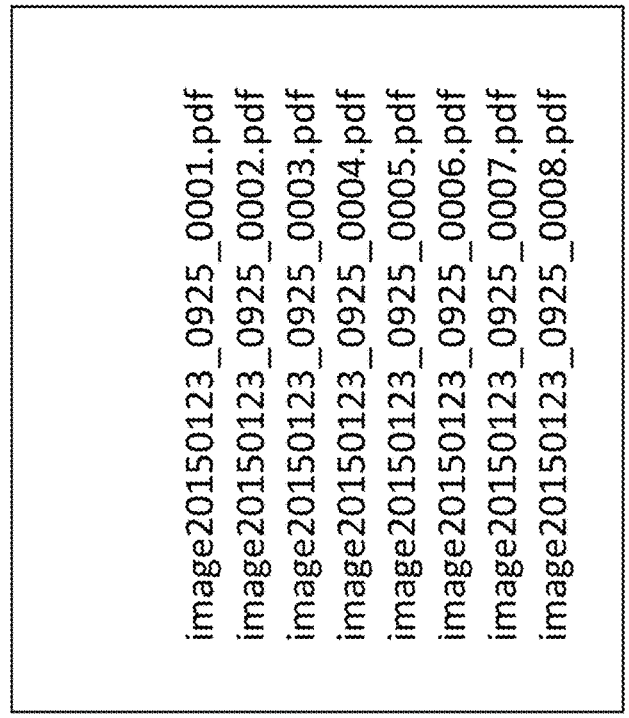
FIG. 25B is an explanatory view showing another embodiment in which image data of originals which have been read by more than one batch scan is stored in an USB memory connected to the digital multifunction peripheral shown in FIG. 1.
Figure 25A:
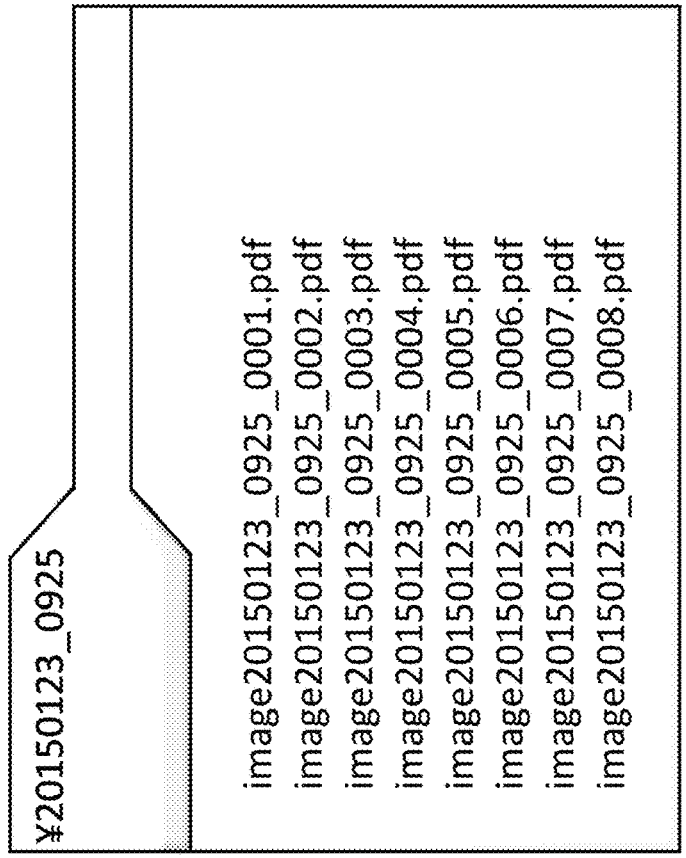
FIG. 25A is an explanatory view showing the state in which image data of originals which have been read by more than one batch scan is stored in an USB memory connected to the digital multifunction peripheral shown in FIG. 1.

As shown in FIG. 25A, the control unit 41 stores the image data corresponding to cropped eight originals in total into the USB memory as eight files stored in one folder. The filename attached to each of the eight files includes information of the date and time at which the first batch scan is executed. The filename also includes information indicating the relation of eight files. The first filename "image20150123_0925_0001.pdf" out of eight files shown in FIG. 25A will be described. The part "20150123" indicates the date of Jan. 23, 2015, and the subsequent part "0925" indicates the time of 9:25. Since the eight files have been read by the continuous multi-crop scan, they have the information of the same date and time. The files also include serial numbers of 0001 to 0008 indicating the relation thereof at the end of the filename of each file.

In addition, the name of the folder storing these files includes the information of the date and time at which the first batch scan is executed (twelfth embodiment).

FIG. 25B is an explanatory view showing an embodiment different from that in FIG. 25A in which image data of the originals which have been read is stored in the USB memory. In FIG. 25A, the image data of each original cropped by the batch scan is stored in one folder that is newly created. On the other hand, in FIG. 25B, each file is stored without creating a new folder. However, eight files include the information of the date and time at which the first batch scan is executed, as in FIG. 25A. The eight files also include the information indicating the relation of these files. Only from the filenames, it is understood that the eight files are related to one another, since the same date and same time are attached thereto. The information of the time at which the first batch scan is executed is the information at which the multi-crop scan is started. Therefore, this information is considered to be more likely to leave impression on the user than the second and subsequent batch scans. That is, it is considered that the user easily recalls the detail of the file from the time information attached to the filename.

Note that the serial number attached at the end of each file in FIGS. 25A and 25B is merely one example of the information indicating relation. This is similar to the case in FIGS. 17A and 17B.

As described above, in the continuous multi-crop scan, the image of the respective originals read by more than one batch scan is handled as a series of image data so as to be distinguishable from other image data.

On the other hand, in the single multi-crop scan, the images of the respective originals read by each batch scan is handled as a series of image data, but they are handled as being distinguished from image data read by other batch scans, such as a previous or next batch scan.

«Operation Procedure of Continuous Multi-Crop Scan»

The process in which the control unit 41 executes the above-mentioned multi-crop scan will comprehensively be described.

FIG. 26 is a flowchart illustrating the process executed by the control unit when the continuous multi-crop is selected. As shown in FIG. 26, the control unit 41 displays a screen for allowing a user to select the scanning condition and multi-crop on the operation display unit 51 (step S51, corresponding to FIGS. 14A to 14D). Then, the control unit 41 requests the user to leave the original cover open (corresponding to FIGS. 14E to 14F). The control unit 41 then waits until the user touches the "Original count" key to select the continuous multi-crop (corresponding to FIGS. 20A and 20B), multiple originals are arranged on the original table 20 (step S53, corresponding to FIG. 21), and the "Start" key is pressed (step S55).

When the "Start" key is pressed (Yes in step S55, corresponding to FIG. 22A), the control unit 41 determines the maximum readable area as a reading-area (step S57), and then, starts scanning and reading of the originals (step S59). Then, the control unit 41 waits until the reading by the batch scan is finished (step S61, corresponding to FIG. 22B).

After finishing the reading, the control unit 41 controls such that the cropping unit 25 crops the image data of each original (step S63), and displays the cropped result on the operation display unit 51 (step S65, corresponding to FIG. 22C). Then, the control unit 41 waits until the "Read-End" key is pressed (step S67) or the "Start" key is pressed (step S55 through No in step S67).

When the originals to be read next are arranged on the original table (corresponding to FIG. 23) and the "Start" key is pressed (Yes in step S55, corresponding to FIG. 24A), the control unit 41 determines the maximum readable area as a reading-area (step S57). Then, the control unit 41 performs the second batch scan (steps S59 to S65, corresponding to FIG. 24B).

The control unit 41 then waits again until the "Read-End" key is pressed (step S67) or the "Start" key is pressed (step S55 through No in step S67, corresponding to FIG. 24C).

When the "Read-End" key is pressed, the control unit 41 ends the reading (Yes in step S67, corresponding to FIG. 24D).

Then, the control unit 41 controls such that the cropping unit 25 crops the image data of the last original which has been read (step S69), and starts the transfer of the image data of the originals, which have been read, to the memory (step S71). In the present embodiment, the image data is transferred to the USB memory connected to the USB connector 71. However, this is merely one example. In the continuous multi-crop scan, if the copying function is selected, the control unit 41 transfers the image data to the image forming apparatus 12 through the image output unit 27, as in the single multi-crop scan. If the scanner function is selected, the control unit 41 may transmit the image data to an external device connected to a network through the communication unit 45. If the image filing function is selected, the control unit 41 transfers the image data to the storage unit 43 and stores the same therein. If the facsimile function is selected, the control unit 41 transmits the image data through the communication unit 45 and a public line.

After completing the transfer of the image data (Yes in step S71), the control unit 41 notifies the user of the completion of the transfer (step S73, corresponding to FIG. 24E), and ends the process.

«Photo Multi-Crop (Inversion Multi-Crop)»

It has already been described that, in the ordinary multi-crop scan, that is, in the non-inversion multi-crop scan, the original cover is left open and the scanning is performed in order that the area outside of an original is read as black with respect to a white or light tone base of the original. The cropping unit 25 crops the image corresponding to the original by recognizing the border of the originals on the basis of the contrast between the light tone base of the originals and the black color of the area outside of the originals.

However, an original may have a dark tone edge depending on a type of an original. An original with an edge locally having a dark tone can precisely be cropped on the premise that the original has a rectangular shape. However, if an original has a lot of dark tone parts, it cannot sufficiently be cropped in some cases.

A typical example of an original with a dark tone edge is an original of a photo of night scenes without borders. A photo of the same night scenes with borders have a white edge, so that the cropping unit 25 can crop each original from the image read with the original cover 33 being left open. However, in a photo without borders, the contrast between the night scenes and the area outside of the original is insufficient.

An original with a dark tone edge, such as a photo of night scenes without borders, had better be read with the original cover 33 being closed in order that the area outside of the original is read as white. The lower surface of the original cover 33 is white. This is to prevent the generation of a sense of strangeness between a standard size original with white or light tone base and the original cover 33, even if the original cover (document holder) that is the area outside of the original is read when the original is read.

In view of this, it is preferable that a multi-crop function for an original having a dark tone edge is provided separately from the ordinary multi-crop, and the user can select either one of multi-crops according to an original.

In the present embodiment, the multi-crop function for an original having a dark tone edge is referred to as "photo multi-crop" or "inversion multi-crop". While in the ordinary multi-crop (non-inversion multi-crop), the control unit 41 requests the user to leave the original cover 33 open (for example, see FIGS. 14E and 14F), the control unit 41 requests the user to close the original cover 33 in the photo multi-crop. Then, the cropping unit 25 recognizes the border of each original and crops the image corresponding to the original on the basis of the contrast between a dark tone base of the original and light tone of the area outside of the original. In this case, the grayscale of the image obtained by the batch scan may be inverted, and then, the cropping unit 25 may perform cropping. The cropped image of each original is stored in the memory after the grayscale thereof is again inverted. According to this configuration, the area outside of an original has a black color or a dark tone in any of the inversion multi-crop and the non-inversion multi-crop, whereby an image can be cropped by the same process.

Figure 27B:
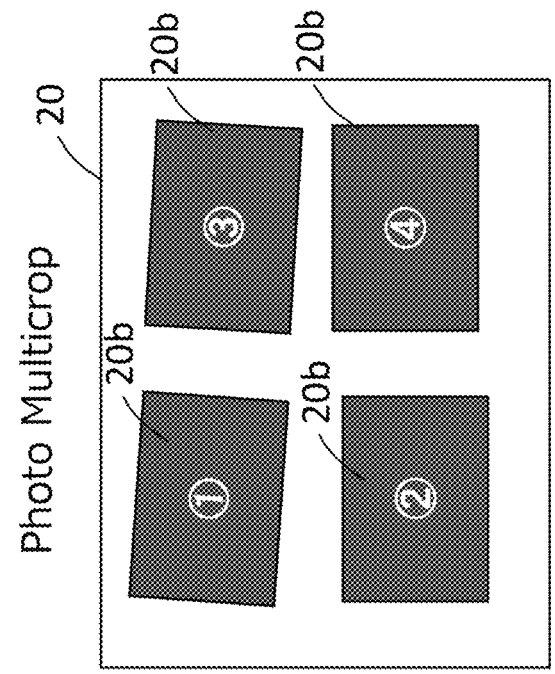
FIG. 27B is an explanatory view showing an example of an image obtained by reading multiple originals having dark tone edges with the original cover being closed.
Figure 27A:
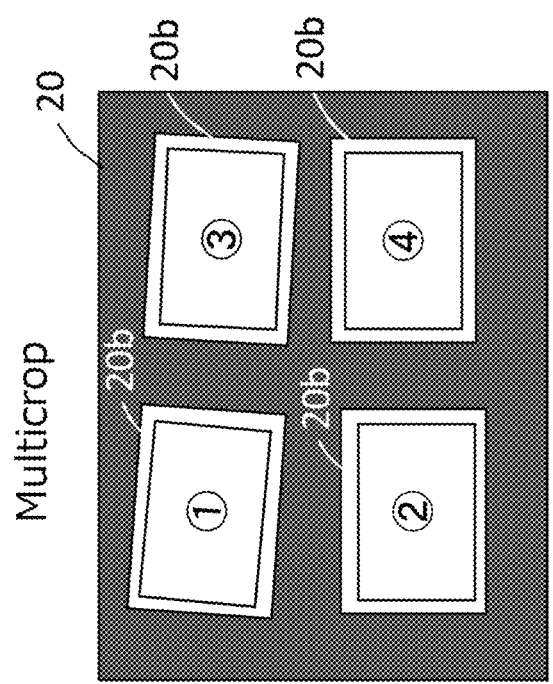
FIG. 27A is an explanatory view showing an example of an image obtained by reading multiple originals having light tone edges with the original cover being left open.

FIG. 27A shows an example of an image read by a batch scan in the ordinary multi-crop. FIG. 27A shows the example in which multiple photo originals with borders having a dark tone edge are read with the original cover being left open.

FIG. 27B shows an example of an image read by a batch scan in the photo multi-crop. FIG. 27B shows the example in which multiple photo originals without borders having a dark tone edge are read with the original cover being closed.

FIGS. 28A to 28D are explanatory views showing one example of an operation procedure when the photo multi-crop scan is performed by the digital multifunction peripheral 10.

For the selection of the photo multi-crop scan, the digital multifunction peripheral 10 which has been in the stand-by mode is brought into the state in which the screen illustrated in FIG. 14C is displayed through the screens in FIGS. 11A, 11B, 14A, and 14B. The "Photo Multi-crop" key is disposed at the right of the "Multi-crop" key on the screen in FIG. 14C.

When the user touches the "Photo Multi-crop" key (see FIG. 28A), the control unit 41 displays a check mark indicating that the "Photo Multi-crop" key is selected on the "Photo Multi-crop" key in response to this operation. The control unit 41 also displays a message of "Be sure to close the automatic document feeder and press [Start] to scan." along with an "OK" key on the operation display unit 51 (see FIG. 28B).

Figure 28A:
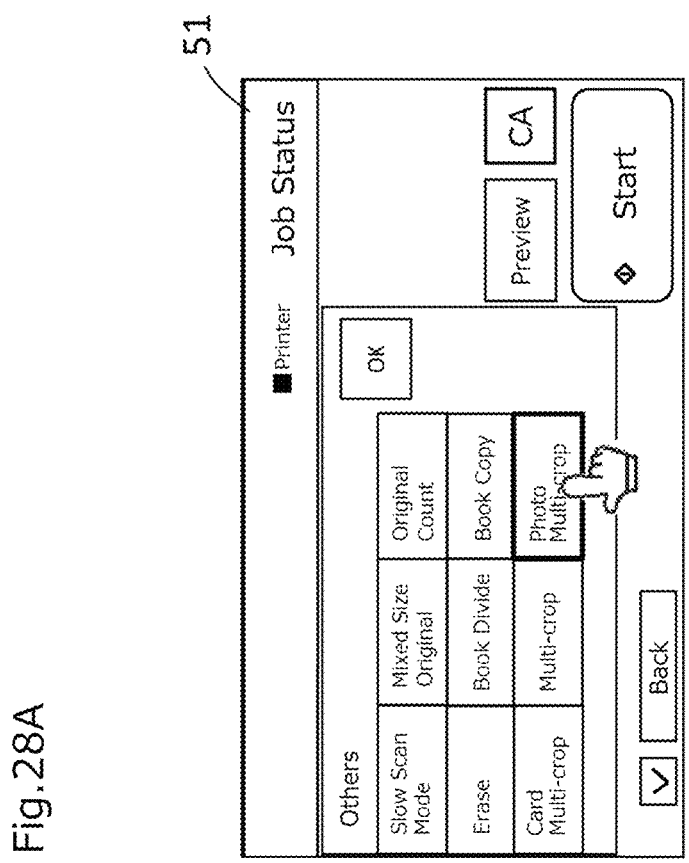
FIG. 28A is a first explanatory view showing an operation procedure of the digital multifunction peripheral shown in FIG. 1 when a photo multi-crop is executed.
Figure 28B:
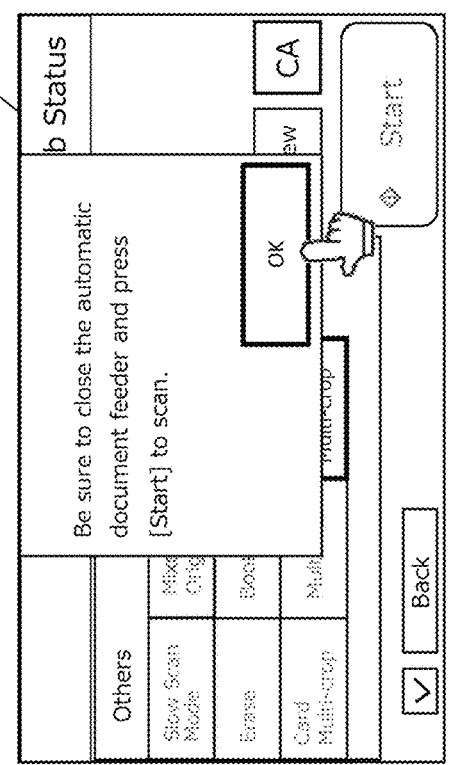
FIG. 28B is a second explanatory view showing the operation procedure of the digital multifunction peripheral shown in FIG. 1 when a photo multi-crop is executed.
Figure 28C:
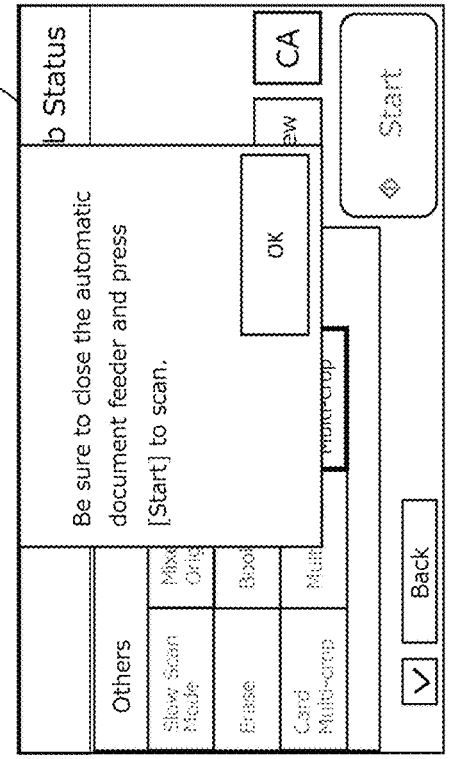
FIG. 28C is a third explanatory view showing the operation procedure of the digital multifunction peripheral shown in FIG. 1 when a photo multi-crop is executed.
Figure 28D:
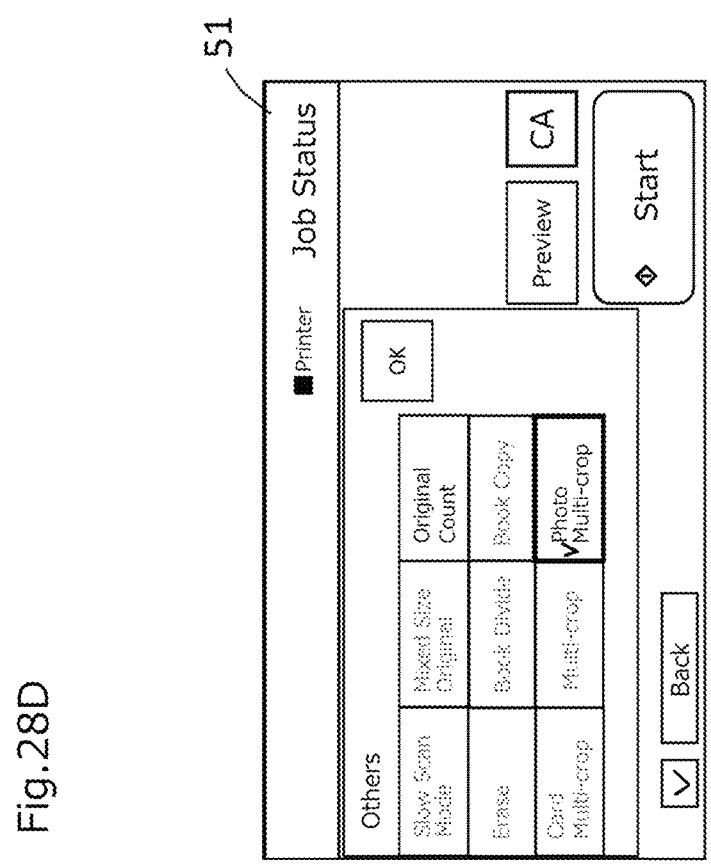
FIG. 28D is a fourth explanatory view showing the operation procedure of the digital multifunction peripheral shown in FIG. 1 when a photo multi-crop is executed.

When the user reads the message of "Be sure to close the automatic document feeder and press [Start] to scan." and presses the "OK" key (see FIG. 28C), the control unit 41 erases the message in response to this operation (see FIG. 28D).

The user arranges multiple originals, which are the objects for the multi-crop scan, on the original table 20, and then, closes the original cover 33. After the user presses the "Start" key, the control unit 41 starts the batch scan for the photo multi-crop.

As shown in FIG. 27B, the cropping unit 25 recognizes the border of the originals on the basis of the dark tone edges of the originals and the white color at the area outside of the originals, and performs cropping.

Since the control unit 41 can acquire the open state and closed state of the original cover 33 by the cover opening-and-closing sensor 35, the control unit 41 may invalidate the "Start" key to inhibit the start of the batch scan while the original cover 33 is left open (thirteenth embodiment).

Alternatively, in the case where the "Start" key is pressed with the original cover 33 being left open, the control unit 41 may inhibit the start of the batch scan, and display a message for encouraging the user to close the original cover 33 and again press the "Start" key on the operation display unit 51 (fourteenth embodiment).

The other operation procedure is similar to the ordinary multi-crop scan.

«Different Embodiment in Selecting Photo Multi-Crop»

In the above example, the "Photo Multi-crop" key is prepared separately from the "Multi-crop" key, and the user selects the function of the photo multi-crop by touching the "Photo Multi-crop" key. In this embodiment, the example of selecting the photo multi-crop by the operation procedure different from the above example will be described.

FIGS. 29A to 29I are explanatory views showing different example of the operation procedure for performing the photo multi-crop scan by the digital multifunction peripheral 10.

Figure 29A:
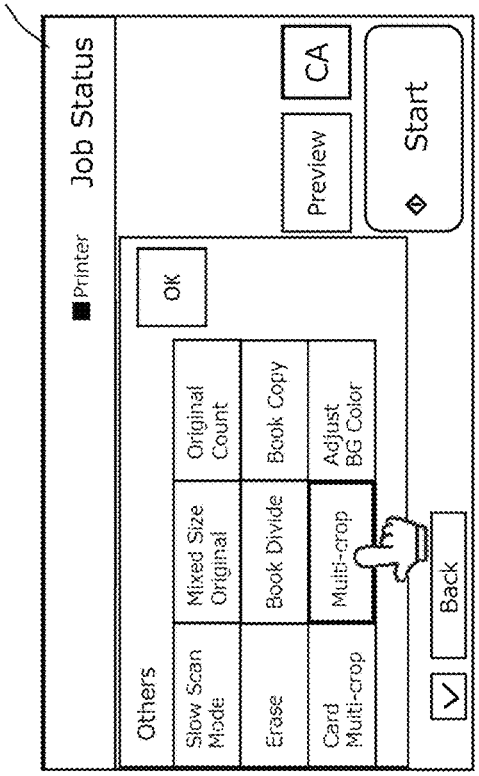
FIG. 29A is a first explanatory view showing another embodiment of an operation procedure of the digital multifunction peripheral shown in FIG. 1 when a photo multi-crop is executed.
Figure 29B:
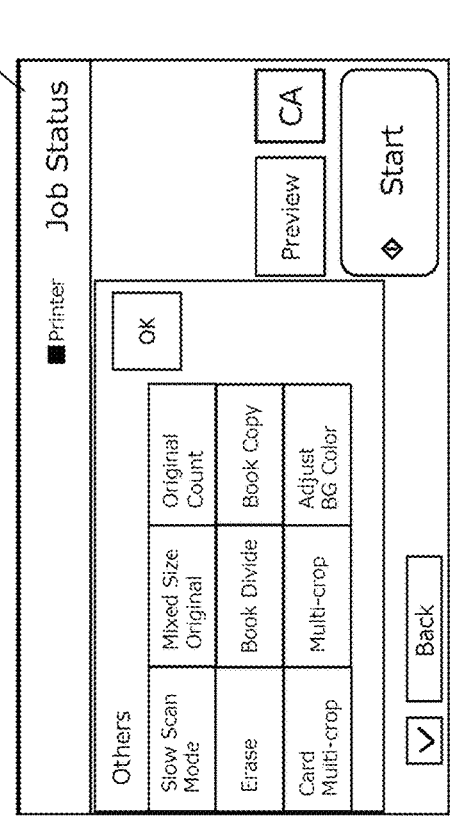
FIG. 29B is a second explanatory view showing another embodiment of the operation procedure of the digital multifunction peripheral shown in FIG. 1 when a photo multi-crop is executed.
Figure 29D:
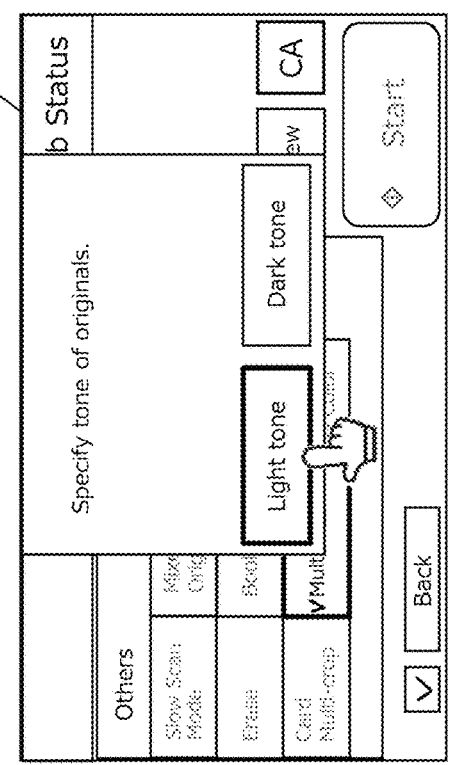
FIG. 29D is a fourth explanatory view showing another embodiment of the operation procedure of the digital multifunction peripheral shown in FIG. 1 when a photo multi-crop is executed.

As in the above example, for the selection of the photo multi-crop, the digital multifunction peripheral 10 which has been in the stand-by mode is brought into the state in which the screen illustrated in FIG. 29A is displayed through the screens in FIGS. 11A, 11B, 14A, and 14B. On the screen in FIG. 29A, the "Multi-crop" key is displayed but the "Photo Multi-crop key" is not displayed and included in the "Multi-crop".

When the user touches the "Multi-crop" key (see FIG. 29B), the control unit 41 displays a check mark indicating that the "Multi-crop" is selected on the "Multi-crop" key in response to this operation. Then, the control unit 41 displays a message of "Specify tone of originals." along with an operation key of "Light tone" and an operation key of "Dark tone" on the operation display unit 51 to encourage the user to select either one of tones.

When the user touches the "Light tone" key (see FIG. 29D), the control unit 41 determines that the ordinary multi-crop mode is selected on the basis of this operation. Then, the control unit 41 displays the message of "Leave the automatic document feeder open and press [Start] to scan." along with the "OK" key on the operation display unit 51 (see FIG. 29E).

When the user reads the message of "Leave the automatic document feeder open and press [Start] to scan." and presses the "OK" key (see FIG. 29F), the control unit 41 erases the message in response to this operation.

The operation procedure after that is similar to the operation procedure described with reference to FIGS. 15 and 16A to 16C.

Figure 29C:
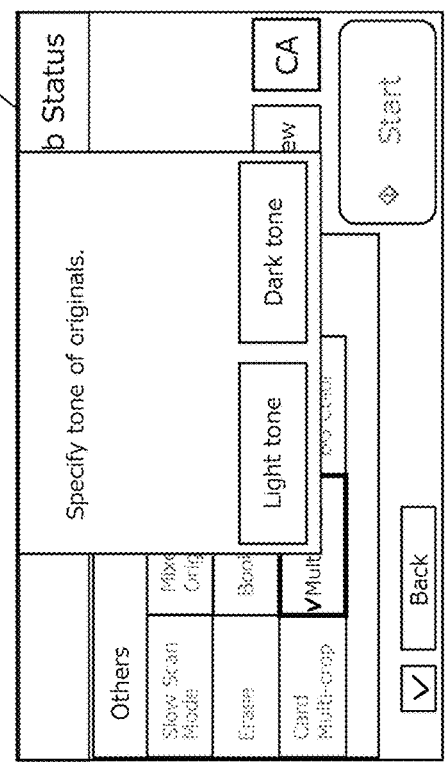
FIG. 29C is a third explanatory view showing another embodiment of the operation procedure of the digital multifunction peripheral shown in FIG. 1 when a photo multi-crop is executed.
Figure 29E:
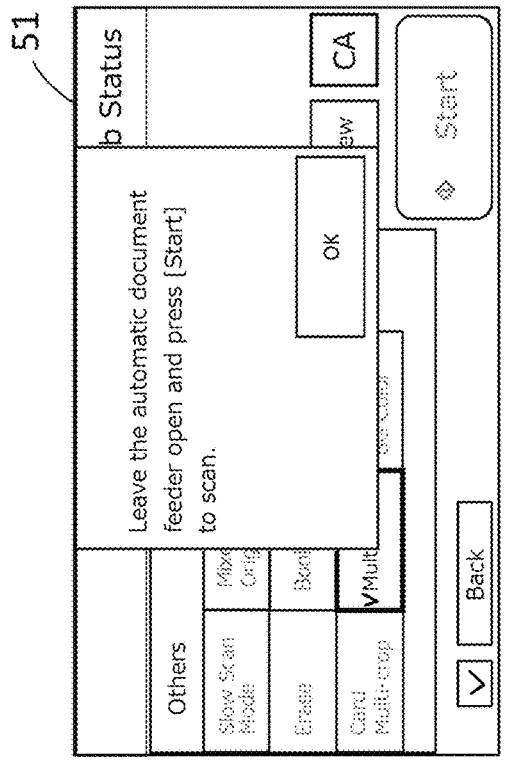
FIG. 29E is a fifth explanatory view showing another embodiment of the operation procedure of the digital multifunction peripheral shown in FIG. 1 when a photo multi-crop is executed.
Figure 29F:
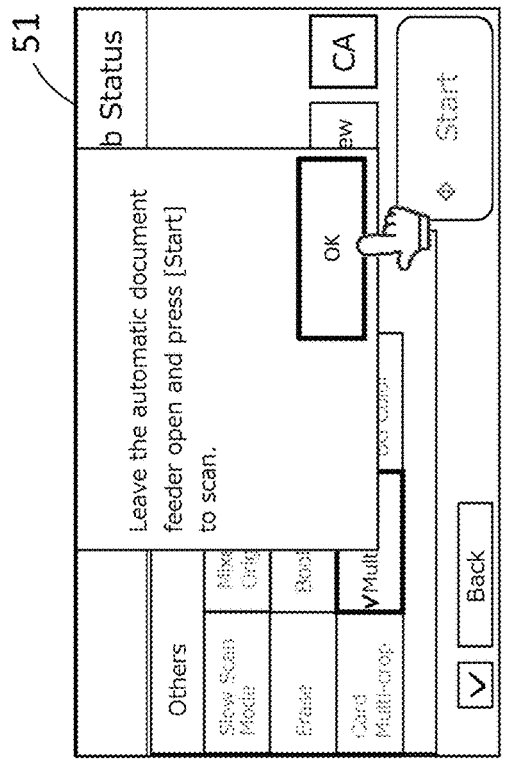
FIG. 29F is a sixth explanatory view showing another embodiment of the operation procedure of the digital multifunction peripheral shown in FIG. 1 when a photo multi-crop is executed.
Figure 29I:
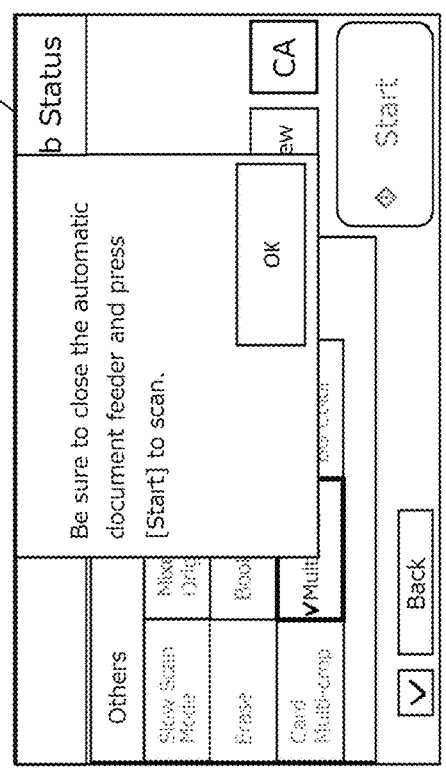
FIG. 29I is a ninth explanatory view showing another embodiment of the operation procedure of the digital multifunction peripheral shown in FIG. 1 when a photo multi-crop is executed.
Figure 29H:
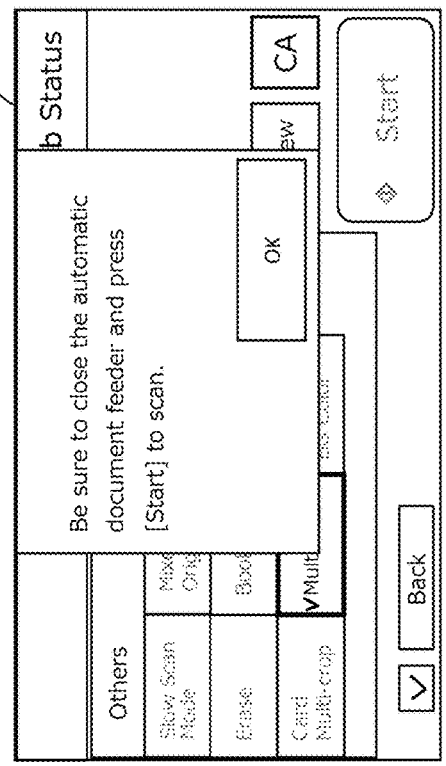
FIG. 29H is an eighth explanatory view showing another embodiment of the operation procedure of the digital multifunction peripheral shown in FIG. 1 when a photo multi-crop is executed.

On the other hand, when the user touches the "Dark tone" key on the screen illustrated in FIG. 29C (see FIG. 29G), the control unit 41 determines that the photo multi-crop is selected in response to this operation. Then, the control unit 41 displays the message of "Be sure to close the automatic document feeder and press [Start] to scan." along with the "OK" key on the operation display unit 51 (see FIG. 29H).

When the user reads the message of "Be sure to close the automatic document feeder and press [Start] to scan." and presses the "OK" key (see FIG. 29I), the control unit 41 erases the message in response to this operation. The operation procedure after that is similar to the operation procedure of the photo multi-crop previously described.

«Card Multi-Crop Scan»

The digital multifunction peripheral 10 according to the present embodiment has a card multi-crop scan function. The card multi-crop scan can be said to be a type of the multi-crop scan. However, different from the ordinary multi-crop scan, a character of a cropped image of each card original is recognized by character recognition and character data is output. It is considered that, when a card original is to be read, the user intends to use the character information written on the card as well as the image of each card original in most cases. The character recognition is performed by the character recognition unit 29. The character recognition is performed by applying known character recognition technology.

Figure 30A:
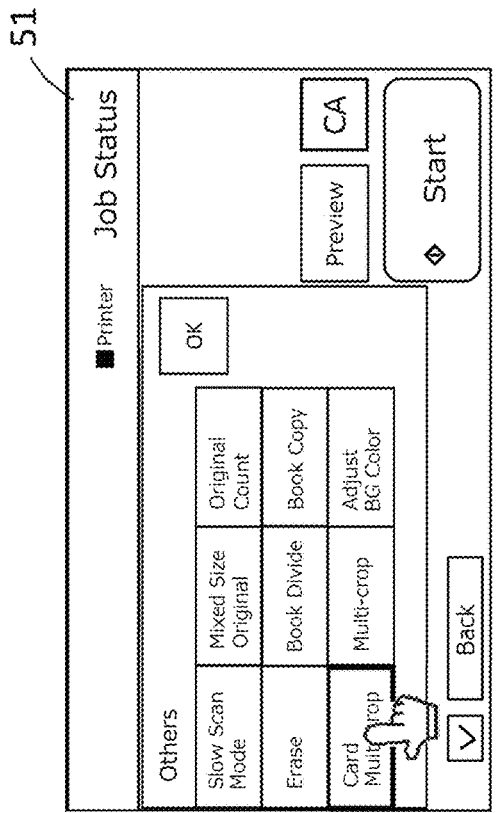
FIG. 30A is a first explanatory view showing an operation procedure of the digital multifunction peripheral shown in FIG. 1 when a card multi-crop scan is executed.
Figure 30B:
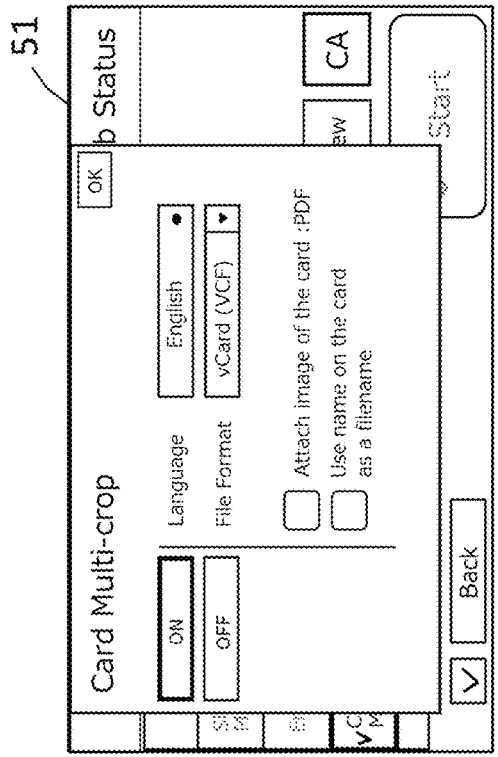
FIG. 30B is a second explanatory view showing the operation procedure of the digital multifunction peripheral shown in FIG. 1 when a card multi-crop scan is executed.
Figure 30D:
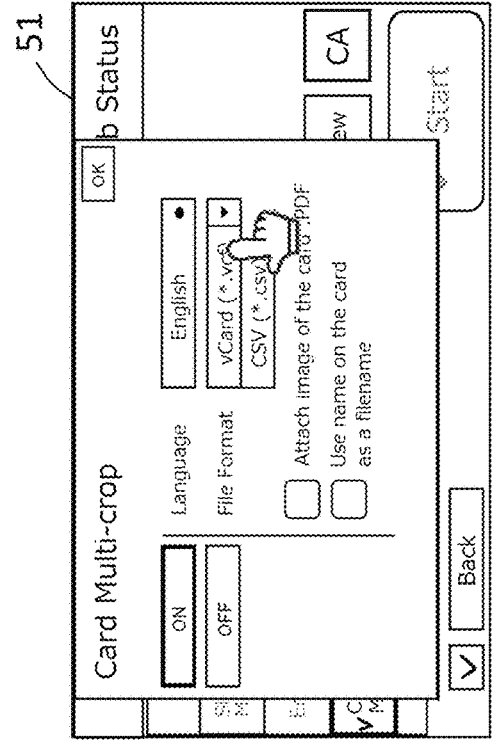
FIG. 30D is a fourth explanatory view showing the operation procedure of the digital multifunction peripheral shown in FIG. 1 when a card multi-crop scan is executed.
Figure 30C:
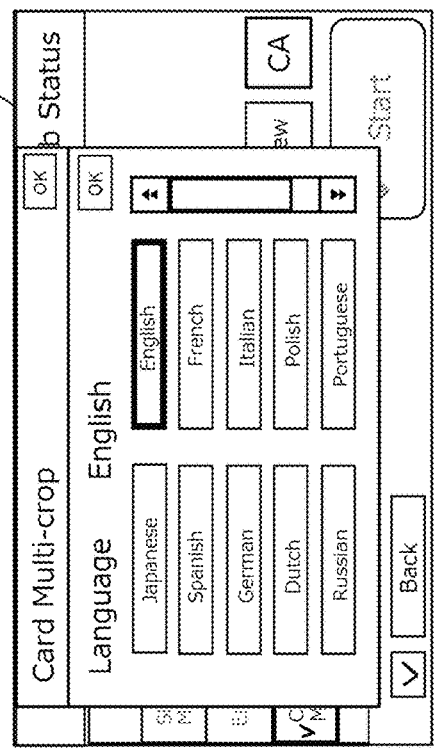
FIG. 30C is a third explanatory view showing the operation procedure of the digital multifunction peripheral shown in FIG. 1 when a card multi-crop scan is executed.
Figures 30E, 30F:
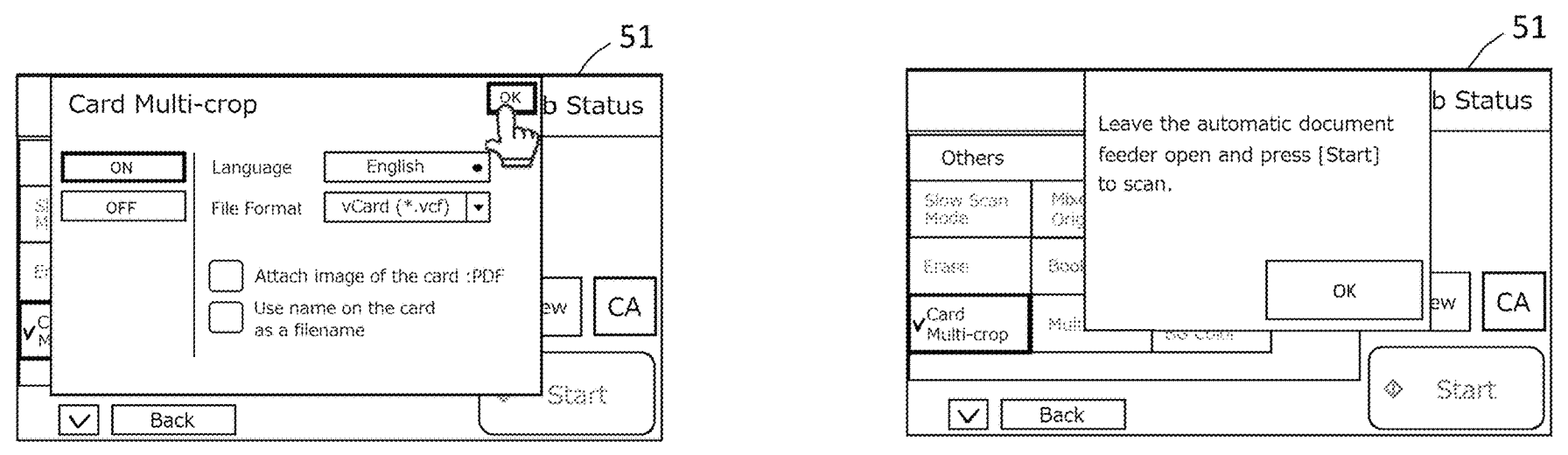
Figure 30H:
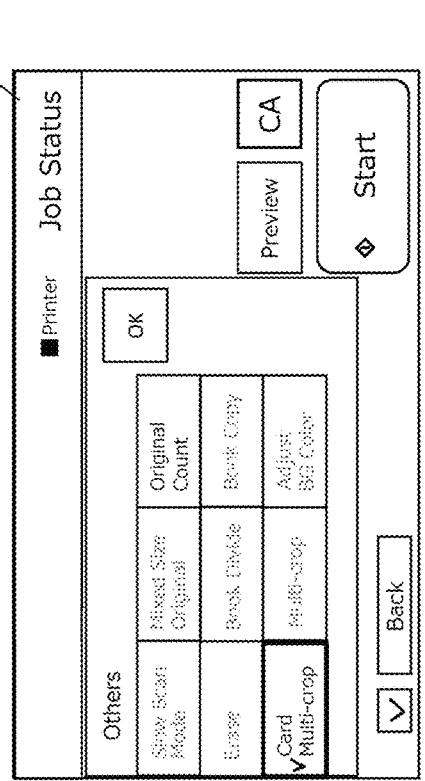
FIG. 30H is an eighth explanatory view showing the operation procedure of the digital multifunction peripheral shown in FIG. 1 when a card multi-crop scan is executed.
Figure 30G:
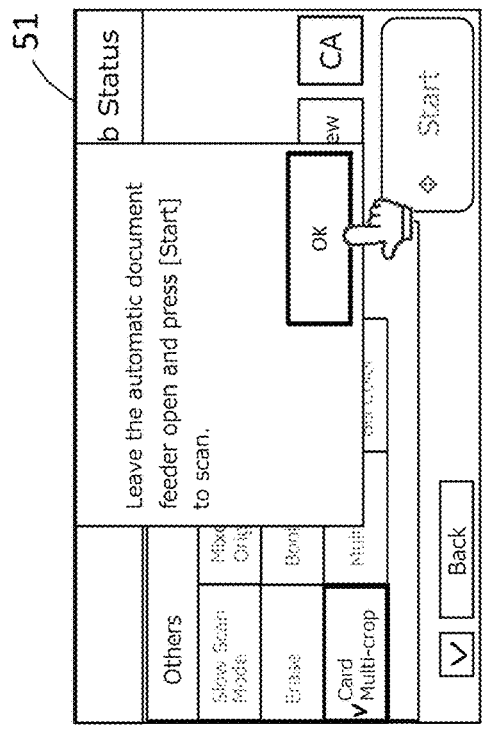
FIG. 30G is a seventh explanatory view showing the operation procedure of the digital multifunction peripheral shown in FIG. 1 when a card multi-crop scan is executed.
Figure 30J:
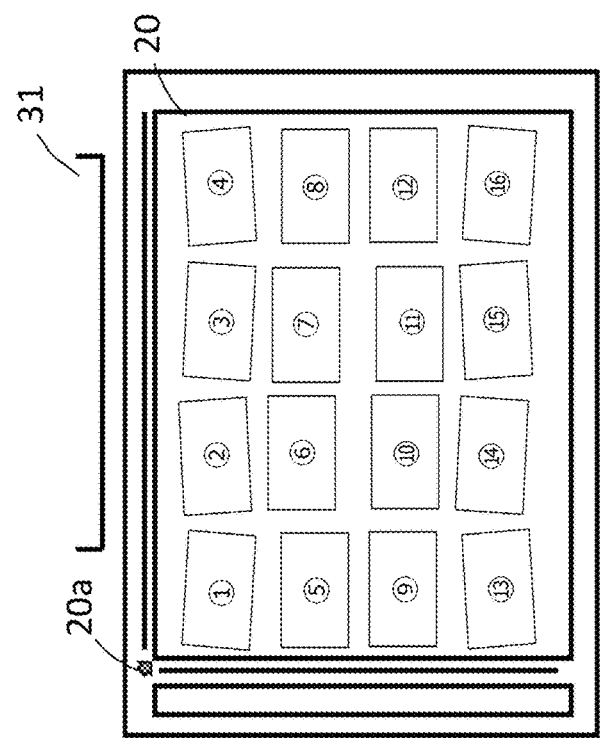
FIG. 30J is a tenth explanatory view showing the operation procedure of the digital multifunction peripheral shown in FIG. 1 when a card multi-crop scan is executed.
Figure 30I:
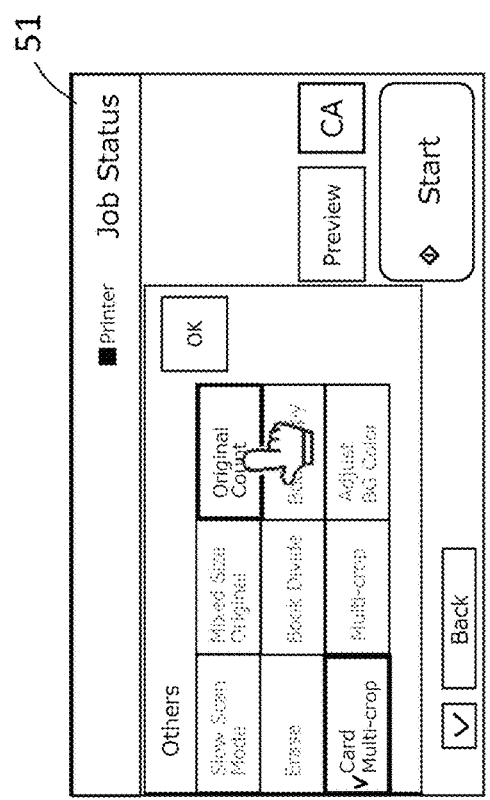
FIG. 30I is a ninth explanatory view showing the operation procedure of the digital multifunction peripheral shown in FIG. 1 when a card multi-crop scan is executed.
Figures 30K, 30L:
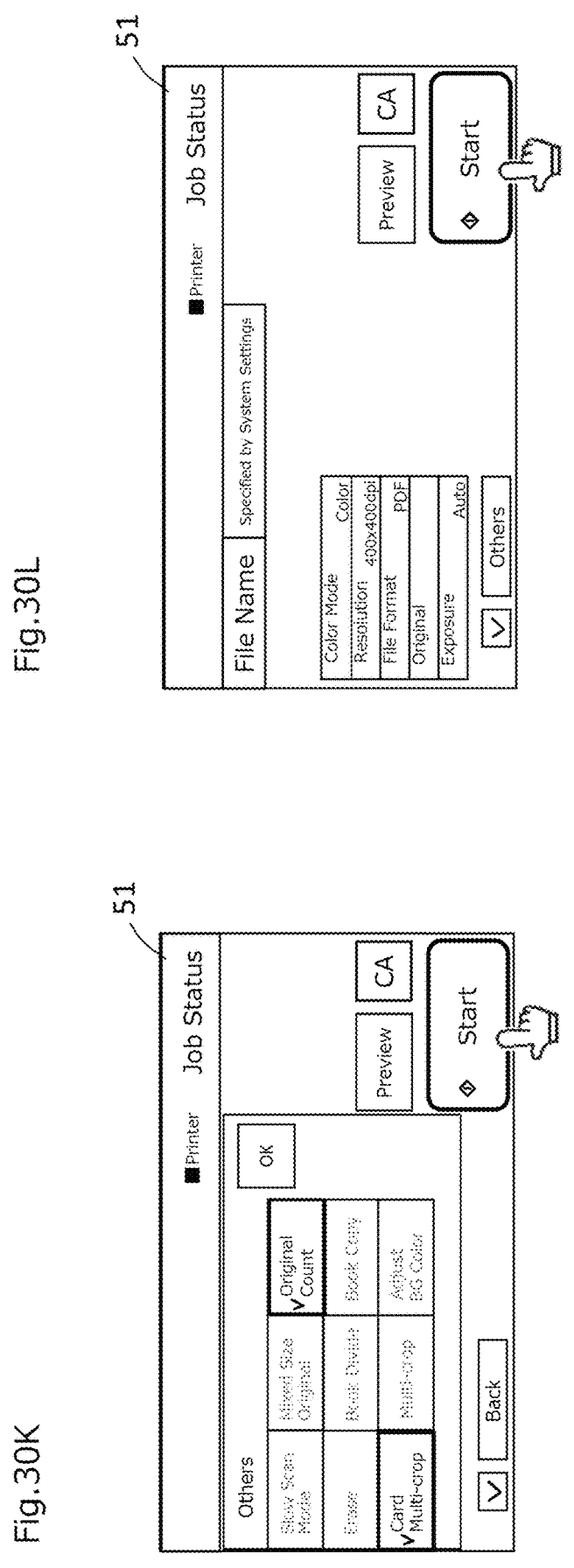
Figures 30M, 30N:
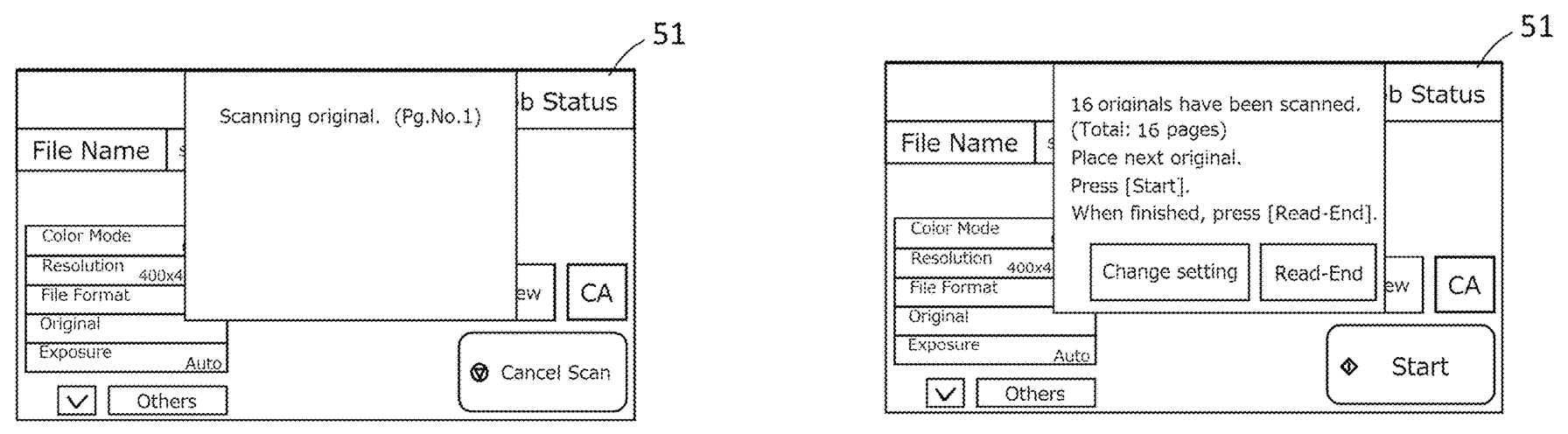
Figure 30P:
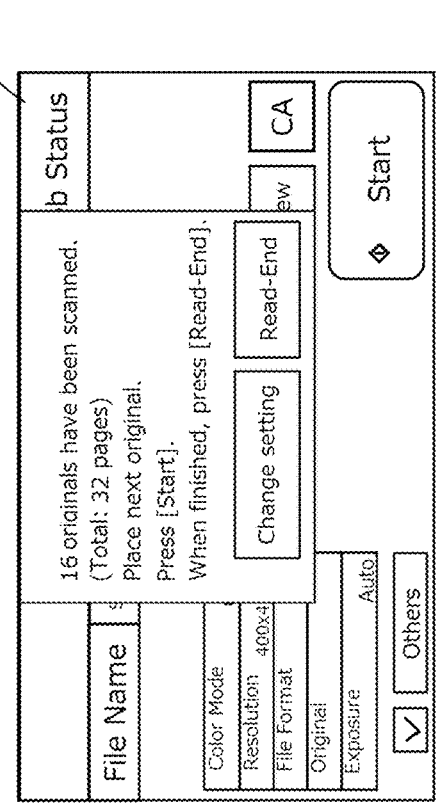
FIG. 30P is a sixteenth explanatory view showing the operation procedure of the digital multifunction peripheral shown in FIG. 1 when a card multi-crop scan is executed.
Figure 30O:
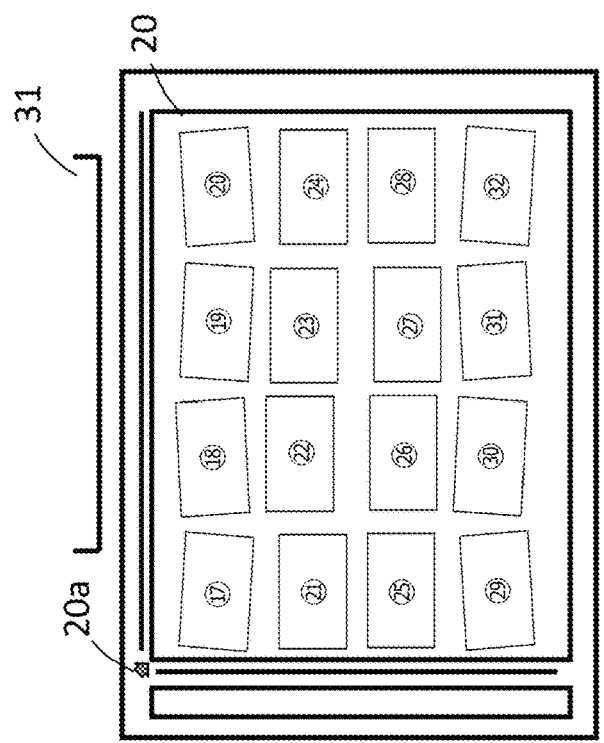
FIG. 30O is a fifteenth explanatory view showing the operation procedure of the digital multifunction peripheral shown in FIG. 1 when a card multi-crop scan is executed.
Figures 30Q, 30R:
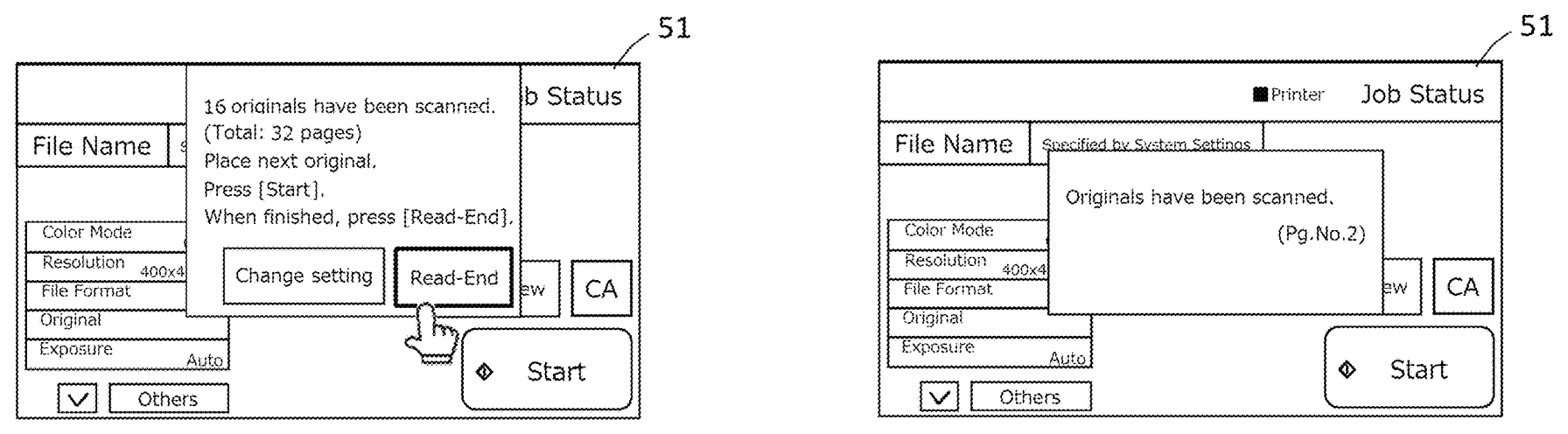
Figure 30T:
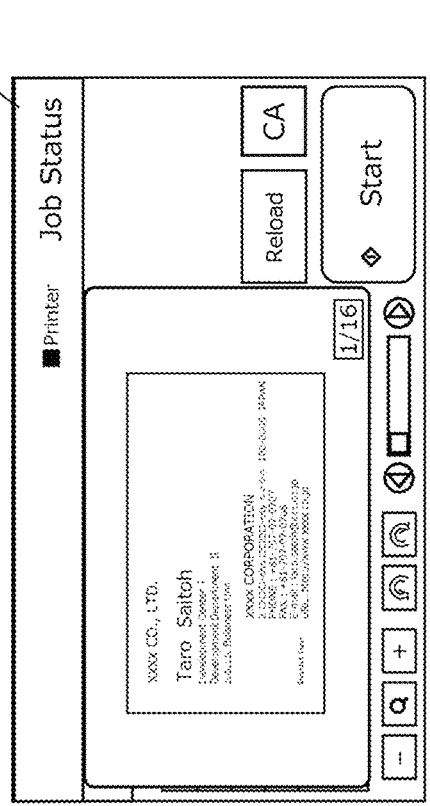
FIG. 30T is a second explanatory view showing the preview operation of the digital multifunction peripheral shown in FIG. 1 when a card multi-crop scan is executed.

FIGS. 30A to 30T are explanatory views showing one example of an operation procedure when a card multi-crop scan is performed with the digital multifunction peripheral 10.

For the execution of the card multi-crop scan, the digital multifunction peripheral 10 which has been in the stand-by mode is brought into a state in which the screen in FIG. 14C is displayed through the screens in FIGS. 11A, 11B, 14A, and 14B. On the screen in FIG. 14C, the "Card Multi-crop" key is disposed at the left of the "Multi-crop" key.

When the user touches the "Card Multi-crop" key (see FIG. 30A), the control unit 41 displays a "Card Multi-crop" window shown in FIG. 30B in response to this operation. While the "Card Multi-crop" window is displayed, the "Start" key is gray-out and cannot be selected.

An "ON" key and an "OFF" key for turning "ON" and "OFF" the "Card Multi-crop" function are disposed at the left part of the "Card Multi-crop" window. Initially, the "Card Multi-crop" function is "OFF". Therefore, when the user intends to execute the "Card Multi-crop", he/she selects the "ON" key. If the "OFF" key is selected, the "Card Multi-crop" function is canceled. The user can turn "ON" or "OFF" the "Card Multi-crop" function by using these keys.

Further, at the right part of the "Card Multi-crop" window, a "Language" key, a drop-down key of "File Format", a check box of "Attach image of the card: PDF", and a check box of "Use name on the card as a filename" are prepared in order from the top.

The "Language" key receives an operation of selecting a language of a character written on a card. FIG. 30C shows a "Language" window displayed when the "Language" key is touched. The language currently selected is displayed at the top of the "Language" window. Buttons for character recognition languages which are selectable are displayed below the currently selected language in the form of a list. When one of the language buttons displayed as a list is touched, the control unit 41 switches the language to the selected one. When a vertical scroll bar on the right is touched and the downward scrolling operation is performed, the control unit 41 displays buttons of languages which are located below and not displayed on the screen in FIG. 30C. An "OK" key is provided at the upper right corner of the "Language" window. When this "OK" key is touched, the control unit 41 finally determines the language selection, and returns the window to the "Card Multi-crop" window shown in FIG. 30B. Note that, in this case, the control unit 41 displays the check mark indicating that the "Card Multi-crop" is selected on the "Card Multi-crop" key (a part thereof is behind the "Card Multi-crop" window).

The "File Format" key receives an operation of selecting an output data format of the character data obtained as a result of the character recognition. The "File Format" key receives the selection of a data format when information (the name of a company, an official position, a personal name, a department name, an address, a mail address, a phone number, etc.) on the card subjected to the character recognition is output as a single data file. FIG. 30D shows the state in which the "File Format" key is touched. As shown in FIG. 30D, a vCard format or a CSV format is selectable as an output format.

The check box of "Attach image of the card: PDF" receives the setting of whether or not the image data of the card original is sent as a single data file along with the file of the character data obtained as a result of the character recognition.

The check box of "Use name on the card as a filename" receives the setting of whether or not the name obtained as a result of the character recognition is used as an output filename.

An "OK" key is provided at the upper right corner of the "Card Multi-crop" window. As shown in FIG. 30E, when this "OK" key is touched, the control unit 41 waits the instruction to start the "Card Multi-crop" function in the condition set on the "Card Multi-crop" window. Note that the control unit 41 displays the message of "Be sure to close the automatic document feeder and press [Start] to scan." on the operation display unit 51 along with the "OK" key before receiving the instruction to start (see FIG. 30F).

At that point, the control unit 41 displays the check mark indicating that the "Card Multi-crop" is selected on the "Card Multi-crop" key. When the user closes the original cover 33 and presses the "OK" key after reading the message of "Be sure to close the automatic document feeder and press [Start] to scan." (see FIG. 30G), the control unit 41 erases the message in response to this operation. Then, the control unit 41 enables the gray-out "Start" key to be selectable (see FIG. 30H). When the cover open/close sensor 35 detects that the original cover 33 is opened, the control unit 41 grays out the "Start" key so as not to receive the operation of starting the card multi-crop scan.

In the state in FIG. 30H, single multi-crop of the card multi-crop scan is selected. When the user then touches an "Original count" key on the screen shown in FIG. 30I (see FIG. 30I), the control unit 41 determines that continuous multi-crop is selected in response to this operation. In this way, the single multi-crop and the continuous multi-crop are selectable for the "Card Multi-crop".

Hereinafter, it is supposed that the continuous multi-crop is selected.

The user arranges multiple card originals which are the objects for the multi-crop scan on the original table 20 (see FIG. 30J), and closes the original cover 33. When the user presses the "Start" key (see FIG. 30K), the control unit 41 starts a batch scan in photo multi-crop.

Alternatively, when the user touches the "OK" key provided at the upper right corner of the display region of the list of "Others" on the screen in FIG. 30K, the control unit 41 returns the screen to the screen shown in FIG. 30L in response to this operation.

When the "Card Multi-crop" function is selected, the control unit 41 sets the ordinary reading condition to a reading condition optimum for reading card originals. While the items similar to the items on the screen in FIG. 14A are displayed on the screen in FIG. 30L, FIG. 30L shows the state in which the settings are changed to the settings optimum for the "Card Multi-crop". Specifically, the "Exposure" which is generally set as "Auto" is changed to "Character" optimum for the "Card Multi-crop". Further, the "Resolution" which is generally set as "200×200" is changed to "400×400" optimum for the "Card Multi-crop" function. In addition, as shown in FIG. 30E, it is supposed to be set such that the language is "English", the format is vCard format, a PDF image is attached to the character data, and the name on the card is not used as a filename.

When the user presses the "Start" key on the screen in FIG. 30K or FIG. 30L, the control unit 41 causes, in response to this operation, the scanning unit 21 and the original reading unit 23 to read sixteen card originals 1 to 16 shown in FIG. 30J by a batch scan. During the reading, the control unit 41 displays the message of "Scanning original. (Pg. No. 1)" and an operation key of "Cancel scan" as shown in FIG. 30M.

After the first batch scan is finished, the cropping unit 25 crops images corresponding to 1 to 16 originals. The control unit 41 displays operation keys of "Read-End", "Change setting", and "Start" on the operation display unit 51 along with a message of "16 originals have been scanned (Total: 16 pages). Place next original. Press [Start]. When finished, press [Read-End]." on the basis of the cropping of the originals by the cropping unit 25 to encourage the user to do the next operation (see FIG. 30N). The control unit 41 also causes the character recognition unit 29 to perform character recognition for the cropped image of each card original, thereby acquiring character data.

When the user arranges sixteen card originals 17 to 32 which are the objects for the next multi-crop scan on the original table 20 (see FIG. 30O), and presses the "Start" key, the control unit 41 starts the next batch scan in response to this operation. Specifically, the control unit 41 causes the scanning unit 21 and the original reading unit 23 to read sixteen card originals shown in FIG. 30O by the batch scan.

The control unit 41 handles the image data obtained by the first batch scan and the image data obtained by the second batch scan as a series of image data.

After the second batch scan is finished, the cropping unit 25 crops images corresponding to sixteen originals 17 to 32. The control unit 41 displays operation keys of "Read-End", "Change setting", and "Start" on the operation display unit 51 along with a message of "16 originals have been scanned (Total: 32 pages). Place next original. Press [Start]. When finished, press [Read-End]." on the basis of the cropping of the originals by the cropping unit 25 (see FIG. 30P). The control unit 41 also causes the character recognition unit 29 to perform character recognition for the cropped image of each card original, thereby acquiring character data.

When the user touches the "Read-End" key (see FIG. 30Q), the control unit 41 stores the character data of thirty-two card originals in total, which have been read and cropped by two batch scans so far, into an USB memory connected to the USB connector 71 along with the image data. After the writing to the USB memory is finished, the control unit 41 displays a message of "Originals have been scanned. (Pg. No. 2)" on the operation display unit 51 (see FIG. 30R).

Figure 31:
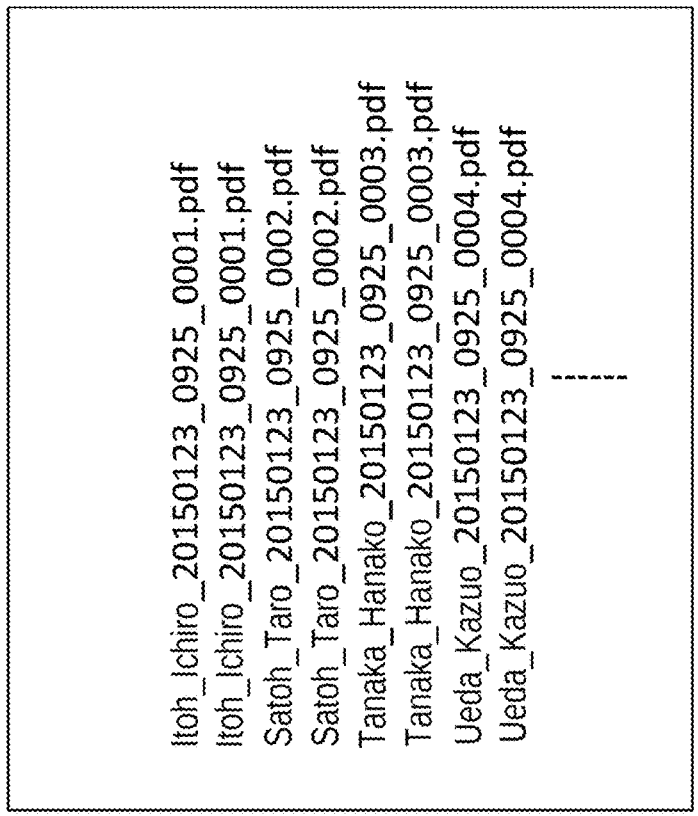
FIG. 31 is an explanatory view showing the state in which image data of the original read by the card multi-crop scan is stored in an USB memory connected to the digital multifunction peripheral shown in FIG. 1.

As shown in FIG. 31, the control unit 41 stores a pair of character data and image data corresponding to cropped thirty-two originals in total into the USB memory as sixty-four files stored in one folder. The filenames attached to sixty-four files include information of the date and time at which the first batch scan is executed. The same date indicates relation among sixty-four files. The character data and the image data that make a pair have the same filenames but different extensions indicating a type of the file.

The filename "image20150123_0925_0001" of the first pair out of multiple pairs shown in FIG. 31 will be described. The part "20150123" indicates the date of Jan. 23, 2015, and the subsequent part "0925" indicates the time of 9:25. The sixteen files are read by the continuous multi-crop, and have information of the same date and time. The files also include serial numbers 0001 to 0032 indicating the relation among these files at the end of the filename of each file. The file extension "vcf" indicates that this is the character data file in vCard format, while the file extension of "pdf" indicates that this is the image data in PDF format.

Note that the embodiment shown in FIG. 31 illustrates the case in which the "Use name on the card as a filename" is not selected and the name obtained as a result of the character recognition is not used as a filename.

Figure 32:
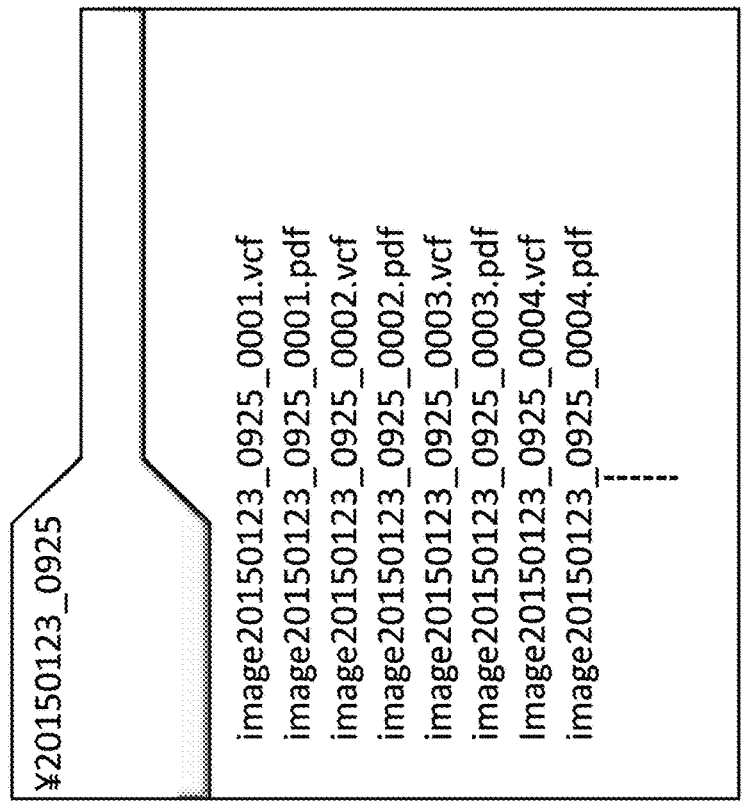
FIG. 32 is an explanatory view showing another embodiment in which image data of the original read by the card multi-crop scan is stored in an USB memory connected to the digital multifunction peripheral shown in FIG. 1.

On the other hand, FIG. 32 shows the embodiment in which the "Use name on the card as a filename" is selected and the name obtained as a result of the character recognition is used as a filename.

In FIG. 32, "Itoh Ichiro" in the first pair is the name obtained as a result of the character recognition. "Satoh Taro" in the second pair is the name obtained as a result of the character recognition. Similarly, "Tanaka Hanako" in the third pair is the name obtained as a result of the character recognition, and "Ueda Kazuo" in the fourth pair is the name obtained as a result of the character recognition. These names are used as filenames.

«Operation Procedure for Reading Card Original»

FIG. 33 is a flowchart showing an operation procedure for reading a card original in single multi-crop. Since steps in FIG. 33 almost correspond to the steps in FIG. 18 showing single multi-crop, different points will only be described.

In step S73, card originals are placed on the original table. Note that the control unit 41 does not recognize the card originals through the detection by the original size detection unit 31, but assumes the card originals by the depression of the "Card Multi-crop" key, and therefore, the difference between step S73 and step S33 in FIG. 18 is not the difference in the process of the control unit 41.

In step S83, the character recognition unit 29 generates character data on the basis of image data. The process in step S83 and the process in step S43 in FIG. 18 are different from each other in that only image data is generated in step S43. The process in step S85 is also different from the process in step S45 in FIG. 18 in that the data to be transferred in step S85 is character data (the image data is transferred together according to the selection).

Figure 34:
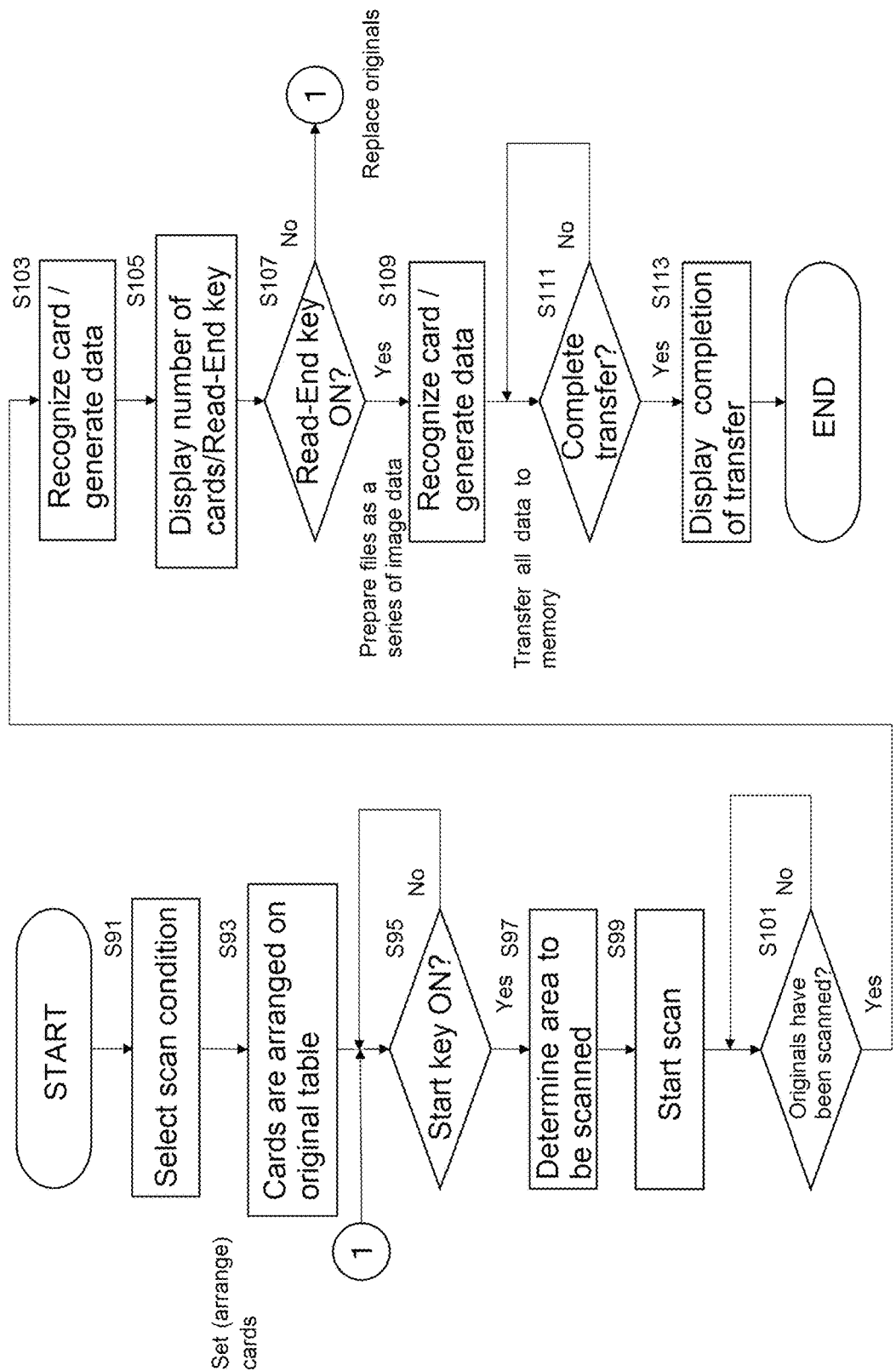
FIG. 34 is a flowchart showing a process executed by the control unit in the card multi-crop scan (more than one scan).

FIG. 34 is a flowchart showing an operation procedure for reading a card original in continuous multi-crop. Since steps in FIG. 34 almost correspond to steps for the continuous multi-crop in FIG. 26, the different point will only be described.

In step S93, card originals are placed on the original table. Note that the control unit 41 does not recognize the card originals through the detection by the original size detection unit 31, but assumes the card originals by the depression of the "Card Multi-crop" key, and therefore, the difference between step S93 and step S53 in FIG. 26 is not the difference in the process of the control unit 41.

In step S103, the character recognition unit 29 generates character data on the basis of image data. This process is different from the process in S63 in FIG. 26 in which only image data is generated. The process in step S107 is also different from the process in step S67 in FIG. 26 in that the data to be transferred in step S107 is character data (the image data is transferred together according to the selection).

In addition, the process in step S109 is also different from the process in step S69 in FIG. 26 in that files prepared as a series of image data are for character data (a pair of character data and image data according to selection).

«Preview and Reload of Card Original»

A preview function can be used for reading a standard size original or the ordinary multi-crop scan. However, if the preview function is used for the card multi-crop, the user can confirm the read state from the preview before performing the character recognition, and can reload the card original. Therefore, this function will be described as the feature related to the character recognition.

Figure 30S:
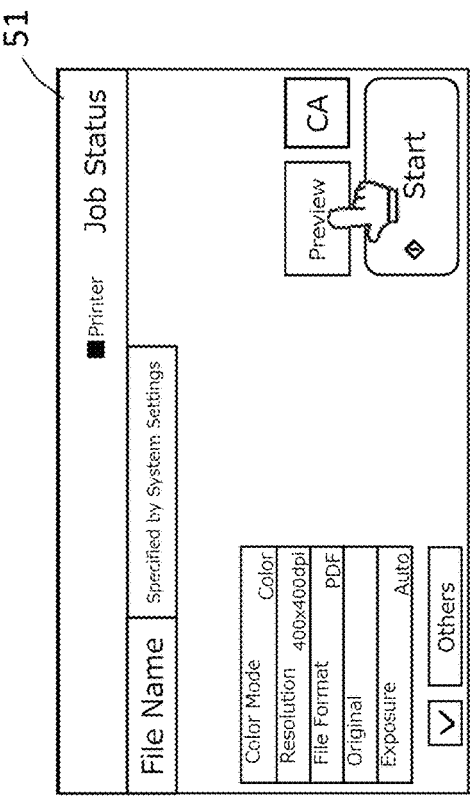
FIG. 30S is a first explanatory view showing a preview operation of the digital multifunction peripheral shown in FIG. 1 when a card multi-crop scan is executed.

FIGS. 30S and 30T are explanatory views showing a preview operation when the card multi-crop scan is performed in the digital multifunction peripheral shown in FIG. 1.

For example, a "Preview" key is displayed above the "Start" key on the screen in FIG. 30K or FIG. 30L. When the "Start" key is touched as described above, the control unit 41 performs a batch scan in card multi-crop to crop the images, and transfers the cropped images to a designated output destination (for example, the USB memory connected to the USB connector 71). In the case where the "Preview" key is touched in place of the "Start" key (see FIG. 30S), the control unit 41 does not transfer the images of the card originals to the designated output destination but displays these images on the screen of the operation display unit 51. This is the preview function.

FIG. 30T shows the state in which the first card out of sixteen cards which have been read by a batch scan and illustrated in FIG. 30J is displayed on the operation display unit 51 as a preview.

Note that, in the card multi-crop, the original reading unit 23 detects the edge of the card, i.e., the contour of the rectangle, determines a reference in vertical and horizontal directions, and corrects the skew of the original image. Since card originals are scanned in batch with the original cover 33 being left open, the original reading unit 23 can detect the contour according to the contrast between the area of the card original and the area outside of the card original.

Even if the card originals placed on the original table 20 are skew with respect to the scanning direction, the character recognition is performed after the reference in vertical and horizontal directions is determined on the basis of the contour of each card original, and therefore, high-precise character recognition is enabled as compared to the case where the scanning direction is used as a reference in vertical and horizontal directions. FIG. 30J shows the state in which the images of the cards after the skew correction are displayed as a preview. In addition, it is preferable that the original reading unit 23 or the character recognition unit 29 determines the feature of the character or the layout of each card image and rotates the card image so that the card image is erected. The display of a preview image in an erected state allows the user to easily confirm the image. Further, high-precise character recognition is enabled.

Note that the function of correcting skew of an original image may be invalidated according to the setting. When the skew correction is invalidated, the processing time taken for the skew correction can be shortened.

When three keys, which are "−", "+", and magnifying glass icon, arranged below the preview card image are touched, the control unit 41 reduces or enlarges the preview image at a predetermined percentage, or receives a designated display magnification and displays the preview image with the designated magnification. A counterclockwise key and a clockwise key located at the right of the three keys enable the read image of each of card originals to rotate 90 degrees in each direction. A horizontal scroll bar on the right of these keys receives an operation of selecting one of sixteen card images which have been scanned in batch.

A "Reload" key is displayed above the "Start" key. When the "Reload" key is touched, the control unit 41 redoes the batch scan. The control unit 41 may display a screen (not illustrated) for receiving the change in setting of the reading condition and receive the changed setting before the user redoes the batch scan.

When the "Start" key is touched on the screen in FIG. 30T, the control unit 41 causes the character recognition unit 29 to perform the character recognition on the basis of the image of each card original, and transfers the resultant character data to the designated output destination (for example, the USB memory connected to the USB connector 71). The control unit 41 transfers the character data together with the image data according to the selection.

Alternatively, even if the "Start" key is not touched, the control unit 41 may start the character recognition process after a certain period of time has elapsed from the start of the preview image display.

As described above,
(i) the image reading apparatus according to the present invention includes: original reading circuitry as an original reading unit configured to scan originals placed on an original table in batch by a batch-scan to read an image of each of the originals; a cropping unit configured to crop an image of each original from an image obtained by the batch-scan; an image output unit configured to attach a filename to image data of the cropped image of each original and output each image data in a new folder or an existing folder; and control circuitry as a control unit configured to control the original reading unit, and execute processes of the cropping unit and the image output unit, wherein the control unit is capable of processing images of multiple originals cropped by more than one batch-scan as a series of image data, and controlling the image output unit in at least such a way that a series of filenames is attached to the series of image data according to a predetermined rule, the series of image data is output into the same folder, or the series of image data is stored in association with one another.

In the present invention, the original table is the location where an original is placed when an image of the original is to be read, and the original reading unit reads the image of the original placed on the original table. The specific configuration thereof is, for example, an area where a glass plate or a transparent resin plate is horizontally placed, and an original is placed thereon with a surface which should be read facing downward. The original reading unit scans the original upward from below the plate to read the image. However, the nature of the present invention is not limited thereto. For example, the present invention also includes a configuration in which an original is placed on a non-transparent or transparent original table with the surface which should be read facing upward, and the original is scanned from above the original table.

Flat sheet-type originals are typical. However, the original is not limited thereto, and may have irregularities or may be a 3D object.

In addition, the multi-crop process is to scan multiple originals which are simultaneously placed on the original table in batch and crop an image of each original. The process for reading an image of an original, which is sequentially replaced one by one using an automatic document feeder or the like, on the original table is not included in the batch scan.

To crop an image of an original means that an image area corresponding to each original is extracted from the entire reading-area by the batch scan and trimming is performed, and in the multi-crop process, a plurality of image areas, each of which corresponds to each original, is extracted from the entire reading-area.

Preferable configurations of the present invention will further be described.

(ii) The image reading apparatus may be configured such that the control unit attaches filenames including the same time information to the series of image data.

According to this configuration, the relation among a series of image data can be recognized from the same time information attached to the filenames. Further, the time information itself allows the user to easily recognize what relation the originals have, which is convenient.

(iii) The image reading apparatus may be configured such that the time information concerns a time of the first batch-scan According to this configuration, even if more than one batch scan is performed, a series of filenames based on the time information concerning the first batch scan is attached to provide relation. The time information concerning the first scan at which the reading is started is likely to remain in user's memory, and allows the user to easily recognize what relation the originals have. Thus, it is convenient.

(iv) The image reading apparatus may be configured such that the control unit controls the image output unit in such a way that a new folder is created and each image data is output into this folder, the folder having a folder name including time information concerning a time of the first batch-scan.

According to this configuration, each image data is stored in a newly-created folder, and thus, the relation among a series of image data can be recognized. In addition, the folder name including the time information concerning the first scan allows the user to easily recognize what relation the image data in this folder has, which is convenient.

(v) The image reading apparatus may be configured such that the image output unit transmits image data to an external transmission destination designated beforehand, and the control unit transmits a series of image data to the same transmission destination.

According to this configuration, a series of image data is transmitted to the same external transmission destination, whereby the user can easily recognize the relation among the image data even at the transmission destination.

(vi) The image reading apparatus may further include: an operation key configured to receive designation indicating that a type of each original is a business card or not; and a character recognition unit configured to perform character recognition to a cropped image of each original which is designated as a business card, and to output character data, wherein the image output unit may output the character data, in place of or along with image data of each original, with a filename being attached thereto, and the control unit may control the image output unit in such a way that filenames corresponding to the image data of each original and the character data output as a result of the character recognition performed to the original by the character recognition unit are attached.

According to this configuration, character data of multiple business cards, which is obtained through a batch scan and character recognition, is output, and the character data of each of the business cards and the image data of this card can be output as a pair of data with filenames corresponding to the character data and the image data being attached thereto.

The user can understand the image data of the card and the character data thereof from the attached filenames.

Note that the operation key receiving the designation indicating that an original is a business card is a "Card Multi-crop" key in the above embodiment.

(vii) The image reading apparatus may be configured such that the operation key receives a selection of whether or not image data of each original designated as a business card is output along with character data output from the character recognition unit, and the control unit controls whether to output only the character data or to output the image data along with the character data according to the selection.

According to this configuration, the user can select whether to output only the character data of each of the card originals or to output the image data thereof along with the character data, before performing the card multi-crop scan.

(viii) The image reading apparatus may be configured such that the control unit controls the image output unit in such a way that, for each original designated as a business card, a filename is attached using the character data output from the character recognition unit.

According to this configuration, the result of the character recognition can be included in a filename, which makes it easy for a user to recognize the detail of character data or image data.

The character data attached to the filename may be a personal name as in the above embodiment, but it is not limited thereto. The other items written on a card, such as the name of a company, may be included. It may be configured such that a user can select which item is included in a filename.

(ix) The image reading apparatus may further include: a display unit that displays an image of each of scanned originals as a preview, wherein the display unit may display each scanned original on the display unit for a preview in the case where an original which has been designated as a business card is to be read, the operation key may receive a selection of whether each of the scanned originals is subjected to character recognition by the character recognition unit or the scan of each original is redone, at the point or after the point at which each original is displayed as a preview, and the control unit may cause the character recognition unit to perform character recognition or causes the original reading unit to redo a scan of each original.

According to this configuration, character data is generated.

(x) The image reading apparatus may be configured such that the original reading unit reads an image of each original on the basis of a plurality of reading conditions according to a type of an original, and the control unit changes the image reading conditions to a setting optimum for reading a business card, when the operation key receives a designation indicating that the original is a business card.

Since a business card original has to mainly provide necessary information from characters written on the card, it has smaller characters than a general original.

According to this configuration, when the card multi-crop scan is selected, the control unit sets reading conditions optimum for a business card original. Therefore, the control unit can set reading conditions optimum for recognizing small characters without bothering a user. The setting suitable for reading a business card may be preliminarily determined. In addition, the predetermined setting may be changed for each reading apparatus.

(xi) The image reading apparatus may further include: an original cover provided to be openable with respect to the original table and holds an original placed on the original table; and a cover open-and-close sensor configured to detect an open and closed state of the original cover, wherein when an original designated as a business card is to be read, the control unit may display, on the display unit, an operation guide indicating that the original is scanned with the original cover being left open, and in the case where the cover open-and-close sensor detects that the original cover is closed, the control unit may inhibit a scan.

According to this configuration, when a business card original is to be read, the original is scanned with the original cover being left open so as to enable recognition of the edge of the card original. Thus, a large contrast is generated between the area of the card original and the area outside of the card original, whereby each card original can precisely be cropped along the edge thereof.

(xii) The image reading apparatus may be configured such that the original reading unit detects an edge of an original designated as a business card, the character recognition unit has a correction function for correcting skew of each original in such a way that a character to be recognized is erected, on the basis of the direction of the detected edge and features of a character, and the skew correction function is enabled to be validated or invalidated according to a setting.

(xiii) The image reading apparatus may be configured such that the control unit is capable of selectively executing a single multi-crop process in which images of originals read by one batch-scan are handled as a series of image data and output so as to be distinguishable from image data read by other batch-scans and a continuous multi-crop process in which images of originals read by more than one batch-scan are handled as a series of image data.

According to this configuration, even when a lot of originals are read by more than one batch scan, the images of the originals can be output in such a way that the relation among the images of the originals, which have been read, is easily understood without requiring a complicated operation or process.

(xiv) The image reading apparatus may further include: a display unit configured to display a number of originals read by each batch-scan and the total number of originals read by a sequence of batch-scans, when the continuous multi-crop process is executed.

According to this configuration, a user can confirm the number of originals, which have been associated with one another as a series of image data, during the execution of batch scans in the continuous multi-crop process. The user can more appropriately determine whether to further continue the batch scan or to end the continuous multi-crop process on the basis of the display.

(xv) The image reading apparatus may be configured such that when the continuous multi-crop process is executed, the control unit displays an operation key that receives an instruction to start the next scan on the display unit every time each batch-scan is executed, and when the operation key is operated, the control unit executes the next batch-scan to acquire image data of each original, and handles the acquired image data and the image data obtained by the previous batch-scan as a series of image data.

According to this configuration, the user can issue an instruction to continue the batch scan while confirming the number of originals which have been read by each batch scan and the total number of originals which have been read by a sequence of batch scans.

(xvi) The image reading apparatus may further include: an operation key configured to receive a selection of a single multi-crop process, by a user, and an operation key configured to receive a selection of a continuous multi-crop process.

According to this configuration, the single multi-crop process and the continuous multi-crop process are selectively executed on the basis of the intention of the user placing multiple originals on the original table, whereby it is precisely determined whether or not image data obtained by a certain batch scan and image data obtained by the previous or next batch scan are associated with each other.

(xvii) The image reading apparatus may be configured such that the control unit displays an operation key configured to receive an instruction to end the continuous multi-crop process on the display unit every time the next batch-scan is executed, and in the case where the operation key is pressed, the control unit causes the image output unit to output the image data acquired by the batch-scans so far as a series of image data.

According to this configuration, the user can issue an instruction to continue the batch scan or to end the multi-crop process and output a series of image data while confirming the number of originals which have been read by each batch scan and the total number of originals which have been read by a sequence of batch scans.

Preferable embodiments of the present invention include a combination of any of the above two or more configurations.

In addition to the above-described embodiments, there can be various modified examples of the invention. Such modified examples should not be deemed to be out of the scope of the invention. The invention should include all the modified examples within the meaning and range of equivalency of scope of the claims.

What is claimed is:

1. An image reading apparatus comprising:
   a scanner that scans originals by a batch-scan that are placed on an original table;
   an original reading circuitry that reads an image of each of the scanned originals;
   an image processing circuit that crops the image of each original from the read images;
   an image output that outputs the cropped image of each original;
   control circuitry that controls the scanner, the original reading circuitry, the image processing circuit, and the image output; and
   a display, wherein the control circuitry executes a continuous multi-crop process-according to a selection by a user, and when the continuous multi-crop process is executed, the control circuitry displays on the display one operation key that receives an instruction to start the next scan and another operation key that receives an instruction to end the reading respectively every time each batch-scan is executed to enable the batch-scan to be repeatedly executed until receiving the instruction to end the reading, and handles the images of the originals read by the repeated batch-scans as a series of image data.

2. The image reading apparatus according to claim 1, wherein
the control circuitry processes the images of the originals cropped by more than one batch-scan as the series of image data, and controls the image output in such a way as to attach a series of filenames to the series of image data; and the series of image data is output into a same folder.

3. The image reading apparatus according to claim 2, wherein the control circuitry attaches the filenames including time information to the series of image data.

4. The image reading apparatus according to claim 3, wherein the time information includes a time of a first batch-scan.

5. The image reading apparatus according to claim 3, wherein the control circuitry controls the image output such that a new folder is created, and each image data is output into the new folder; and the new folder has a folder name including time information concerning a time of a first batch-scan.

6. The image reading apparatus according to claim 2, wherein
the image output transmits the series of image data to an external transmission destination that is designated beforehand; and
the control circuitry transmits the series of image data to the external transmission destination.

7. The image reading apparatus according to claim 1, wherein
the display displays a number of the originals read by each batch-scan and a total number of the originals read by a sequence of batch-scans, when the continuous multi-crop process is executed.

* * * * *